(12) United States Patent
Iida et al.

(10) Patent No.: US 7,798,259 B2
(45) Date of Patent: Sep. 21, 2010

(54) POWER TRANSMISSION SYSTEM AND VEHICLE WITH IT

(75) Inventors: Masaru Iida, Amagasaki (JP);
Fumitoshi Ishino, Amagasaki (JP);
Michio Tsukamoto, Amagasaki (JP);
Manabu Kawakami, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 519 days.

(21) Appl. No.: 11/567,066

(22) Filed: Dec. 5, 2006

(65) Prior Publication Data
US 2007/0151222 A1 Jul. 5, 2007

(30) Foreign Application Priority Data
Dec. 5, 2005 (JP) ............................. 2005-351126

(51) Int. Cl.
*B62D 11/02* (2006.01)
(52) U.S. Cl. .................... 180/6.2; 180/6.48; 180/308
(58) Field of Classification Search ............ 180/6.2, 180/6.48, 308
See application file for complete search history.

(56) References Cited

U.S. PATENT DOCUMENTS

| 5,957,229 A * | 9/1999 | Ishii ........................... 180/6.48 |
| 6,125,630 A * | 10/2000 | Abend et al. ................... 60/487 |
| 6,672,058 B1 * | 1/2004 | Langenfeld et al. ........... 60/487 |
| 6,758,290 B2 * | 7/2004 | Jolliff et al. ................. 180/6.48 |
| 7,134,278 B2 * | 11/2006 | Sakikawa ..................... 60/484 |
| 7,510,035 B1 * | 3/2009 | Irikura ....................... 180/6.48 |
| 2002/0179340 A1 * | 12/2002 | Jolliff et al. ................. 180/6.48 |
| 2002/0179341 A1 * | 12/2002 | Boyer et al. ................. 180/6.48 |
| 2004/0026137 A1 * | 2/2004 | Hauser ....................... 180/6.48 |

* cited by examiner

*Primary Examiner*—Lesley Morris
*Assistant Examiner*—Tashiana Adams
(74) *Attorney, Agent, or Firm*—Sterne, Kessler, Goldstein & Fox P.L.L.C.

(57) ABSTRACT

A working vehicle comprises: a vehicle frame; a prime mover mounted on an upper surface of a first portion of the vehicle frame; a pair of left and right transaxles juxtaposed below the vehicle frame, the left and right transaxles having respective single axles so as to individually and reversibly rotatably driving left and right drive wheels; a working device disposed below the vehicle frame; an output shaft of the prime mover extended downward from the first portion of the vehicle frame; a traveling belt transmission disposed below the vehicle frame and extended from the output shaft to the pair of left and right transaxles; a working belt transmission disposed below the vehicle frame and extended from the output shaft to the working device; a counter shaft for the traveling belt transmission extended downward from a second portion of the vehicle frame; and a pair of upper and lower pulleys provided on the counter shaft, wherein a belt looped over the lower pulley is extended from the output shaft of the prime mover, and a belt looped over the upper pulley is extended to the left and right transaxles.

9 Claims, 35 Drawing Sheets

POWER TRANSMISSION SYSTEM AND VEHICLE WITH IT

BACKGROUND OF THE INVENTION

1. Field of the Invention

The invention relates to a power transmission system comprising: right and left independent transaxles for driving respective right and left axles; and a working power clutch unit incorporating a working power clutch. The invention also relates to a working vehicle equipped with the power transmission system.

2. Related Art

Conventionally, there is a well-known working vehicle equipped with right and left independent transaxles for driving respective right and left axles, such as pedestrian-controlled lawn mowers as disclosed in U.S. Pat. No. 5,127,215A (reference 1) and WO 97/15764 (reference 2). This type working vehicle is advantageous in its compactness, its large space for a working device, and its ability of sharp turning (i.e., zero-turning).

In each of the vehicles disclosed in the references 1 and 2, an engine serving as a prime mover is disposed so as to extend its output shaft vertically downward. Two pulleys are provided on the engine output shaft. One pulley is connected to input pulleys of respective right and left transaxles through a belt. The other pulley is connected to an input pulley of a working device (a mower unit) through another belt. In this way, the engine power is distributed between the working device and the pair of right and left transaxles for traveling of the vehicle.

As shown in the references 1 and 2, in this type working vehicle, the pair of transaxles are covered over with a frame, and the engine is mounted on a horizontal upper flat surface of the frame.

With respect to the clutch for the working device, as disclosed in the reference 2, for example, a clutch brake is interposed in the pulley on the engine output shaft for transmitting power to the mower deck.

Each of the right and left transaxles is an integral hydrostatic transaxle (hereinafter referred to as "IHT") having a transaxle housing incorporating mutually fluidly connected hydraulic pump and motor constituting a hydrostatic transmission (hereinafter referred to as "HST"). The hydraulic pump includes a vertical pump shaft, on which the input pulley is disposed above the transaxle housing so as to receive the power from the engine. Further, in the IHT shown in the reference 2, the hydraulic motor includes a vertical motor shaft advantageously for lateral and fore-and-aft minimization. In this IHT, the vertical motor shaft projects at its top end upward from the housing, so as to have a dry brake between the top of the motor shaft and the top surface of the housing. Both of the brakes provided on the respective right and left IHTs are applied simultaneously for stopping the vehicle. One of the brakes is applied for zero-turning of the vehicle to the side corresponding to the applied brake.

Each of the above-mentioned hydraulically driven working vehicles requires a sufficient space below the frame for arrangement of the working device and the right and left transaxles. Further, if an electromagnetic clutch is used for switching on and off the power transmission to the working device, the space below the frame has to be larger for arrangement of the electromagnetic clutch. On the other hand, especially if the working vehicle having the power transmission system is made for riding, a heavy engine is desired to be lowered as much as possible so as to ensure safety in zero-turn.

It is important for lowering the engine to ensure a sufficient space below the frame for arranging the left and right transaxles, the working device and the electromagnetic clutch for the working device. In the arrangement as disclosed in the above references 1 and 2, the engine is disposed on the upper surface of the horizontal plate-shaped portion of the frame, and the transaxles are disposed below the horizontal plate-shaped portion of the frame. To lower the engine in this situation, the transaxles also have to be lowered. The lowered transaxles may interfere with the working device or the working power transmission mechanism (including the electromagnetic clutch). Conclusively, while the engine is desired to be lowered as much as possible for stability of the traveling vehicle, the transaxles have to be disposed at a considerably high position with respect to the working device.

If each of the left and right IHTs of the power transmission system has a vertical motor shaft, the above-mentioned dry brake is exposed above the housing. Such an exposed brake is poor in protection and is worn early. This problem is cleared if an alternative wet brake is disposed in a housing of the IHT. However, the question is where the wet brake is disposed in the IHT used for the power transmission system, while the IHT has the restricted vertical length and the vertical motor shaft.

SUMMARY OF THE INVENTION

A first object of the invention is to provide a working vehicle improved so that its prime mover can be disposed at a low position for ensuring stability of the vehicle during turning. In the working vehicle, on an upper surface of a first portion of a vehicle frame is mounted the prime mover, and below the vehicle frame are disposed a working device and a pair of left and right transaxles having respective single axles for individually and reversely rotatably driving the respective left and right drive wheels. An output shaft of the prime mover is extended downward from the vehicle frame. Below the vehicle frame, a traveling belt transmission is extended from the output shaft to the pair of left and right transaxles, and a working belt transmission is extended from the output shaft to the working device.

To attain the first object, according to a first aspect of the invention, the working vehicle further comprises: a counter shaft for the traveling belt transmission extended downward from a second portion of the vehicle frame; and a pair of upper and lower pulleys provided on the counter shaft. A belt looped over the lower pulley is extended from the output shaft of the prime mover, and a belt looped over the upper pulley is extended to the left and right transaxles.

Due to the counter shaft, the output shaft of the prime mover can be (especially, fore-and-aft) offset from the left and right transaxles advantageously for constituting the traveling belt transmission between the prime mover and the left and right transaxles. Therefore, the prime mover can be lowered enough to ensure a sufficient stability in traveling of the vehicle while the transaxles are disposed high enough to be prevented from interfering with the working device or the working power transmission mechanism.

Further, while the heights of the prime mover and the left and right transaxles are optimized, the belt looped over the lower pulley is extended from the output shaft of the prime mover, and the belt looped over the upper pulley is extended to the left and right transaxles. Therefore, these belts can be extended horizontally so that the traveling belt transmission smoothly and efficiently transmits power.

Preferably, in the working vehicle of the first aspect, the first portion of the vehicle frame having the prime mover mounted thereon is lower than the second portion of the vehicle frame having the counter shaft extended downward therefrom. The lowered first portion of the vehicle frame advantageously lowers the prime mover thereon so as to ensure the sufficient stability in traveling of the vehicle. The left and right transaxles disposed below the second portion of the vehicle frame can be kept high enough to be prevented from interfering with the working device or the working power transmission mechanism.

Further preferably, the pair of left and right transaxles are disposed just below the second portion of the vehicle frame having the counter shaft extended therefrom, and the vehicle frame is formed with a sloped portion between the first portion of the vehicle frame having the prime mover mounted thereon and the second portion having the counter shaft extended downward therefrom so as to correspond to shapes of the transaxles therebelow. Therefore, while the prime mover mounted on the vehicle frame is lowered, the vehicle frame is prevented from interfering with the transaxles, and a dead space is reduced.

Preferably, in the working vehicle of the first aspect, a clutch mechanism for transmitting or isolating power to and from the working device is provided on the output shaft of the prime mover. In this regard, due to the above configuration, the output shaft of the prime mover and its surroundings are offset from the transaxles so as to ensure a sufficient space around the output shaft for arranging the clutch mechanism for the working device.

Further preferably, a pulley is provided on the output shaft of the prime mover below the first portion of the vehicle frame having the prime mover mounted thereon and above the clutch mechanism, so as to be drivingly connected to the lower pulley on the counter shaft through the belt. A transmission shaft on the downstream side of the clutch mechanism is extended downward to a lower position than the clutch mechanism. A pulley is provided on the transmission shaft so as to constitute the working belt transmission. Therefore, while the clutch mechanism is provided on the output shaft, the belt extended to the counter shaft for transmitting power to the transaxles and the belt extended to the working device below the transaxles can be disposed below the vehicle frame so as to be prevented from interfering with each other.

A second object of the invention is to provide a power transmission system for a working vehicle, having brakes for a pair of left and right transaxles, the brakes being improved in protection and durability while ensuring compactness of the left and right transaxles. The working vehicle includes a vehicle frame, a prime mover mounted on an upper surface of the vehicle frame, a pair of left and right transaxles juxtaposed below the vehicle frame, and a working device disposed below the vehicle frame. The left and right transaxles have respective single axles so as to individually and reversibly rotatably drive left and right drive wheels. A housing of each of the transaxles is filled therein with fluid so as to serve as a fluid sump. The single axle and a hydrostatic transmission for driving the corresponding single axle are disposed in each of the housings. Each of the hydrostatic transmission includes a hydraulic pump and a hydraulic motor fluidly connected to each other. Each of the hydraulic motors has a vertical motor shaft drivingly connected to the corresponding axle and projecting upward from an upper surface of the housing.

To attain the second object, according to a second aspect of the invention, the power transmission system comprises: a cover attached on an upper surface of each of the housings so as to cover a top of the corresponding motor shaft; a brake chamber formed in the cover and each of the housings; a wet brake mechanism disposed in each of the brake chambers; and a fluid passage formed in a wall of each of the housings and opened to the corresponding fluid sump and the corresponding brake chamber. The brake mechanism includes a brake disk provided on the top of the motor shaft.

Therefore, the left and right transaxles are provided with the protective and durable wet brake mechanisms. Due to the vertical motor shafts, the transaxles are horizontally minimized. Since the brake chambers incorporating the respective wet brake mechanisms are constituted by the cover attached on the upper surfaces of the housings of the transaxles and by the housings of the transaxles, the brake chambers are disposed so as to keep the compactness of the transaxles.

Preferably, in the power transmission system of the second aspect, a pair of reservoir tanks are connected to the respective housings of the transaxles so as to regulate volumes of the respective fluid sumps in the housings. The reservoir tanks are fluidly connected to the respective brake chambers. Therefore, the reservoir tanks used for regulating volumes of the fluid sumps in the housings are also used for supplying fluid to the respective wet brakes, thereby reducing the number of parts, the number of manufacturing processes, and costs, while ensuring the compactness of the transaxles.

Preferably, in the power transmission system of the second aspect, the hydraulic pumps in the respective transaxles are variable displacement hydraulic pumps with respective movable swash plates. The cover serves as a guide member for the movable swash plates, thereby saving the number of parts, the number of manufacturing processes, and costs.

Preferably, in the power transmission system of the second aspect, the hydraulic pumps in the respective transaxles are variable displacement hydraulic pumps with respective movable swash plates, and the power transmission system further comprises: a pair of speed control levers for changing displacements of the respective hydraulic pumps; and a pair of brake levers for operating the respective brake mechanisms. Each of the speed control levers is pivoted on one side of the corresponding housing. Each of the brake levers is pivoted on the other side of the corresponding housing opposite to the corresponding speed control lever. Rotary axes of the speed control levers are disposed in parallel to rotary axes of the brake levers, and the rotary axes of the speed control levers and the brake levers are disposed in parallel to the axles. Therefore, the levers are provided on the transaxles so as to be prevented from interfering with one another. Further, while the axles are disposed laterally, the levers are disposed fore-and-aft rotatably, so that linkages between the speed control levers and a speed control operation device on the vehicle and linkages between the brake levers and a brake operation device on the vehicle are simply and efficiently arranged so as to be prevented from interfering with each other.

DETAILED DESCRIPTION OF THE INVENTION

Figure 1:
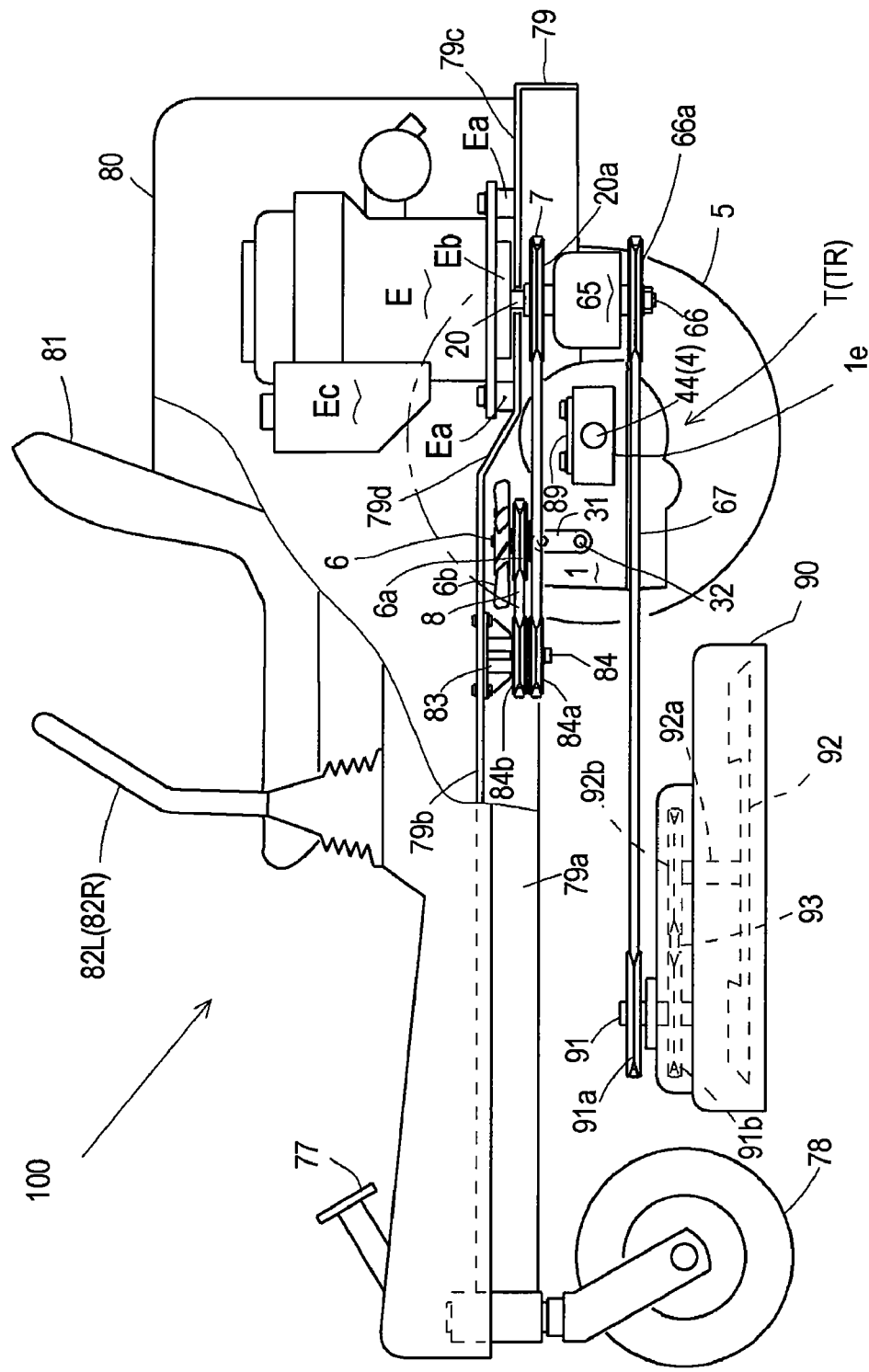
FIG. 1 is a sectional side view of a riding lawn mower 100 serving as an example of a working vehicle according to the invention, equipped with transaxles T.

Referring to FIGS. 1 to 5, description will be given of a general configuration of a working vehicle 100 serving as an embodiment of a hydraulically driven working vehicle equipped with a power transmission system of the invention.

Working vehicle 100 includes a fore-and-aft extended vehicle frame 79. Vehicle frame 79 is bent into a vertically reversed U-like shape in a sectional front view, so as to have a pair of left and right vertical plate portions 79a and a horizontal plate portion 79b between left and right vertical plate portions 79a. Further, as shown in FIG. 1, a rear horizontal plate portion 79d is formed between left and right vertical plate portions 79a behind horizontal plate portion 79b so as to be lower than horizontal plate portion 79b.

Figure 3:
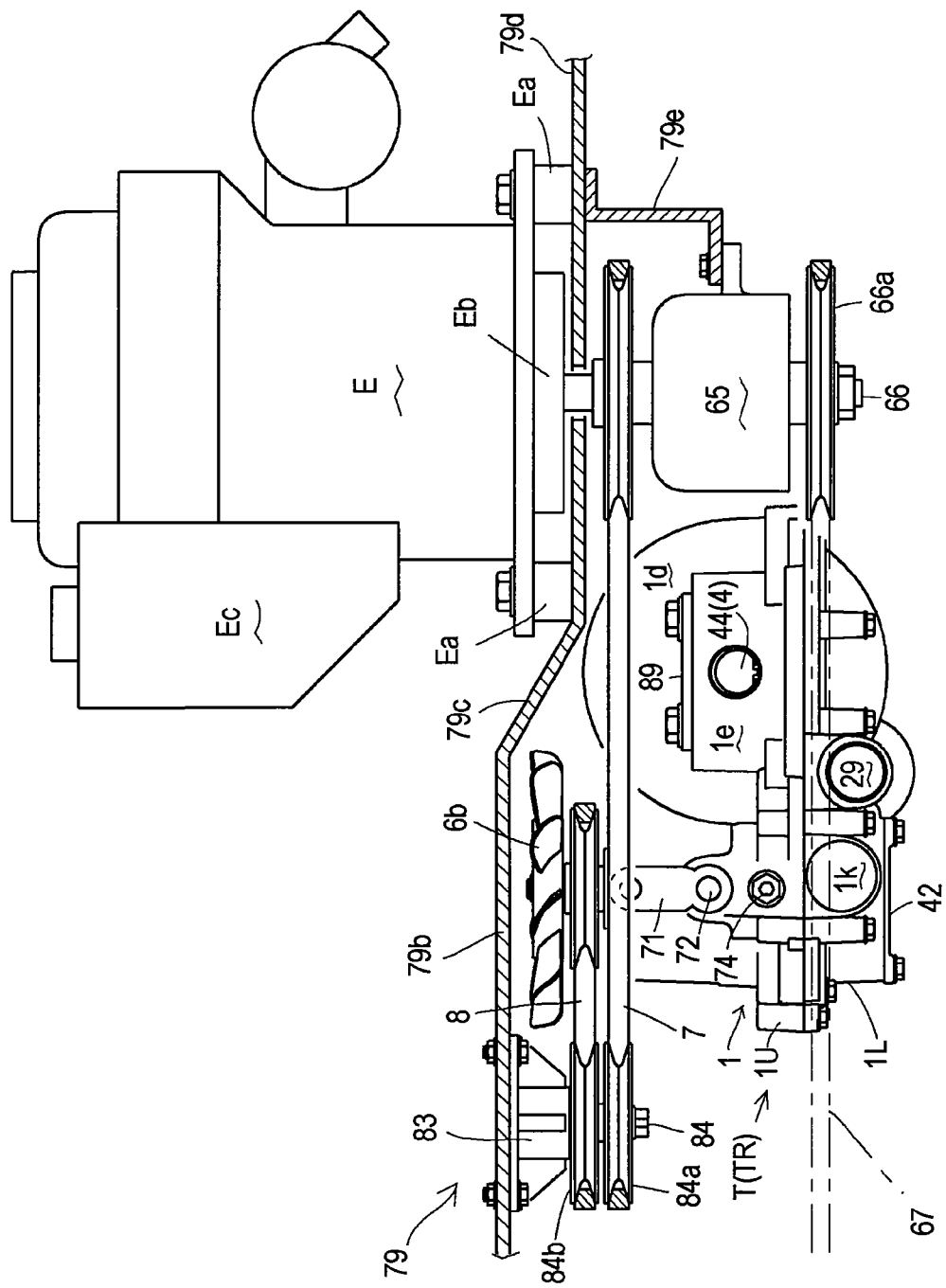
FIG. 3 is a sectional side view of a principal portion of riding lawn mower 100.

As shown in FIGS. 1 and 3, horizontal plate portion 79b and rear horizontal plate portion 79d are connected to each other through a sloped plate portion 79c. The purposes of the slope of sloped plate portion 79c are to prevent interference with later-discussed transaxles TL and TR just therebelow and to eliminate a dead space. Alternatively, a vertical plate portion may be provided to connect horizontal plate portion 79b to rear horizontal plate portion 79d if it achieves these purposes.

As shown in FIGS. 1 and 3, an engine E serving as a prime mover is mounted on an upper surface of rear horizontal plate portion 79d of vehicle frame 79 through vibration isolating rubbers Ea. A fuel tank Ec is provided integrally on a front surface of engine E. Engine E includes a vertical crankshaft extended downward and provided on its bottom end with a flywheel Eb just above rear horizontal plate portion 79d. The crankshaft is connected to a coaxial engine output shaft 20 through a damper.

As shown in FIGS. 1 and 3, a clutch bracket 79e is extended downward from rear horizontal plate portion 79d, and a clutch housing 65 is fixed to clutch bracket 79e. Engine output shaft 20 is freely rotatably passed downward through rear horizontal plate portion 79d, and is inserted into clutch housing 65 therebelow. Clutch housing 65 incorporates an electromagnetic clutch 65a (see FIG. 6) for power transmission to a working device, so that engine output shaft 20 serves as a primary side transmission shaft of clutch 65a. A working device driving shaft 66 is disposed coaxially to engine output shaft 20 so as to serve as a downstream side transmission shaft of clutch 65a, and is extended downward from clutch housing 65. An axle driving pulley 20a is fixed on engine output shaft 20 between rear horizontal plate portion 79d and the top end of clutch housing 65. A working device driving pulley 66a is fixed on working device driving shaft 66 below clutch housing 65.

Figure 2:
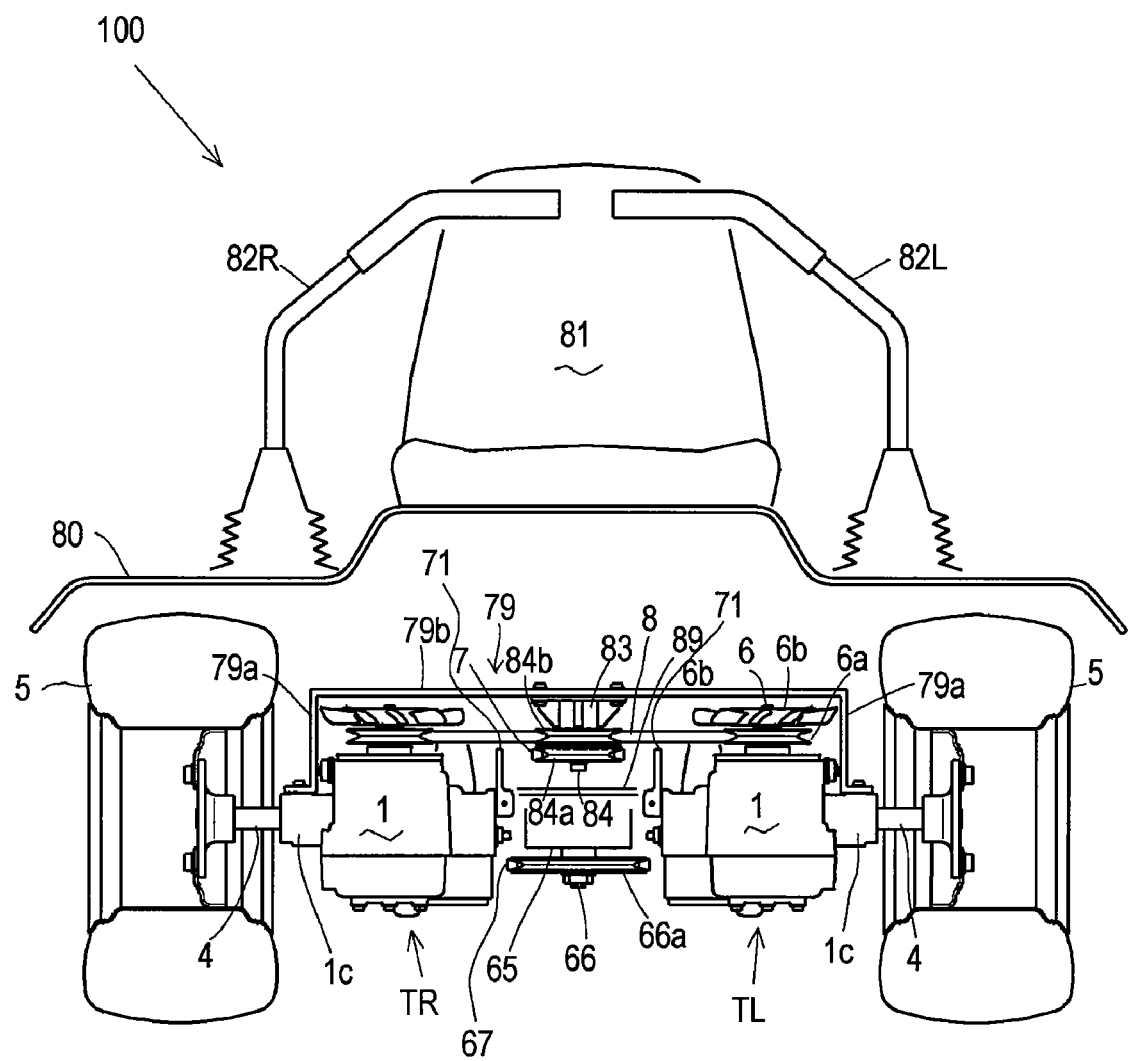
FIG. 2 is a schematic sectional front view of riding lawn mower 100.

Left transaxle TL and right transaxle TR (generally named as transaxles T) are laterally symmetrically (see FIG. 2) juxtaposed just in front of clutch housing 65 below vehicle frame 79, as shown in FIGS. 1 and 3. As shown in FIGS. 1 to 3, a left drive axle 4 is laterally horizontally extended from an axle bearing portion 1c formed at a left distal portion of a housing 1 of let transaxle TL, and a right drive axle 4 is laterally horizontally extended from an axle bearing portion 1c formed at a right distal portion of a housing 1 of right transaxle TL so as to be disposed coaxially to left drive axle 4. Drive wheels (rear wheels) 5 are fixed on outer ends of respective left and right drive axles 4. As shown in FIG. 2, an upper surface of each axle bearing portion 1c is fastened to a part of each of left and right vertical plate portions 79a of vehicle frame 79 by bolts.

Figure 4:
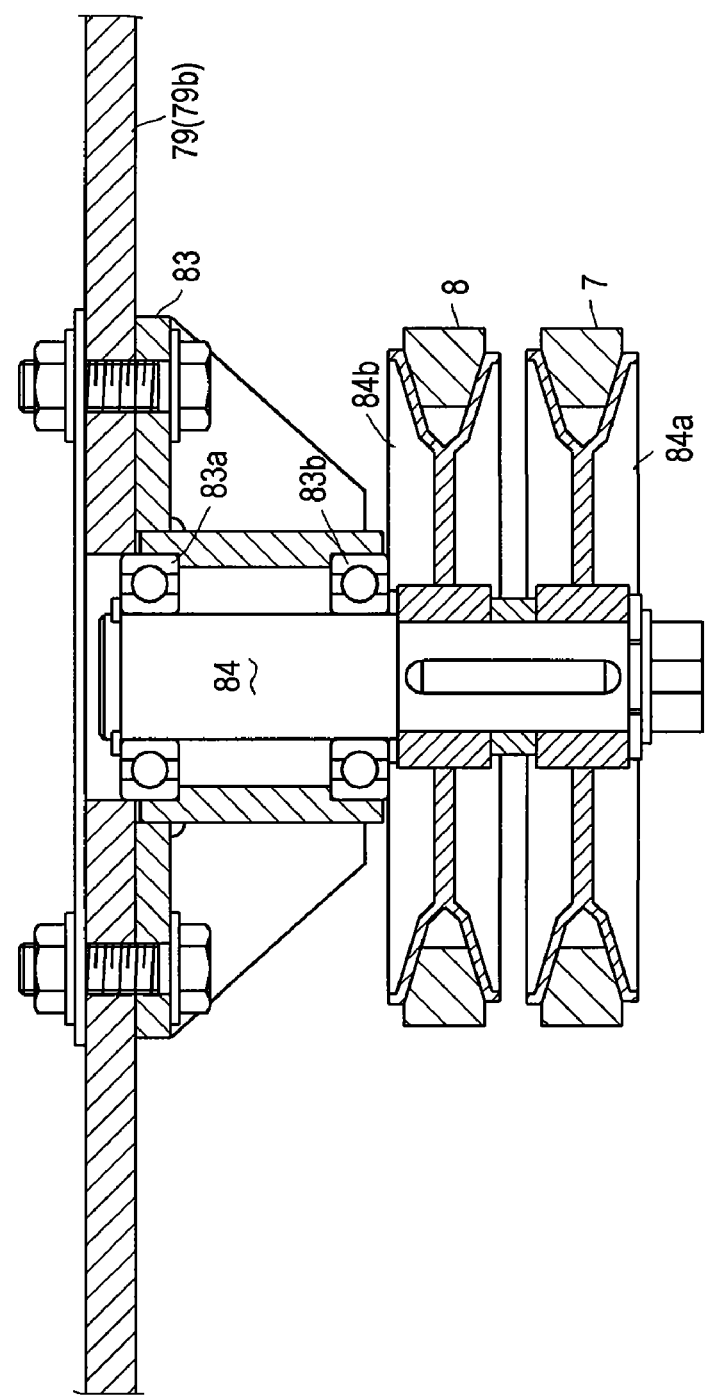
FIG. 4 is a sectional side view of a counter shaft of a traveling belt transmission used by the riding lawn mower and a bracket supporting the counter shaft.

As shown in FIGS. 1 and 3, a vertical input shaft (pump shaft) 6 projects upward from each of housings 1 of transaxles TL and TR so as to be fixed thereon with an input pulley 6a and a cooling fan 6b above input pulley 6a. A bracket 83 is fastened to horizontal plate portion 79b of vehicle frame 79 by bolts as shown in FIG. 4, and a vertical counter shaft 84 is journalled through bearings 83a and 83b by bracket 83 as shown in FIGS. 1 to 3. Counter shaft 83 is extended vertically downward from a bottom end of bracket 83 so as to be fixedly provided thereon with vertically doubled lower pulley 84a and upper pulley 84b. A belt 7 looped over axle driving pulley 20a is substantially horizontally passed between transaxles TL and TR so as to be looped over lower pulley 84a, and a belt 8 is substantially horizontally extended from upper pulley 84b so as to be looped over both input pulleys 6a, thereby constituting a traveling belt transmission for transmitting power from engine output shaft 20 to input shafts 6 of respective transaxles TL and TR.

Figure 5:
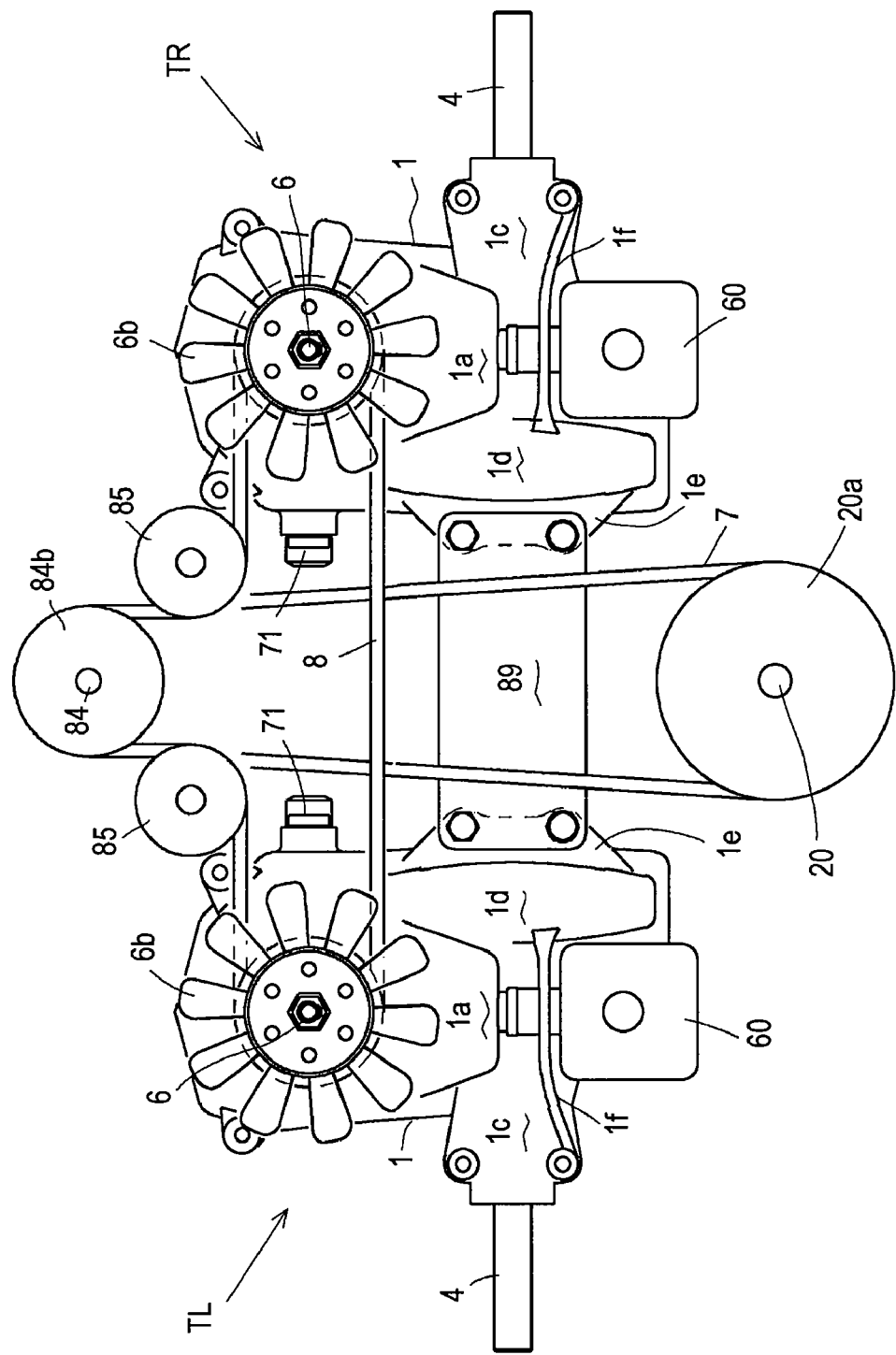
FIG. 5 is a plan view of a pair of left and right transaxles TL and TR provided with the traveling belt transmission.

In FIG. 5, the set of transaxles TL and TR with the traveling belt transmission is viewed in plan. Housings 1 of respective transaxles TL and TR are connected to each other through a connection plate 89 so as to increase their rigidity, and to be provided as an easily transportable assembly unit. Housings 1 are formed at their laterally proximal side portions with respective connection plate fixture portions 1e. Connection plate 89 is fastened at left and right ends thereof onto respective connection plate fixture portions 1e of housings 1 by bolts.

Referring to FIG. 5 (not shown in FIGS. 1, 2 and 3), a pair of tension pulleys 85 are supported by vehicle frame 79, and each tension pulley 85 is pressed against a portion of belt 7 between upper pulley 84b on counter shaft 84 and input pulley 6a of each of transaxles TL and TR so as to adjust an efficiency of power transmission from counter shaft 84 to each input shaft 6. In FIG. 5, each of transaxles TL and TR is provided with a later-discussed reservoir tank 60 attached onto housing 1.

As shown in FIG. 1, sloped plate portion 79c of vehicle frame 79 is substantially disposed between axle bearing portions 1c of transaxles TL and TR in the fore-and-aft direction, so that bull gear casing portions 1d of respective housings 1 of transaxles TL and TR are disposed under sloped plate portion 79c so as to incorporate later-discussed respective bull gears 27 fixed on proximal ends of respective axles 4. Bull gear casing portion 1d of each housing 1 is expanded upward in an arcuate shape along corresponding bull gear 27. The slope of sloped plate portion 79c is determined so as to be disposed along the arcuate shapes of bull gear casing portions 1d. Further, rear ends of cooling pulleys 6b are disposed just below the top of sloped plate portion 79c, i.e., the rear end of horizontal plate portion 79b. In this way, sloped plate portion 79c covers the height difference between horizontal plate portion 79b and rear horizontal plate portion 79d while it reduces a dead space.

As shown in FIGS. 1, 2, 3 and 5, in each of transaxles TL and TR, a lateral horizontal pump control shaft 72 is pivoted in a laterally proximal side end of housing 1 so as to interlock with a movable swash plate of a later-discussed hydraulic pump. A speed control lever 71 is fixed on a portion of pump control shaft 72 projecting outward from corresponding housing 1 so as to be fore-and-aft rotatably integral with pump control shaft 72. A bake operation shaft 32 is pivoted in a laterally distal side end of housing 1 laterally opposite to the portion pivoting pump control shaft 72. A bake lever 31 is fixed on a portion of brake operation shaft 32 projecting outward from housing 1 so as to be fore-and-aft rotatably integral with brake operation shaft 32.

As shown in FIG. 1, casters (front wheels) 78, serving as driven wheels, are supported on the front end of vehicle frame 79. Normally, the vehicle is provided with a pair of left and right casters 78. Alternatively, it may be provided with a single caster 78, or with three or more casters 78. A mower deck 90 incorporating rotary blades 92 for lawn mowing is disposed below vehicle frame 79 between casters 78 and rear wheels 5 in the fore-and-aft direction of the vehicle. A vertical input shaft 91 projects upward from a front portion of mower deck 90 so as to be fixedly provided thereon with an input pulley 91a. A belt 67 is looped over a working device driving pulley 121a fixed on working device driving shaft 121, and is substantially horizontally passed forward between transaxles TL and TR so as to be looped over input pulley 91a, thereby constituting a working belt transmission for transmitting power from working device driving shaft 66 to input shaft 91.

In mower deck 90, a pulley 91b is fixed on a bottom end of input shaft 91, a pulley 92b is fixed on a top end of a rotary shaft 92a of rotary blade 92, and a belt 93 is interposed between pulleys 91b and 92b so as to constitute a power train from input shaft 91 to rotary blades 92.

As shown in FIG. 1, vehicle frame 79 is entirely covered with a body cover 80, and a driver's seat 81 is mounted on a substantially fore-and-aft middle portion of body cover 80. The clutch disposed in clutch housing 65 for the power transmission to rotary blades 92 in mower deck 90 is operated by an operation device (not shown), such as a button, disposed adjacent to driver's seat 81.

As shown in FIGS. 1 and 2, a pair of left and right speed control levers 82L and 82R are fore-and-aft rotatably disposed on left and right sides of driver's seat 81, and operatively connected to respective speed control levers 71 on respective transaxles TL and TR through respective links (such as wires). Each of speed control levers 82L and 82R is rotated forward or rearward from its neutral position so as to tilt a movable swash plate 2c of a hydraulic pump 2 (see FIG. 6) of corresponding transaxle TL or TR forward or rearward, and to determine the tilt angle of the movable swash plate in correspondence to the rotational angle of the speed control lever 82L or 82R, so that the fluid delivery direction and amount of corresponding hydraulic pump 2, i.e., the forward or backward rotational direction and rotary speed of corresponding axle 4, is determined in correspondence to the tilt direction and angle of the swash plate. Consequently, the vehicle turns in correspondence to the difference of rotational direction or degree between speed control levers 82L and 82R.

A front portion of body cover 80 in front of driver's seat 81 serves as a footrest portion for a driver sitting on seat 81. A pair of left and right brake pedals 77 are disposed at the front end portion of body cover 80 so as to be operatively connected to respective brake levers 31 through respective links (such as wires).

A rear portion of body cover 80 behind driver's seat 81 serves as an engine room incorporating an engine E disposed behind driver's seat 81.

A hydraulic drive system of working vehicle 100 according to the invention will now be described. Housing 1 of each of transaxles TL and TR, whose interior space serves as a fluid sump, incorporates a hydrostatic transmission (HST), axle 4 and a deceleration gear train. In the HST, variable displacement hydraulic pump 2 and fixed displacement hydraulic motor 3 are fluidly connected to each other through a closed fluid circuit. The deceleration gear train transmits the output power of hydraulic motor of the HST to axle 4. As mentioned above, axle 4 of left transaxle TL projects leftward from corresponding housing 1, and axle 4 of right transaxle TR projects rightward from corresponding housing 1, so that wheels 5 are attached onto the outer ends of respective axles 4.

Vertical input shaft 6 serves as a pump shaft of hydraulic pump 2. The above-mentioned traveling belt transmission includes belts 7 and 8 and counter shaft 84 so as to transmit power from output shaft 20 of engine E to transaxles TL and TR. Working device driving shaft 66 is connected to output shaft 20 through clutch 65a in clutch housing 65, and the above-mentioned working belt transmission is extended from working device driving shaft 66 to input shaft 91 in mower deck 90.

Figure 6:
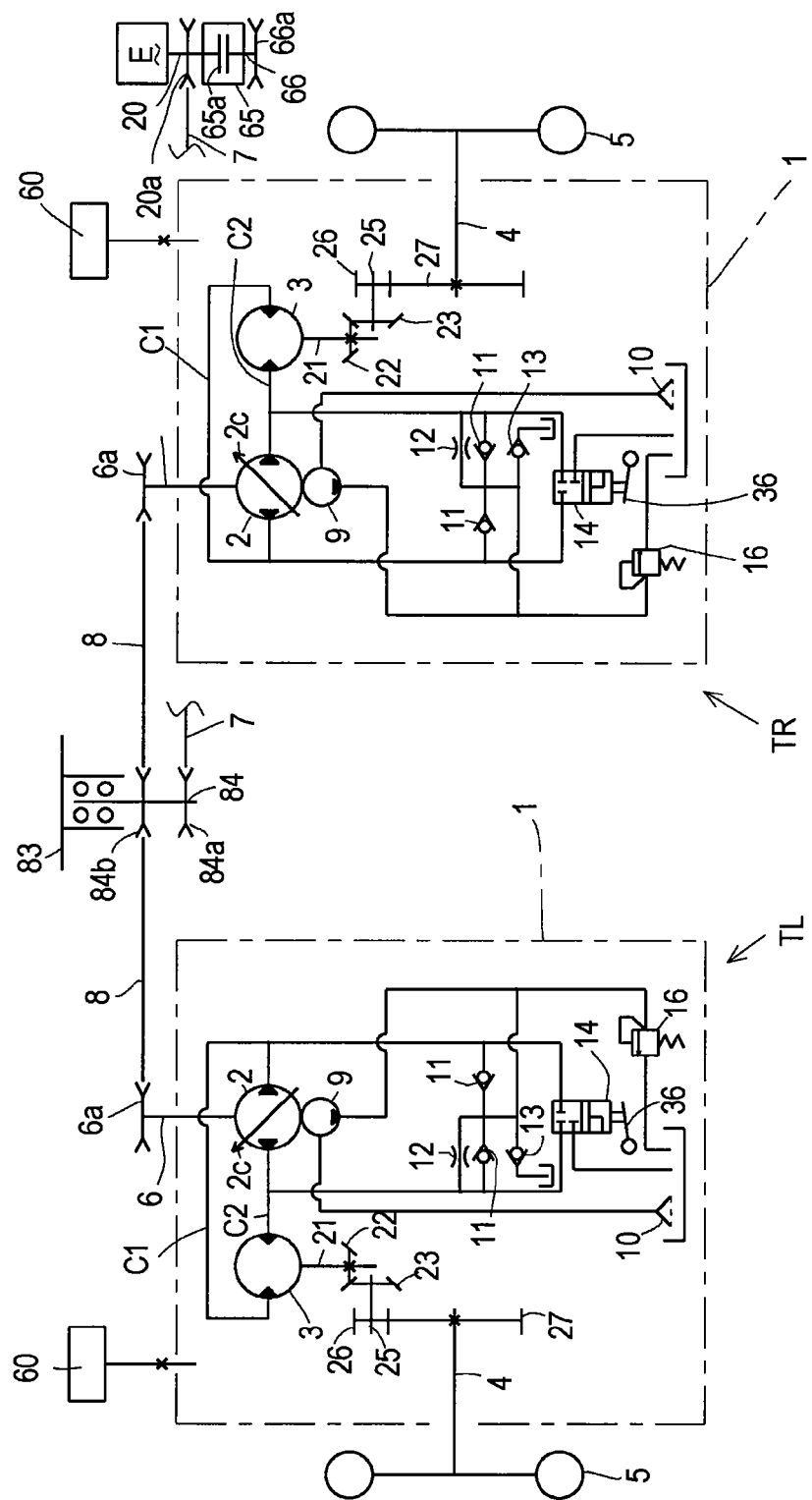
FIG. 6 is a diagram of a first hydraulic circuit for a working vehicle according to the invention.

The HST in each housing 1 is constituted by fluidly connecting hydraulic pump 2 and motor 3 to each other through a pair of fluid passages C1 and C2. The HST of FIG. 6 is provided with a charge pump 9 driven together with hydraulic pump 2 by rotating pump shaft 6. Alternatively, charge pump 9 may be removed as discussed later.

In each of transaxles TL and TR, charge pump 9 sucks fluid from the fluid sump in corresponding housing 1 through a fluid filter 10. The delivery fluid from charge pump 9 is regulated by a charge relief valve 16, and is supplied through charge check valves 11 to the closed fluid circuit (i.e., lower-pressurized one of fluid passages C1 and C2) between hydraulic pump 2 and motor 3 of the corresponding HST. Fluid released from charge relief valve 16 is returned to the fluid sump.

In each of housings 1, a neutral-zone expanding fluid passage, including an orifice 12, and charge check valve 11 corresponding to fluid passage C2 adapted to be higher-pressurized during backward traveling are connected in parallel to fluid passage C2 so as to return fluid to the upstream side of charge check valves 11 through orifice 12 when the vehicle travels backward. Therefore, even when a movable swash plate 8 of hydraulic pump 2 is disposed in a low-speed backward traveling range adjacent to the neutral position, the hydraulic pressure in fluid passage C2 is not increased to a level for driving hydraulic motor 3. In other words, the neutral zone of the HST is expanded into its essential low-speed backward traveling zone.

Charge check valves 11 are connected at their upstream sides to the fluid sump through a freewheel-prevention fluid passage including a check valve 13. When the engine is stationary and one of fluid passages C1 and C2 is hydraulically depressed, check valve 13 is opened to suck fluid from the fluid sump so as to constantly fulfill the closed fluid circuit with fluid. The freewheel-prevention fluid passage including check valve 13 is provided for preventing hydraulic motor 3 from rotating following wheel 5 when the vehicle is parked on a slope.

To enable hydraulic motor 3 to rotate following wheel 5 when the vehicle is towed, a bypass valve 14 is disposed in each of the closed fluid circuits. Bypass valve 14 can be manually switched between an opened valve position and a closed valve position (by operating a bypass lever 36). Bypass valve 14 is normally set at the closed valve position. Bypass valve 13 is set to the opened valve position at need so as to join fluid flows from both fluid passages C1 and C2 to each other and return the joined fluid to the fluid sump in housing 1, thereby allowing hydraulic motor 3 to act as a pump in fluid passages C1 and C2 and to rotate following wheel 5.

In the HST of each of transaxles TL and TR, hydraulic motor 3 is driven by the delivery fluid from hydraulic pump 2 driven by engine E, and the reversible tilt direction and angle of movable swash plate 2c of hydraulic pump 2 is controlled so as to control the rotary speed and direction of hydraulic motor 3 (a motor shaft 21). By operating control levers 82L and 82R, when both movable swash plates 2c are tilted to equal angles in the same direction, axles 4 of respective transaxles TL and TR are rotated at equal speeds in the same direction so that the vehicle travels straight forward or backward. When movable swash plates 2c are tilted to different angles, axles 4 are differentially rotated (at different rotary speeds, or in different rotary directions) so as to turn the vehicle left or right.

Figure 7:
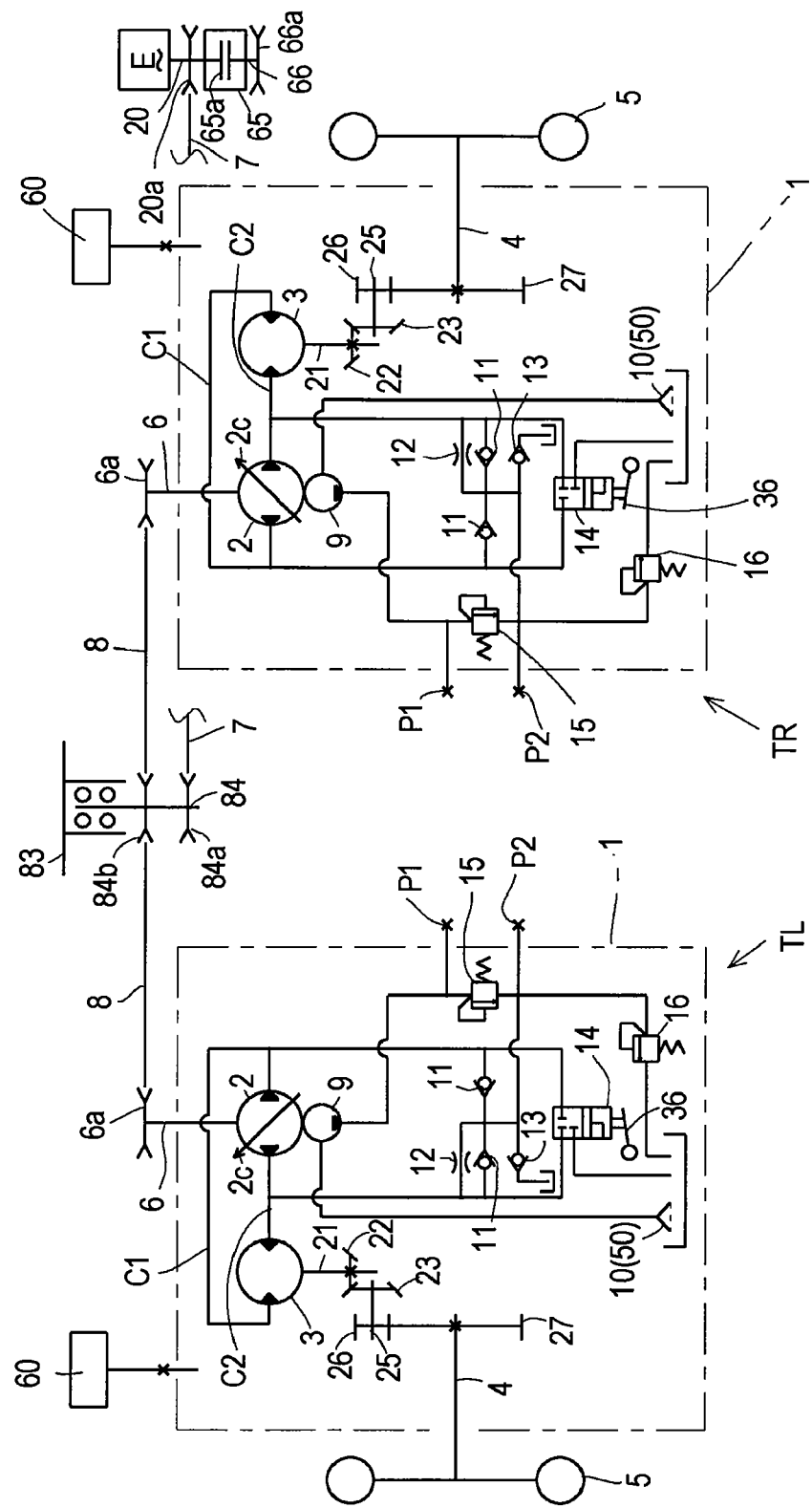
FIG. 7 is a diagram of a second hydraulic circuit for a working vehicle according to the invention.

Housings 1 of respective transaxles TL and TR shown in FIG. 6 may be processed correspondingly to a hydraulic drive system shown in FIG. 7, so that each housing 1 includes a hydraulic pressure extraction port P1 and a hydraulic pressure returning port P2 so as to supply the delivery fluid of charge pump 9 from housing 1 to an external hydraulic implement (e.g., a hydraulic actuator for lifting a working device, such as a mower, attached to the vehicle, or clutch 65a if it is a hydraulic clutch) disposed on the outside of corresponding housing 1. In this hydraulic drive system, an implement relief valve 15 is disposed in each housing 1 so as to regulate the hydraulic pressure of fluid supplied from charge pump 9 through port P1 to the external hydraulic implement. The fluid returned from the external hydraulic implement is introduced into housing 1 through port P2 so as to be supplied to the HST closed fluid circuit through charge check valves 11. The processing of housing 1 to have ports P1 and P2 for the hydraulic circuit shown in FIG. 7 will be detailed later.

A configuration of transaxle T (a generic name of left and right transaxles TL and TR) will be described with reference to FIGS. 8 to 22. Incidentally, transaxles TL and TR have a common configuration except that axles 4 of respective transaxles TL and TR are extended in laterally opposite directions. In FIGS. 8 to 22, right transaxle TR having rightward extended axle 4 is referred to as transaxle T. Hereinafter, description of transaxle T is based on the assumption that pump shaft 6 and motor shaft 21 are extended vertically, and the HST is disposed in front of axle 4. The terms "laterally proximal" and "laterally distal" are referred to on the assumption that the lateral center of the vehicle (between transaxles TL and TR) is centered, unless a special mention is required.

Figure 18:
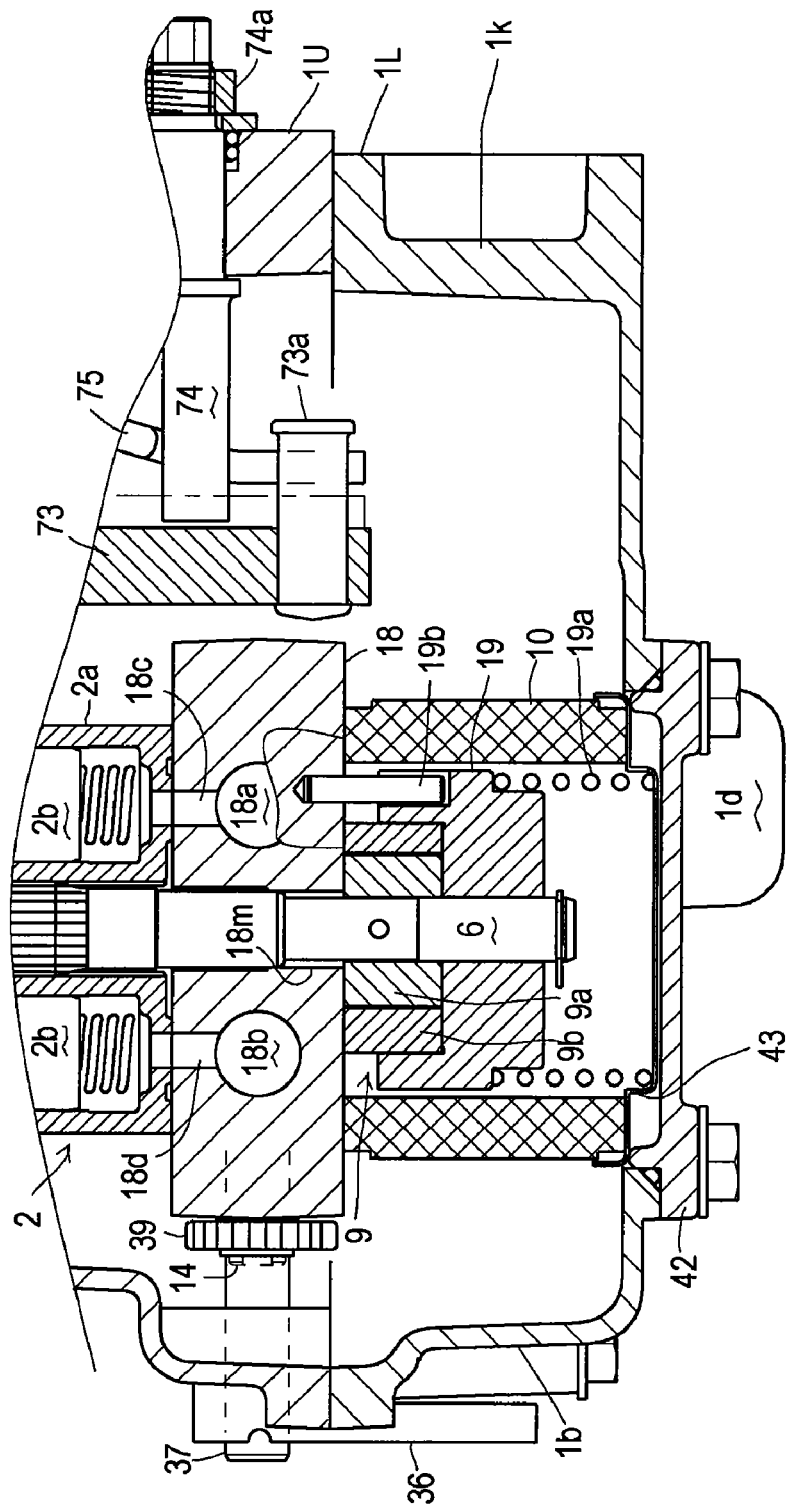
FIG. 18 is a sectional front view of a principal portion of transaxle T, provided with a second fluid supply system having a charge pump.
Figure 19:
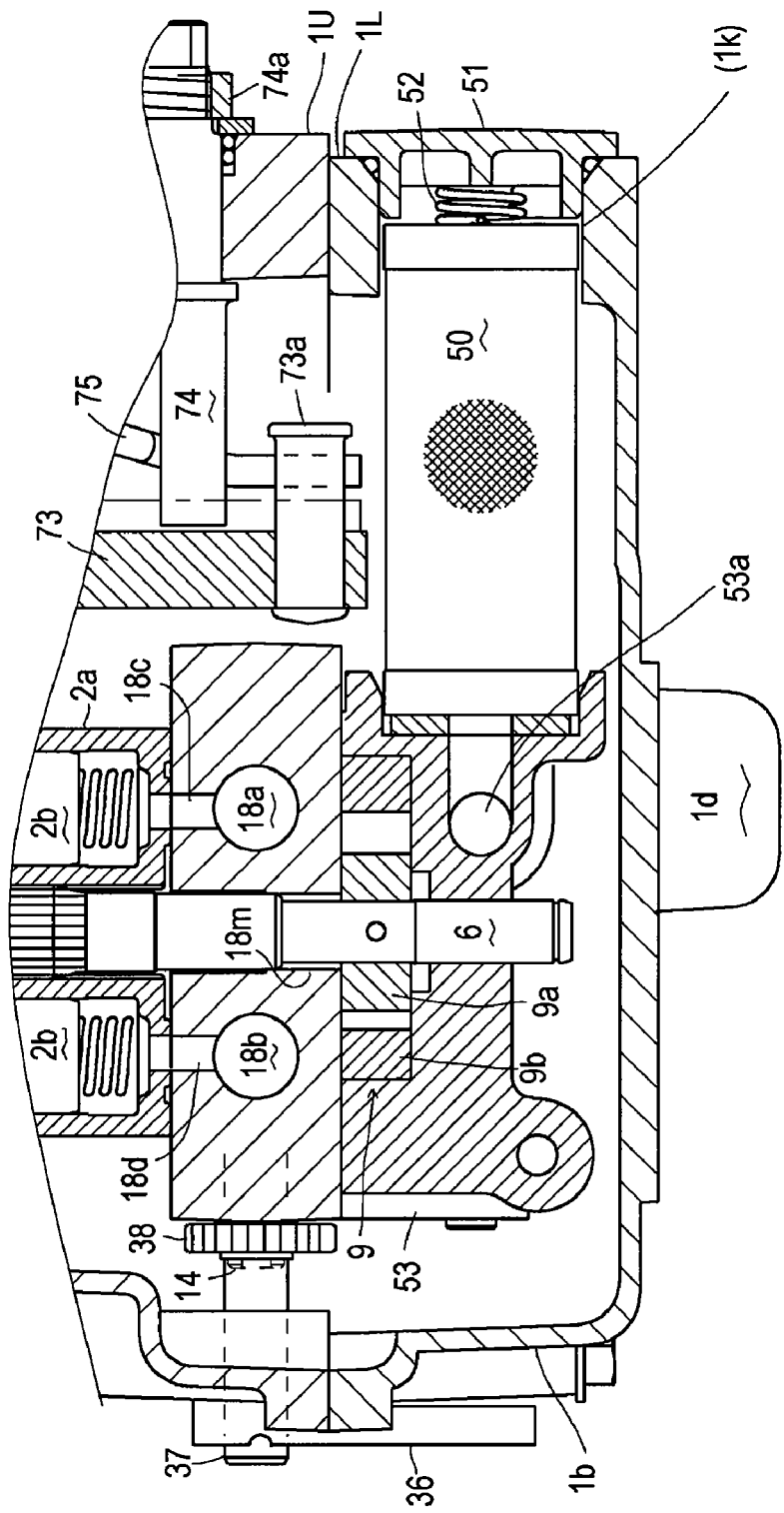
FIG. 19 is a sectional front view of a principal portion of transaxle T, provided with a third fluid supply system having a charge pump.
Figure 20:
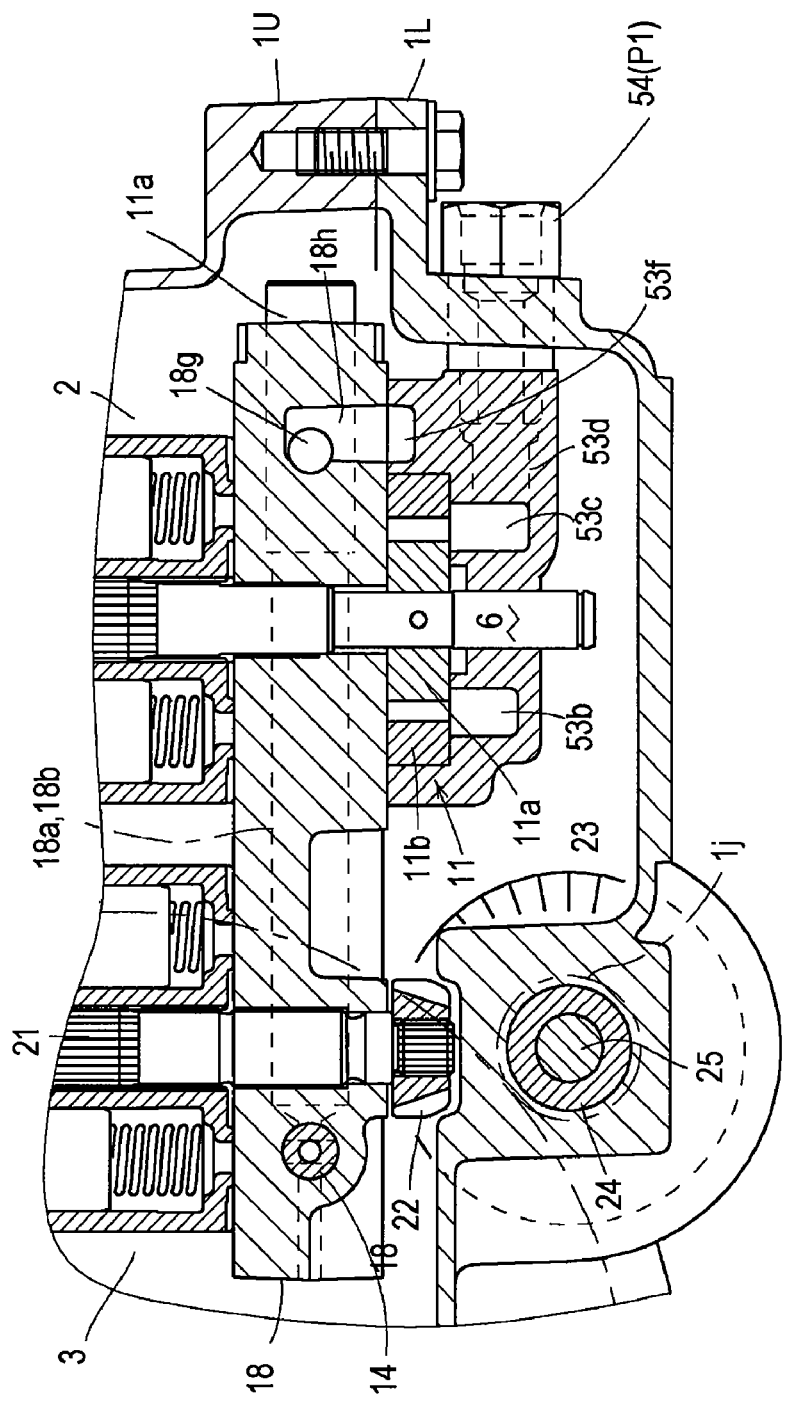
FIG. 20 is a sectional left side view of the principal portion of transaxle T, provided with the third fluid supply system.
Figure 21:
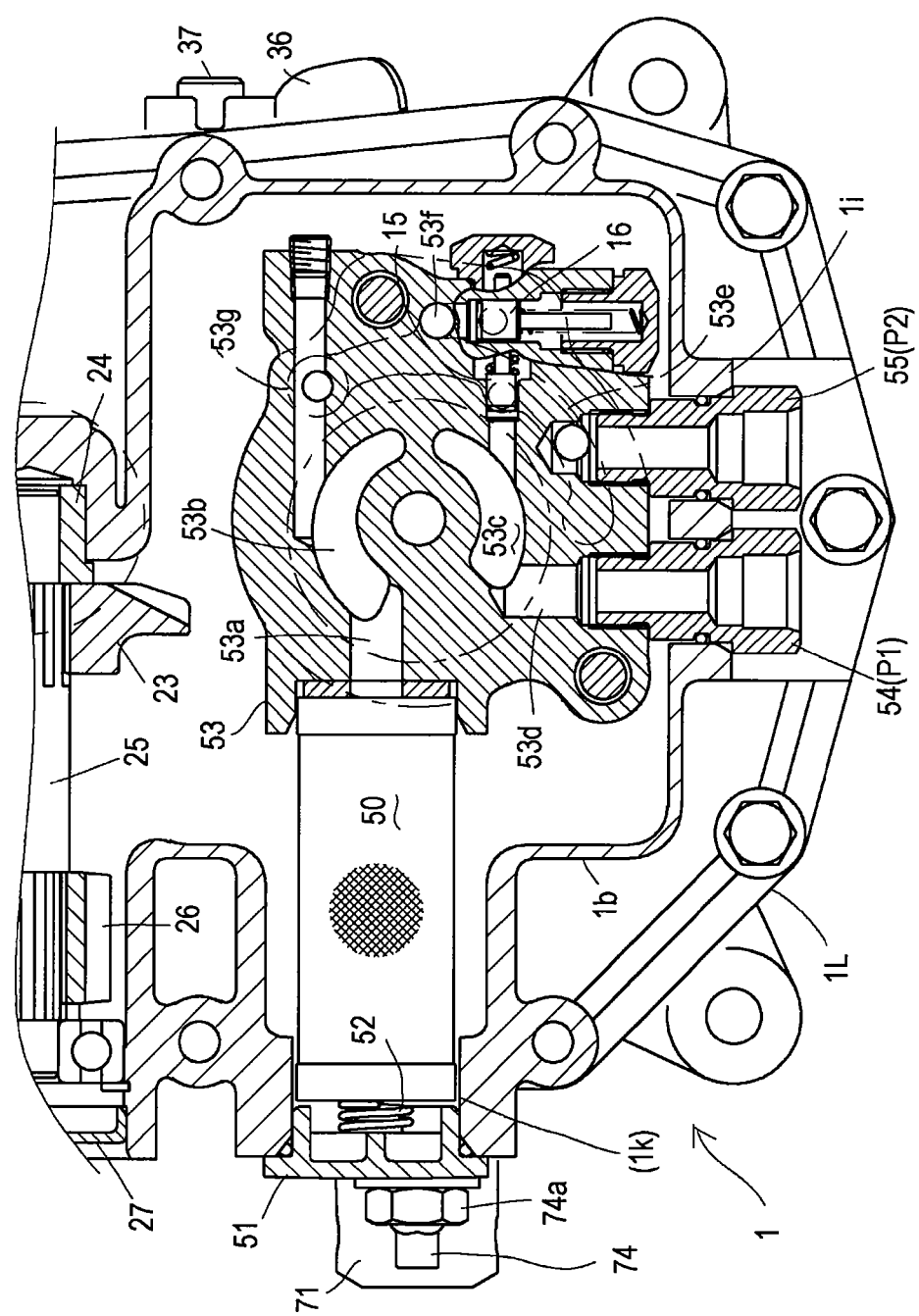
FIG. 21 is a sectional bottom view of the principal portion of transaxle T, provided with the third fluid supply system.

Transaxle T can be easily modified to have one of some different fluid supply systems. A fluid supply system of transaxle T shown in FIGS. 8 to 17 is referred to as a first fluid supply system, which does not extract hydraulic pressure fluid supplied to an external hydraulic implement as shown in FIG. 6. That is, in the first fluid supply system, fluid for operating the HST circulates in only its housing 1. Further, the first fluid supply system includes no charge pump 9 shown in FIG. 6. FIG. 18 illustrates transaxle T having a second fluid supply system including charge pump 9 disposed in housing 1. FIGS. 19 to 21 illustrate transaxle T having a third fluid supply system, in which housing 1 incorporates charge pump 9 and is provided with ports to be connected to an external hydraulic implement through pipes. Firstly, transaxle T having the first fluid supply system will be described with reference to FIGS. 8 to 17.

Figure 8:
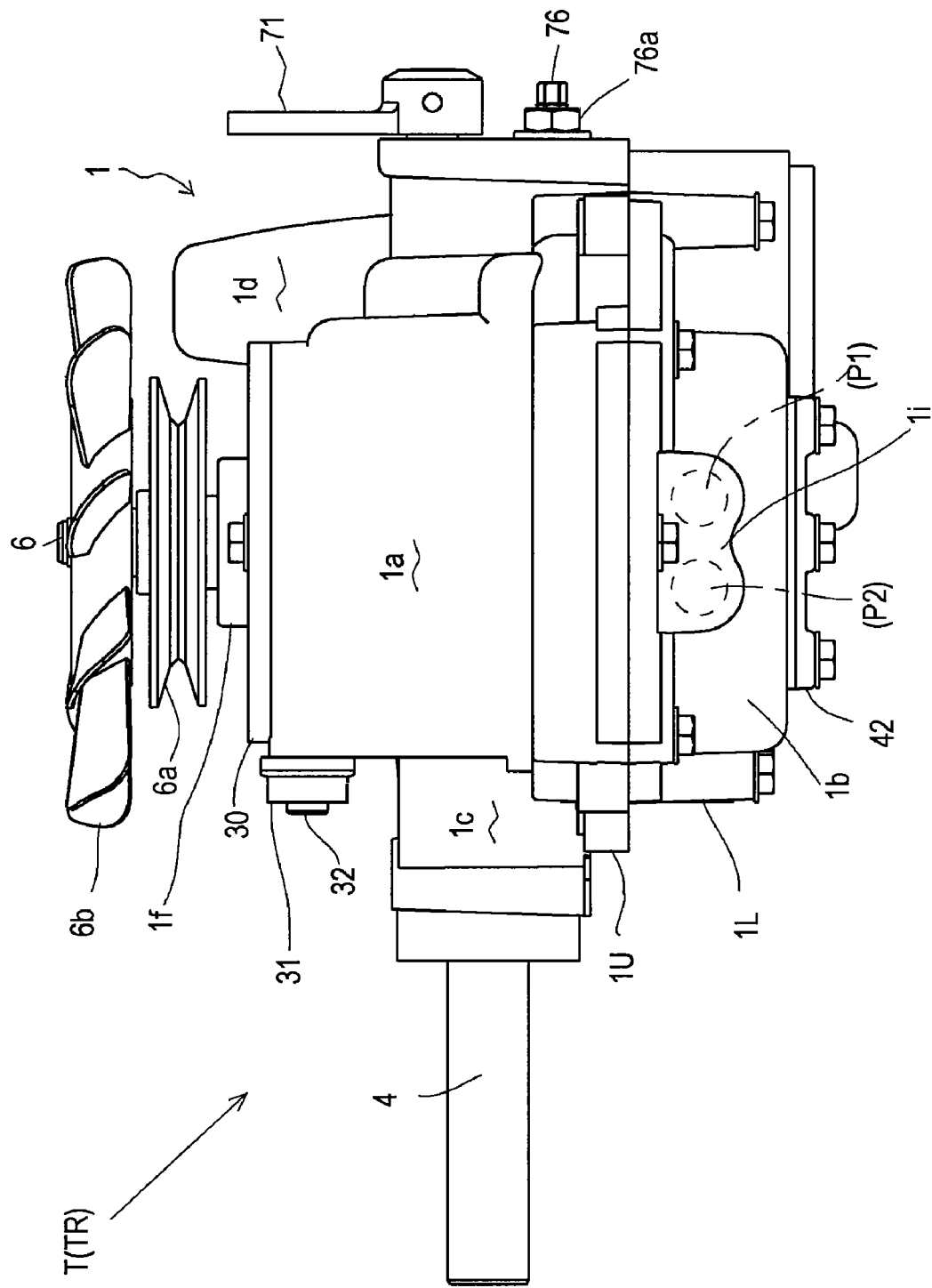
FIG. 8 is a front view of transaxle T (right transaxle TR) including vertical axial pump and motor, provided with a first fluid supply system having no charge pump.
Figure 9:
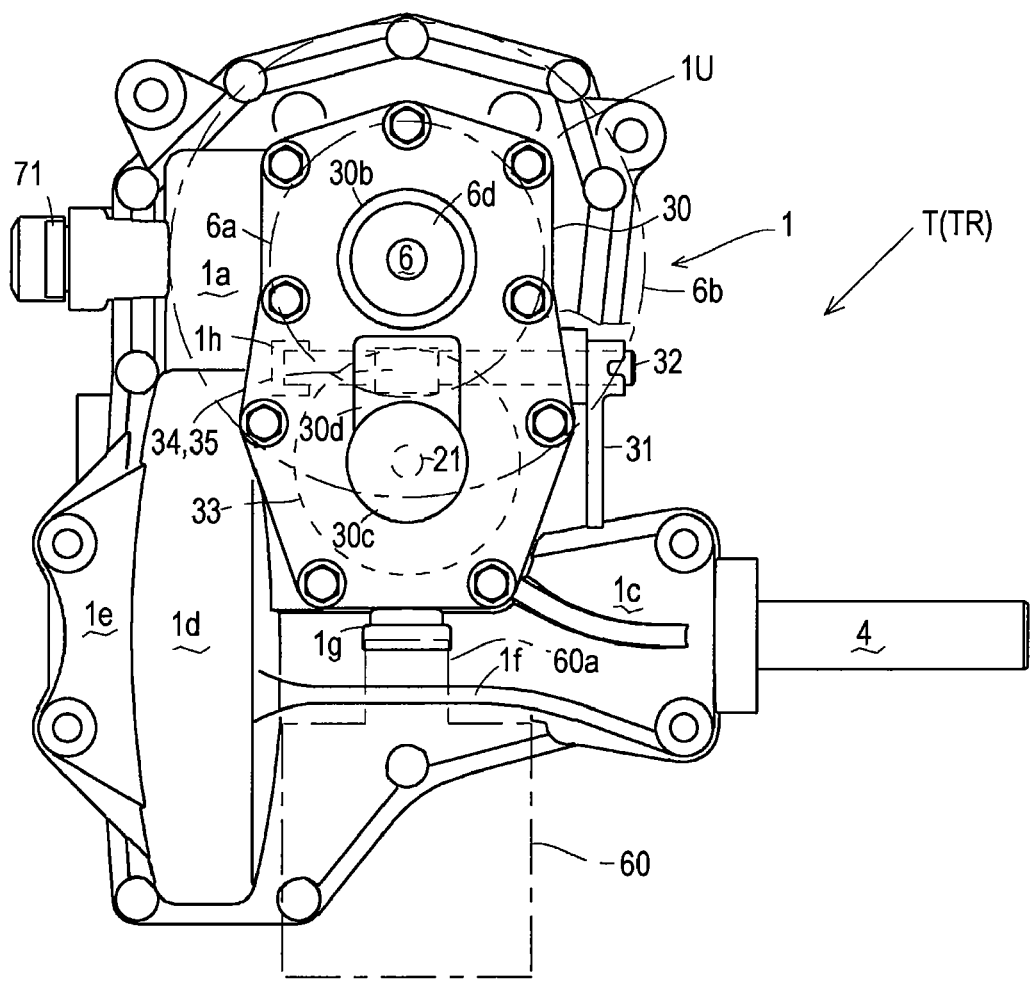
FIG. 9 is a plan view of transaxle T.
Figure 10:
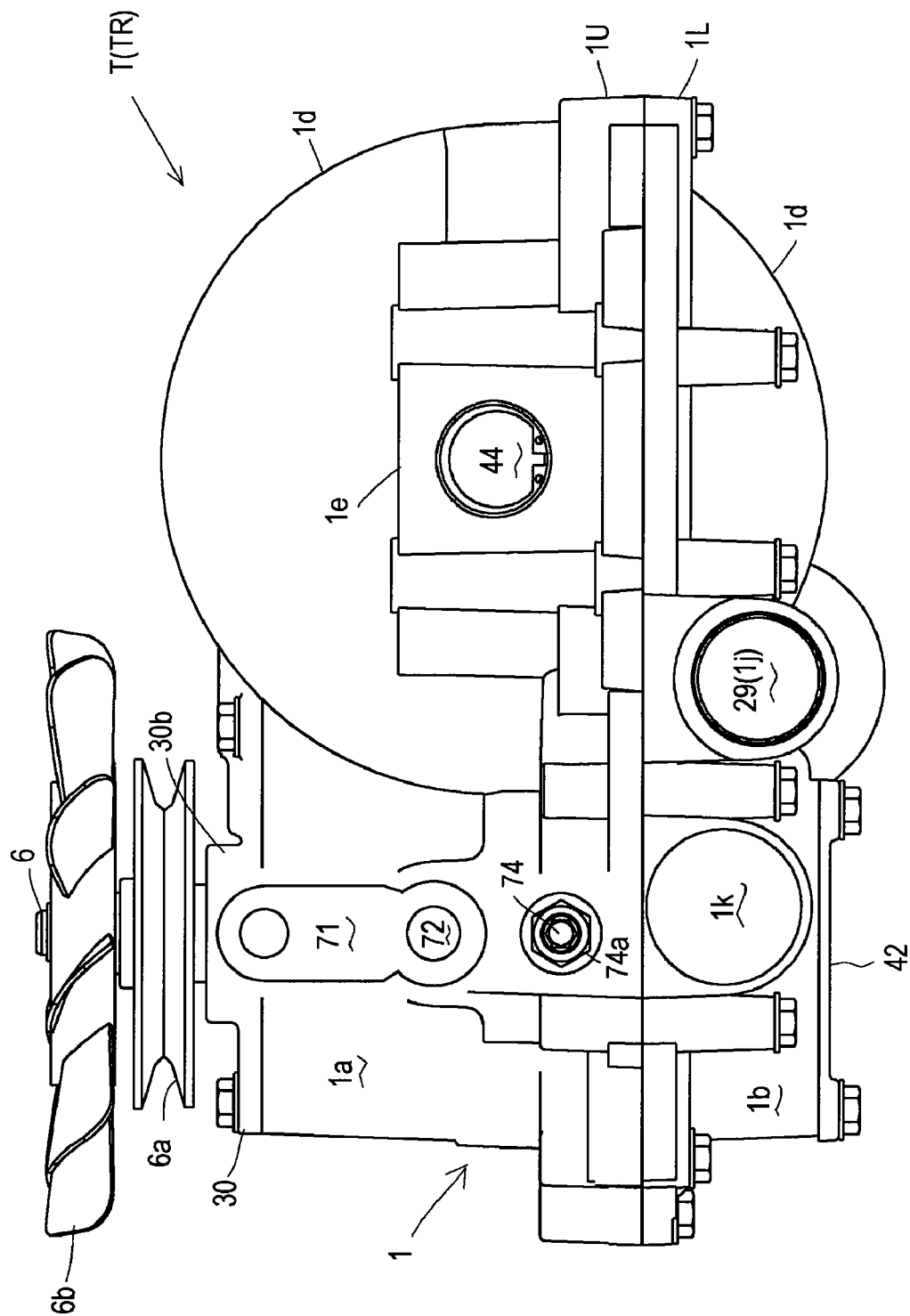
FIG. 10 is a left side view of transaxle T.
Figure 11:
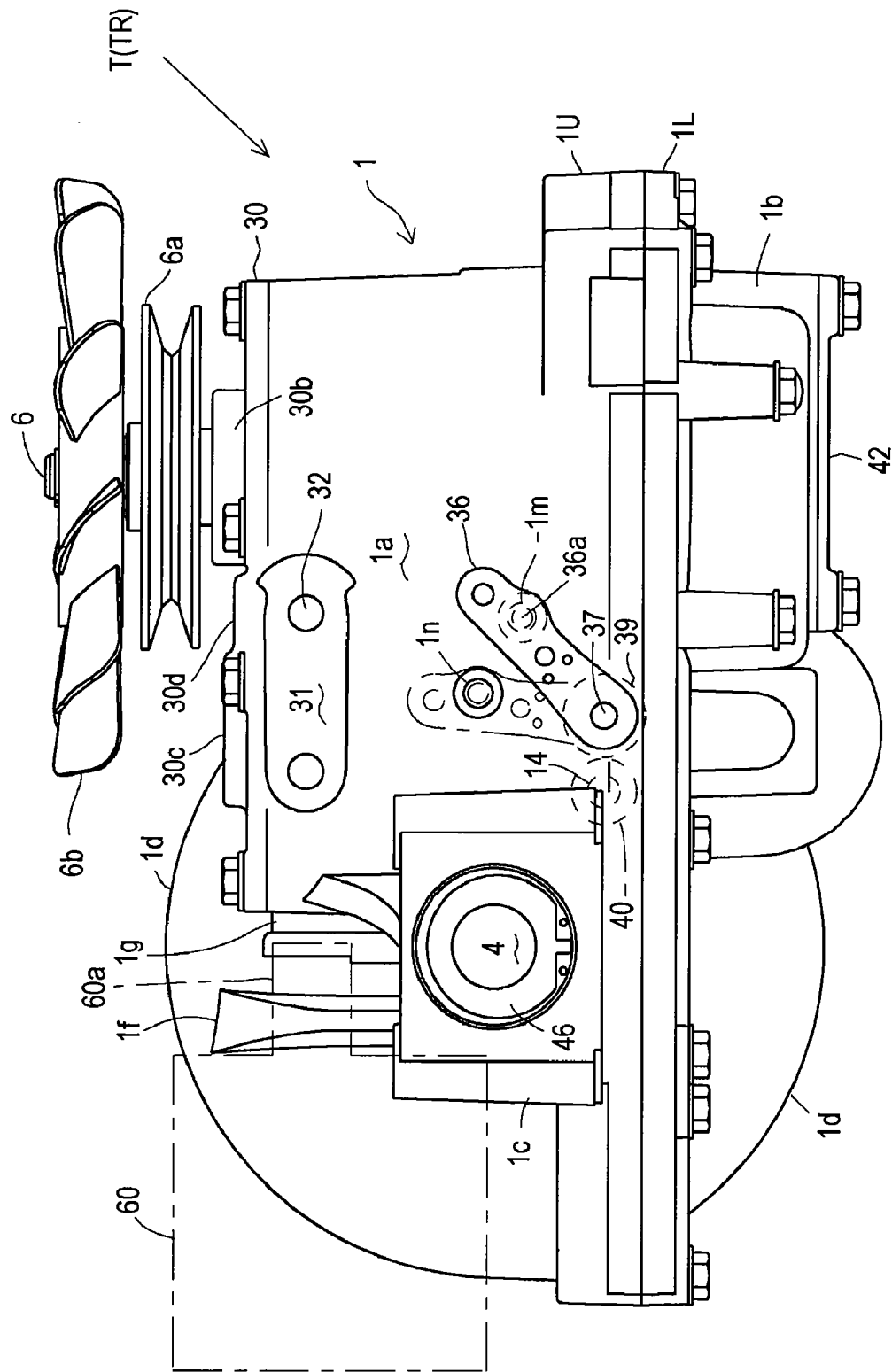
FIG. 11 is a right side view of transaxle T.

Housing 1 is constituted by vertically joining an upper housing member 1U and a lower housing member 1L through a horizontal joint surface by bolts, as shown in FIGS. 8 to 11. A main portion of upper housing member 1U is formed as an HST chamber 1a incorporating hydraulic pump 2, hydraulic motor 3, a later-discussed center section 18 and others, as show in FIG. 13 and others. Above-mentioned axle bearing portion 1c is formed of only upper housing member 1U, as shown in FIG. 11 and others. A round shaft hole of axle bearing portion 1c for inserting axle 4 is drilled sidewise in upper housing member 1U. As shown in FIG. 10 and others, upper housing member 1U is formed with above-mentioned bull gear casing portion 1d laterally opposite to axle bearing portion 1c. A similar round hole is also drilled in above-mentioned connection plate fixture portion 1e formed outward from bull gear casing portion 1d (laterally proximally with respect to vehicle 100) so as to support the laterally proximal end of axle 4. As understood from FIG. 14, axle bearing portion 1c is provided therein with a bearing 47 adjacent to its outer end so as to support an intermediate portion of axle 4, and as shown in FIGS. 14 and 11, a fluid seal 46 seals a gap between axle 4 and upper housing member 1e. As shown in FIG. 14, axle 4 is journalled at its laterally proximal end in the hole formed in connection plate fixture portion 1e through a sleeve-shaped bearing 45. An outward (laterally proximal with respect to vehicle 100) opening of this hole is plugged by a seal cap 44 shown in FIGS. 10 and 14.

Figure 15:
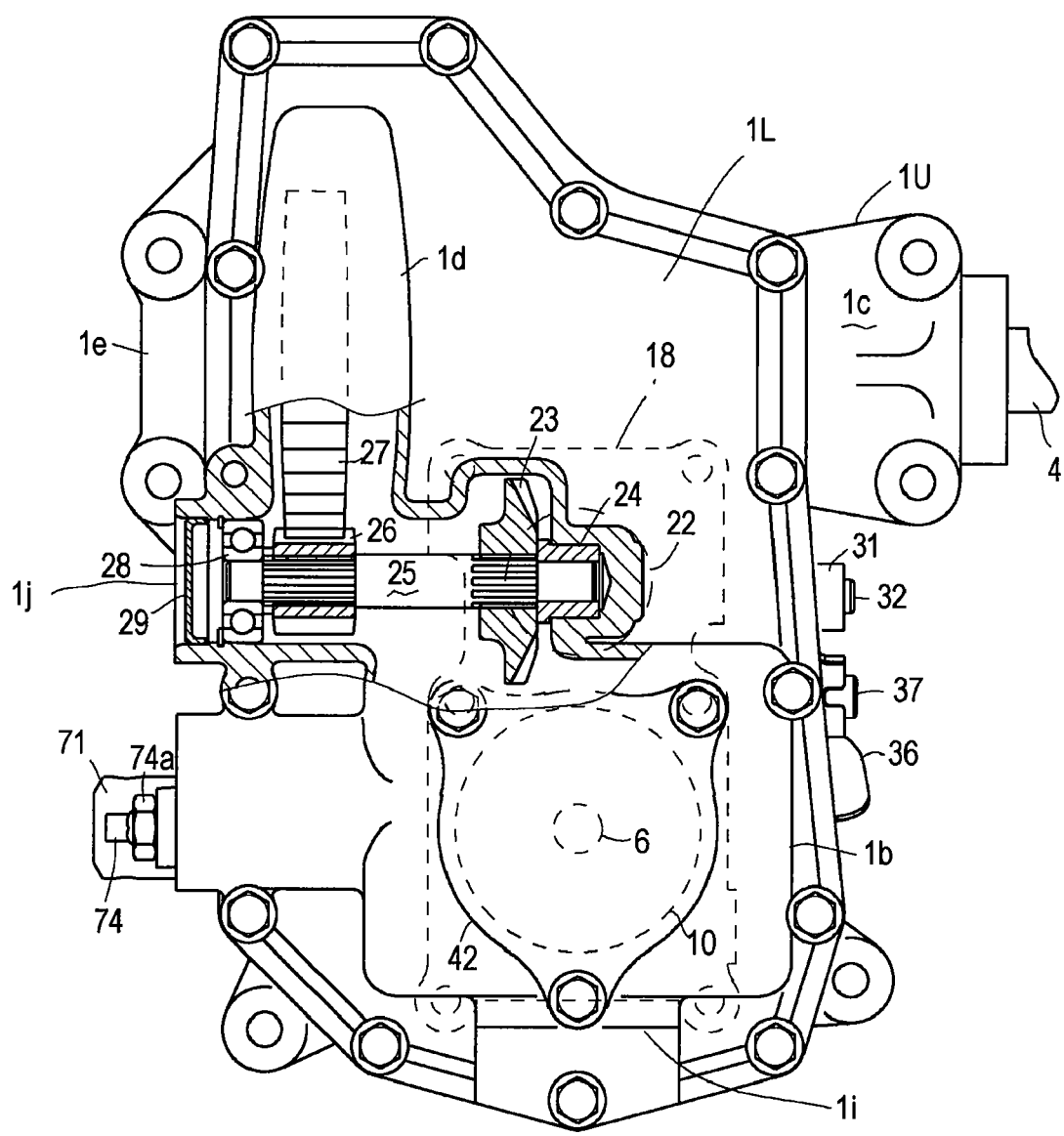
FIG. 15 is a bottom view partly in section of transaxle T.
Figure 16:
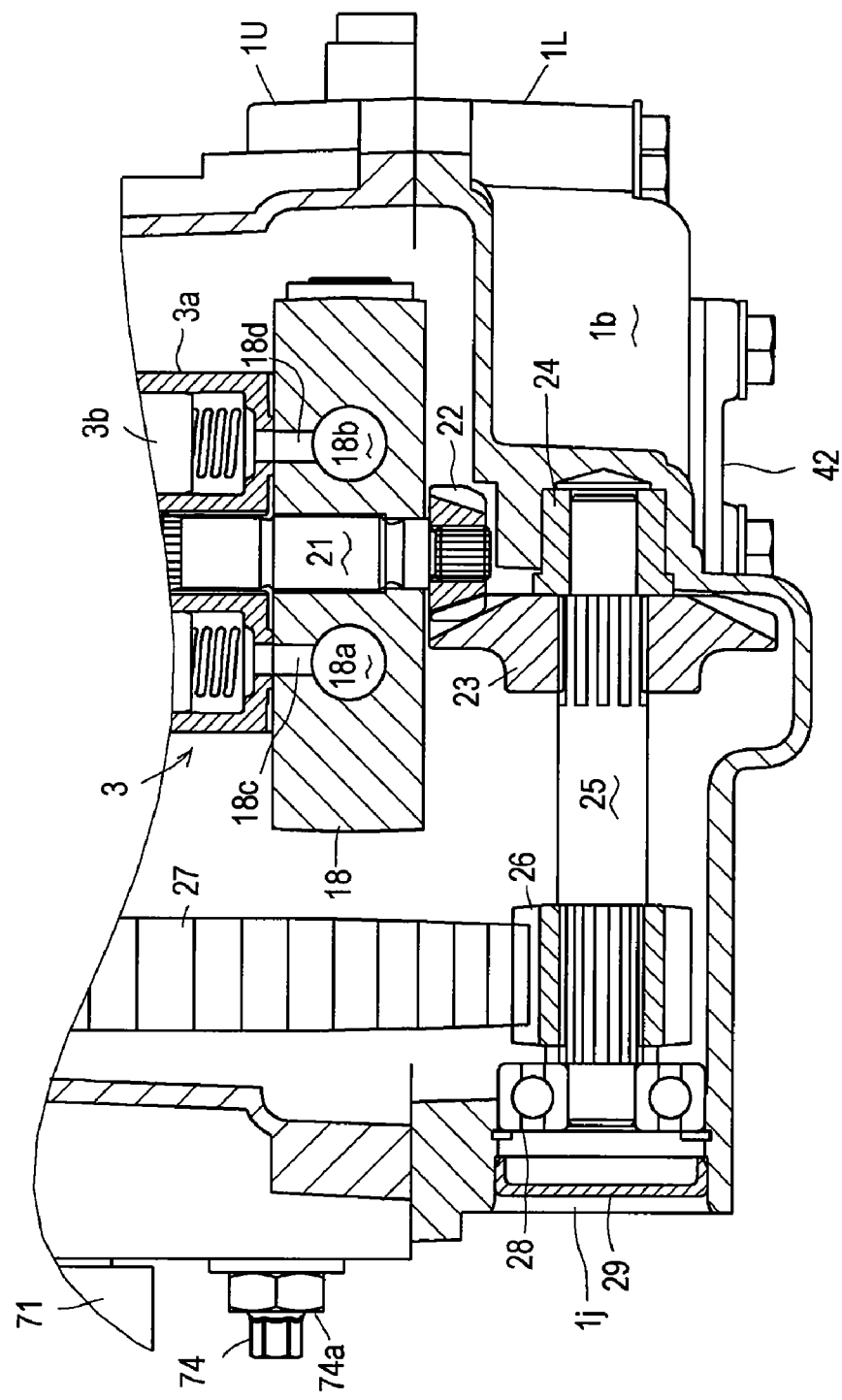
FIG. 16 is a sectional rear view of a portion of transaxle T incorporating a deceleration gear train.

In lower housing member 1L, the bottom of bull gear casing portion 1d is shaped arcuately as shown in FIG. 10 and others, and the arcuate bottom of bull gear casing portion 1d is drilled with a round hole 1j for journaling an inner end portion of a counter shaft 25, similar to the drilling of the shaft hole for axle 4. Counter shaft 25 is used for constituting the deceleration gear train interposed between hydraulic motor 3 and axle 4. As shown in FIGS. 15 and 16, counter shaft 25 is disposed laterally horizontally (in parallel to axle 4). The inner end of counter shaft 25 is journalled in this hole through a bearing 28. An outward opening of this hole is plugged by a seal cap 29 as shown in FIGS. 10, 15 and 16. Counter shaft 25 is journalled at its outer end through a sleeve-shaped bearing 24 in a closed bearing portion formed by expanding a part of lower housing member 1L.

As mentioned above, each of the respective shaft holes for axle 4 and counter shaft 25 is not vertically dividable between upper and lower housing divisional members, however, it is formed by drilling only one of the upper and lower housing divisional members (i.e., the shaft hole for axle 4 is drilled in upper housing member 1U, and the shaft hole for counter shaft 25 is drilled in lower housing member 1L), thereby being prevented from deviating caused by an error of joining the upper and lower housing divisional members.

Here, the deceleration gear train in housing 1 will be described. As shown in FIGS. 14 to 16, in bull gear casing portion 1d formed of upper and lower housing members 1U and 1L, bull gear 27 is spline-fitted on a portion of axle 4 journalled in upper housing member 1U adjacent to its inner end. As shown in FIGS. 15 and 16, a bevel gear 23 and a final pinion 26 are spline-fitted on counter shaft 25 journalled in lower housing member 1L. Final pinion 26 meshes with bull gear 27, as shown in FIGS. 15 and 16. Bevel gear 23 meshes with a bevel motor gear 22 fixed on motor shaft 21 of later-detailed hydraulic motor 3, as shown in FIG. 16.

The HST will be described. In housing 1, horizontal plate-shaped center section 18 as shown in FIGS. 12 to 17 is disposed in front of axle 4. On the horizontal upper surface of center section 18, a pump mounting surface is formed at a front portion thereof, and a motor mounting surface is formed at a rear portion thereof. Kidney ports 18c and 18d are opened at the pump mounting surface, and kidney ports 18e and 18f are opened at the motor mounting surface. A vertical pump shaft hole 18m for inserting the pump shaft penetrates center section 18 between kidney ports 18c and 18d for hydraulic pump 2. A vertical motor shaft hole 18n for inserting the motor shaft penetrates center section 18 between kidney ports 18e and 18f for hydraulic motor 3. A fore-and-aft horizontal fluid hole 18a is bored in center section 18 so as to connect kidney ports 18c and 18d to each other. A fore-and-aft horizontal fluid hole 18b is bored in center section 18 and is disposed laterally parallel to fluid hole 18a, so as to connect kidney ports 18e and 18f to each other. Fluid holes 18a and 18b serve as respective fluid passages C1 and C2 shown in FIGS. 6 and 7.

Figure 13:
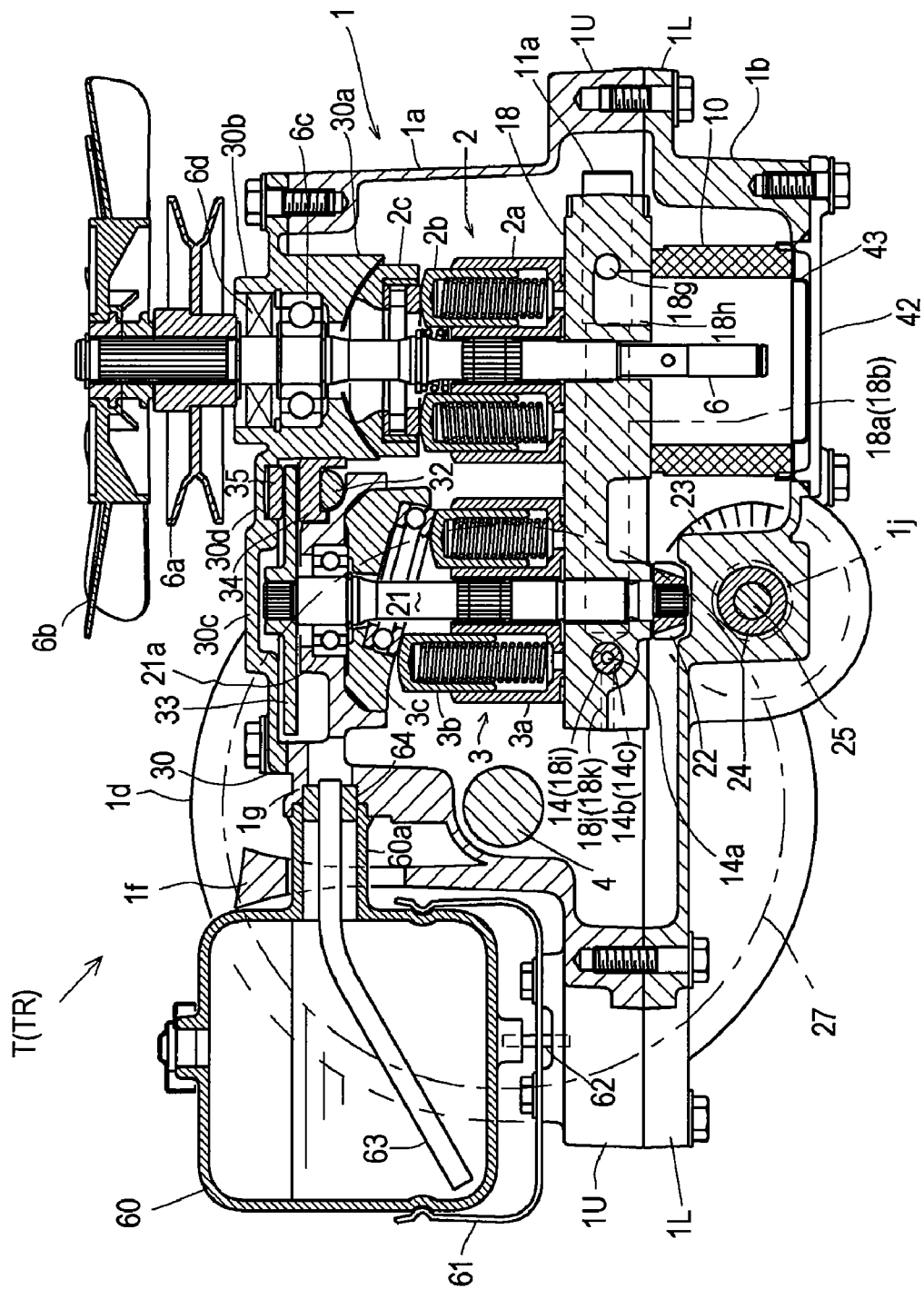
FIG. 13 is a sectional left side view of transaxle T.
Figure 14:
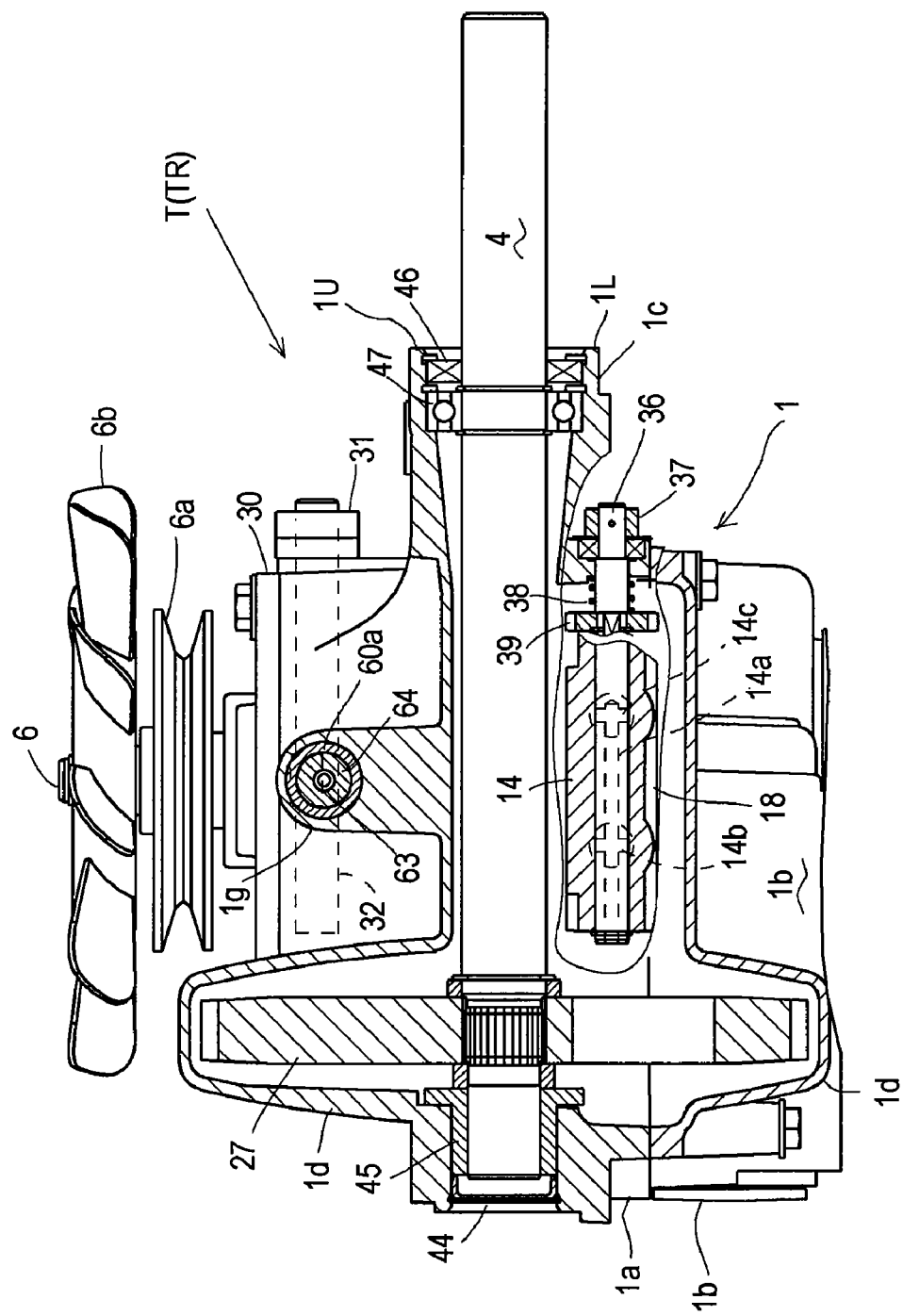
FIG. 14 is a sectional rear view of transaxle T.
Figure 17:
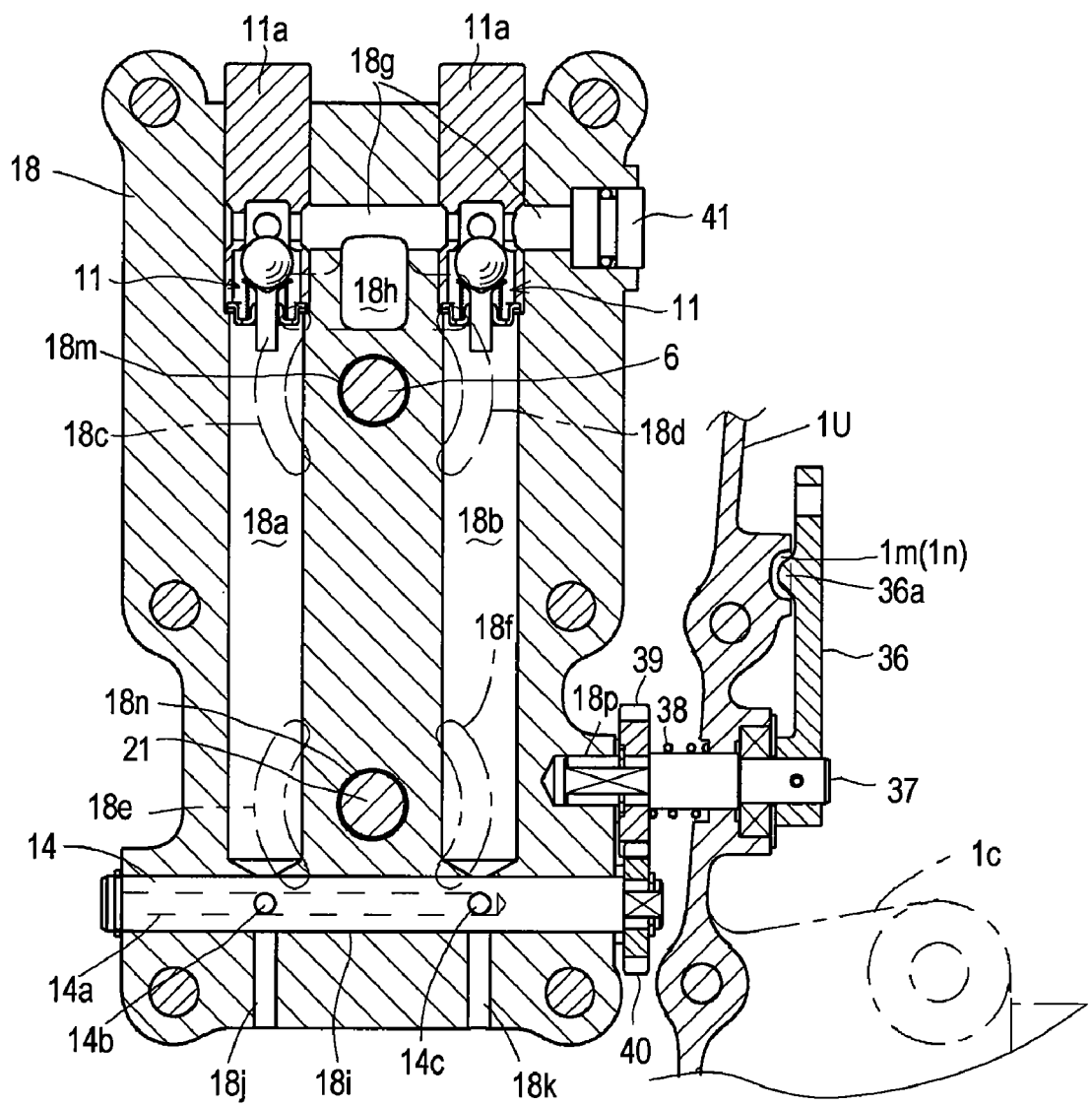
FIG. 17 is a sectional plan view of a center section 18 of transaxle T with a bypass valve 14 and an operation mechanism of bypass valve 14.

As shown in FIGS. 13, 17 and others, fluid holes 18a and 18b have respective front ends opened outward from center section 18, and plugged by respective charge check valve casings 11a incorporating respective charge check valves 11. Fluid holes 18a and 18b are connected to each other through a lateral fluid hole 18g through ports formed in respective charge check valve casings 11a. A downward opened suction port 18h is bored in center section 18, and is connected to a lateral middle portion of fluid hole 18g just in front of pump shaft hole 18m. Fluid hole 18g is opened at its one end on one of left and right sides of center section 18, and is plugged by a seal cap 41. Therefore, when one of fluid holes 18a and 18b is hydraulically depressed, charge check valve 11 corresponding to the depressed fluid hole is pushed by the hydraulic pressure fluid supplied into suction port 18h from the fluid sump in housing 1, thereby being opened.

Figure 12:
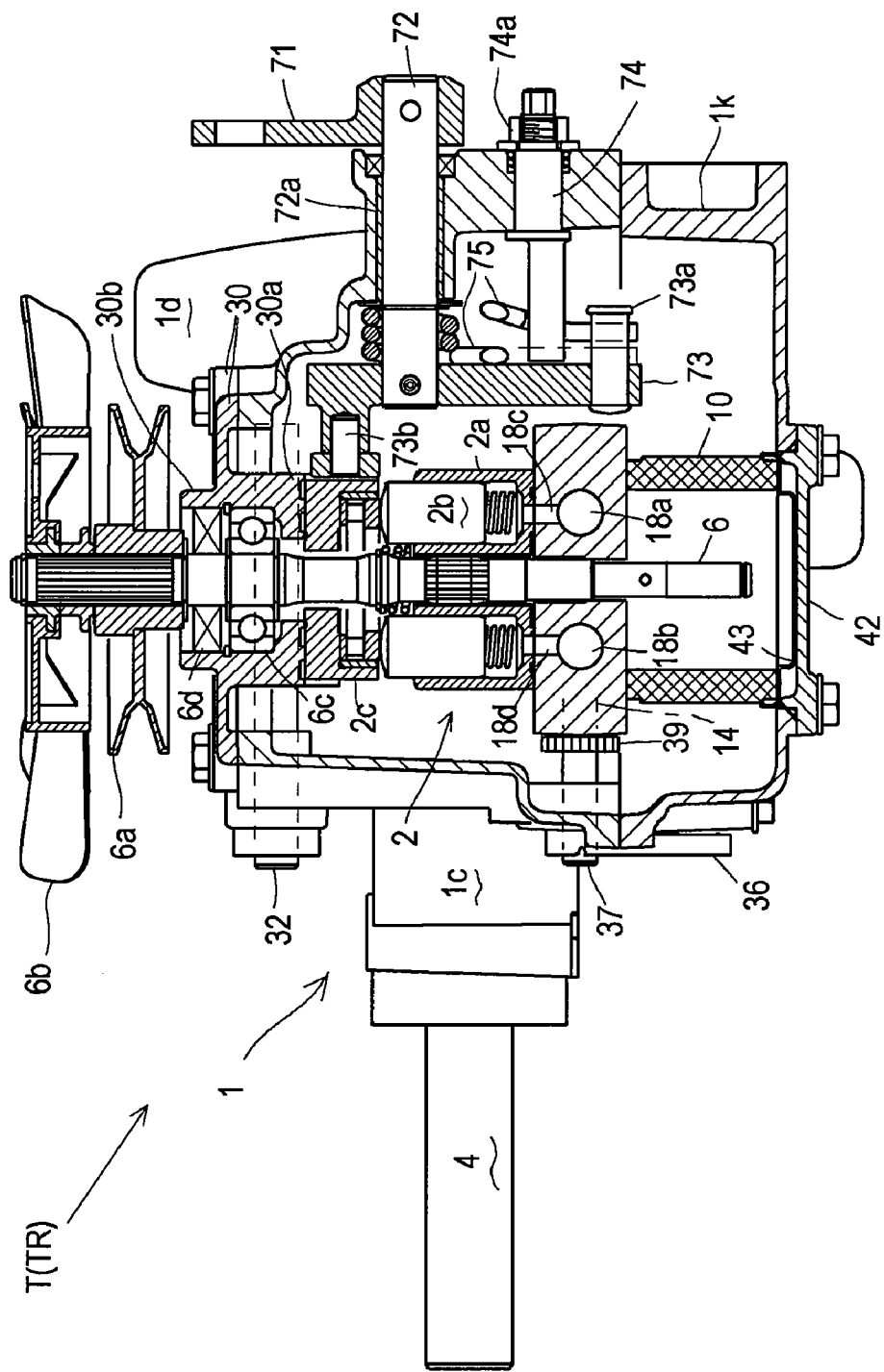
FIG. 12 is a sectional front view of transaxle T.

As shown in FIGS. 12, 13, 15 and others, a portion of lower housing member 1L below hydraulic pump 2 disposed in housing 1 is expanded downward so as to serve as an oil pan portion 1b. A bottom opening of oil pan portion 1b is covered with a cap 42 fastened to the bottom surface of oil pan portion 1b by bolts. In the state where center section 18 is disposed in housing 1, as shown in FIGS. 12, 13 and others, vertical cylindrical fluid filter 10 is interposed between a top surface of cap 42 and a bottom surface of center section 18 in housing 1. A plate-shaped fluid filter retainer 43 is engaged to cap 42, and fluid filter 10 is fitted at its bottom end into fluid filter retainer 43. Suction port 18h is opened into the inner space (i.e., the fluid sump) in cylindrical fluid filter 10. In this way, fluid in housing 1 is filtrated by fluid filter 10, and is supplied from suction port 18h to the HST closed fluid circuit through charge check valve 11.

A charge pump is normally fitted onto the bottom of center section 18 in the vertical cylindrical fluid filter 10. However, in this embodiment, no charge pump is disposed, and the hydraulic depression of either fluid passage C1 or C2 during action of the HST sucks fluid from the fluid sump to the closed fluid circuit. As shown in FIGS. 12 and 13, a lower portion of vertical pump shaft (input shaft) 6 fitted in pump shaft hole 18m of center section 18 is extended downward from the bottom surface of center section 18, so as to be able to serve as a drive shaft for the charge pump. Therefore, pump shaft (input shaft) 6 does not have to be exchanged whether the charge pump is attached or not.

A circular-discoid fluid filter insertion portion 1k is formed in a laterally proximal outer wall of lower housing member 1L. To install a later-discussed horizontal cylindrical fluid filter 50 shown in FIGS. 19 and 21 into housing 1, fluid filter insertion portion 1k is bored and opened so as to easily have a penetrating hole between the inner and outer sides of housing 1 for inserting fluid filter 50 into housing 1.

As shown in FIG. 8 and others, an outer port portion 1i is formed in a front wall of lower housing member 1L. A pair of left and right bosses are formed on outer port portion 1i so as to be extended fore-and-aft horizontally, and to be closed at outer (front) ends thereof by an outer wall integral with lower housing member 1L. To make the above-mentioned fluid supply system for supplying fluid from housing 1 to the external hydraulic implement, the outer end walls of the bosses are bored and opened so as to easily constitute a delivery port P1 and a suction port P2 which penetrate housing 1 between the inside and outside thereof.

In this way, only by the boring, housing 1 used for the first fluid supply system (having neither charge pump nor pipes to an external hydraulic implement) as shown in FIGS. 8 to 17 can also be used as the later-discussed third fluid supply system (having a charge pump and pipes to an external hydraulic implement), so as to be advantageous in economy.

Referring to FIG. 17 and others, portions of fluid holes 18a and 18b adjacent to rear ends of kidney ports 18e and 18f are narrowed so as to serve as respective diametrically small drain holes 18j and 18k opened outward at a rear end surface of center section 18. A lateral horizontal valve hole 18i penetrates center section 18 so as to connect the drain holes to each other. A columnar rotary valve serving as bypass valve 14 is slidably rotatably fitted into valve hole 18i, as shown in FIGS. 13, 14, 17 and others. Bypass valve 14 is bored therein with an axial hole 14a and radial penetrating port holes 14b and 14c extended from axial hole 14a.

An opened valve position of bypass valve 14 is defined as a position where port hole 14b connects fluid holes 18a and 18j to each other, and port hole 14c connects fluid holes 18b and 18k to each other. FIGS. 13, 14 and 17 illustrates the condition of bypass valve 14 set at the opened valve position. In this condition, fluid holes 18a and 18b (fluid passages C1 and C2) are connected to each other through port holes 14b and 14c and axial hole 14a. Also, fluid holes 18a and 18b (fluid passages C1 and C2) are opened at the rear end of center section 18 through respective port holes 14b and 14c and respective drain holes 18j and 18k, thereby draining fluid from the HST closed fluid circuit (fluid passages C1 and C2) to the fluid sump in housing 1. Due to the opening of bypass valve 14, the hydraulic braking action in the HST close circuit is diminished, whereby rear wheels 5 of vehicle 100 are allowed to smoothly rotate without receiving the hydraulic brake when vehicle 100 is towed.

A closed valve position of bypass valve 14 is defined as a position where open ends of port hole 14b are disconnected from fluid holes 18a and 18j, and open ends of port hole 14c are disconnected from fluid holes 18b and 18k, more specifically, where bypass valve 14 is rotated 90 degrees from the opened valve position. Normally, i.e., unless fluid has to be drained from the HST closed circuit in an urgent case, bypass valve 14 is disposed at the closed valve position.

As shown in FIGS. 11, 17 and others, an end of bypass valve 14 projects outward from center section 18, and a gear 40 is fixed on the projecting end of bypass valve 14. Center section 18 is bored therein with a shaft hole 18p, which is extended in parallel to valve hole 18i and is opened at one end thereof. A bypass operation shaft 37 is extended in parallel to bypass valve 14, and is slidably rotatably fitted at an end thereof into shaft hole 18p. A gear 39 is fixed on bypass operation shaft 37 outside of center section 18, and meshes with gear 40. In the state that center section 18 is disposed in housing 1, a spring 38 is wound around bypass operation shaft 37 and interposed between gear 39 and an inside surface of an outer wall of housing 1 (upper housing member 1U) so as to apply an appropriate load onto bypass operation lever 36 against an operation force.

As shown in FIGS. 11, 12, 14 and 17, bypass operation shaft 37 is passed through a shaft hole penetrating the outer wall of upper housing member 1U (just in front of axle bearing portion 1c), and projects outward from housing 1 so as to be fixedly provided thereon with bypass operation lever 36. By manipulating bypass operation lever 36 to rotate bypass operation shaft 37, bypass valve 14 is rotated between the opened valve position and the closed valve position through gears 39 and 40. In this regard, the rotational angle of bypass valve 14 between the opened valve position and the closed valve position is 90 degrees. If the gear ratio between gears 39 and 40 is one to one, bypass operation lever 36 has to be rotated 90 degrees. To reduce the required rotational angle of bypass operation lever 36 and reduce its operational labor, gear 39 is diametrically larger than gear 40 (for example, the diameter of gear 39 is three times as large as that of gear 40), so that bypass valve 14 can be rotated 90 degrees by rotating bypass operation lever 36 and bypass operation shaft 37 less than 90 degrees.

In FIG. 11, a position of bypass operation lever 36 drawn in solid lines is defined as a position thereof for closing bypass valve 14. A position of bypass operation lever 36 drawn in phantom lines is defined as a position thereof for opening bypass valve 14. As shown in FIGS. 11 and 17, detent holes 1m and 1n are opened at an outer side surface of upper housing member 1U, and a projection 36a is formed on bypass operation lever 36 so as to project toward housing 1. When bypass valve 14 is disposed at either the opened valve position or the closed valve position, projection 36a of bypass operation lever 36 is inserted into either detent hole 1m or 1n so as to retain bypass operation lever 36. Further, a pair of projections are formed on the outer side surface of the housing on opposite sides of bypass operation lever 36 so as to be adapted to contact bypass operation lever 36, thereby preventing bypass valve 14 from overrunning from the closed valve position or the opened valve position.

Hydraulic pump 2 and hydraulic motor 3 will be described. As shown in FIGS. 12, 13 and others, a cylinder block 2a of hydraulic pump 2 is slidably rotatably fitted onto the pump mounting surface on the upper surface of center section 18. A cylinder block 3a of hydraulic motor 3 is slidably rotatably fitted onto the motor mounting surface on the upper surface of center section 18. Pump cylinder block 2a is relatively unrotatably engaged on vertical pump shaft (input shaft) 6 disposed on the center axis portion of pump cylinder block 2a. Pump shaft 6 is rotatably inserted into pump shaft hole 18m in center section 18, and has the above-mentioned long portion extended downward from center section 18 so as to serve as a drive shaft for a charge pump when the charge pump is attached. Motor cylinder block 3a is relatively unrotatably engaged on vertical motor shaft 21 disposed on the center axis portion of motor cylinder block 3a. Motor shaft 21 is rotatably inserted into motor shaft hole 18n in center section 18, and has the lower end extended downward from center section 18. As shown in FIGS. 13 and 16, bevel motor gear 22 is fixed on the downward projecting end of motor shaft 21 and meshes with gear 23 fixed on counter shaft 25, as mentioned above.

As shown in FIGS. 12, 13 and others, in hydraulic pump 2, pistons 2b are vertically reciprocally slidably fitted in cylinder block 2a around pump shaft 6, and are pressed at tops thereof against a bottom surface of cradle type movable swash plate 2c. In hydraulic motor 3, pistons 3b are vertically reciprocally slidably fitted in cylinder block 3a around motor shaft 21, and are pressed at tops thereof against a bottom surface of fixed swash plate 3c. As shown in FIGS. 9, 12, 13 and others, a top cover 30 is fastened onto a top surface of upper housing member 1U by bolts so as to cover the top opening of upper housing member 1U. A part of top cover 30 serves as a swash plate guide portion 30a for slidably guiding movable swash plate 2c of hydraulic pump 2. Swash plate guide portion 30a is formed at its bottom surface with an arcuate liner when viewed in side, and the liner is slidably fitted onto an arcuate upper surface of movable swash plate 2c. Fixed swash plate 3c is fixedly retained by a ceiling wall of upper housing member 1U disposed just under top cover 30.

Preferably, the liner of swash plate guide portion 30a for sliding movable swash plate 2c, and the portion of movable swash plate 2c slidably fitted to the liner are plated with PTFE (Teflon, DUPON's registered trade mark) compounded with electroless nickel or with electroless nickel-phosphorous. The film formed by the plating is excellent in smoothness, abrasive resistance, noncohesivity, repellency and others, so as to ensure prolonged smooth movement of movable swash plate 2c. Preferably, for the plating, Teflon particle is not larger than 3 micron in size, and the film is not smaller than 5 micron in thickness.

Further, they can be heated after the plating so as to have increased surface hardness, thereby having further improved abrasive resistance. Preferably, the heating temperature is not smaller than 250 degrees Celsius, thereby enabling the surface hardness to be not smaller than Hv 450. Further preferably, the film compound to be heated includes 20 vol % Teflon (PTFE).

Due to such treatment of swash plate guide portion 30a and/or movable swash plate 2c, the proper action of movable swash plate 2c according to operating corresponding speed control lever 82L or 82R (for example, matching of the neutral position of movable swash plate 2c with the actual neutral state of hydraulic pump 2) is ensured for a long term so as to provide greatly reliable transaxle T.

As shown in FIGS. 12, 13 and others, central portions of movable swash plate 2c and swash plate guide portion 30a are formed with respective vertical penetrating holes so as to freely rotatably pass pump shaft 6 projecting upward from cylinder block 2a. Further, as shown in FIGS. 9, 12 and 13, top cover 30 is formed with a cylindrical bearing portion 30b just above swash plate guide portion 30a. Pump shaft 6 is passed through a bearing 6c and a fluid seal 6d disposed in bearing portion 30b and projects upward so as to serve as above-mentioned input shaft 6, on which input pulley 6a and cooling fan 6b are fixed as mentioned above.

Figure 22:
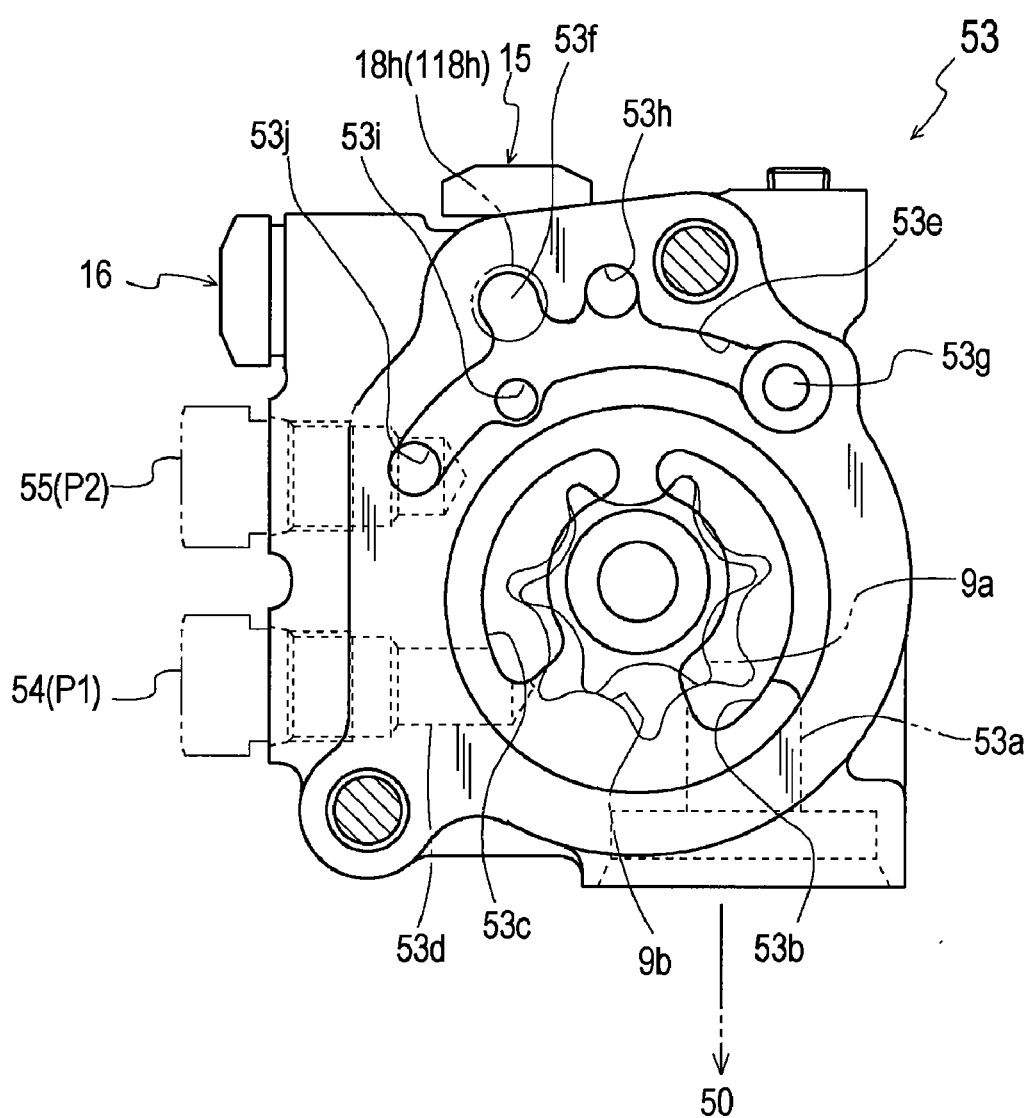
FIG. 22 is a plan view of a charge pump housing of the third fluid supply system.
Figure 23:
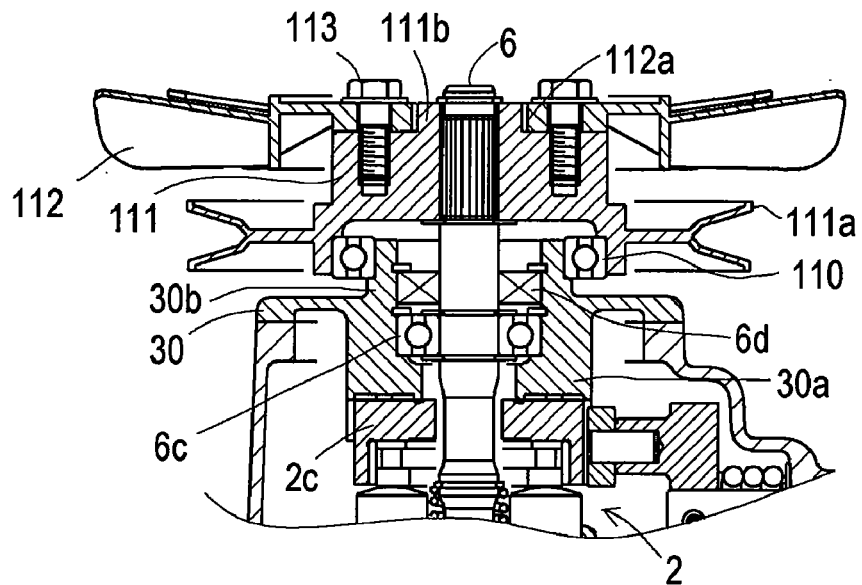
FIG. 23 is a fragmentary sectional front view of transaxle T, provided with an alternative configuration supporting a cooling fan and an input pulley on a pump shaft.

Referring to FIG. 23, an alternative configuration for supporting an input pulley and a cooling fan onto pump shaft 6 is provided. In the embodiment shown in FIG. 22, a block 111 is relatively rotatably fitted and supported at a lower end portion thereof onto bearing portion 30b of top cover 30 through a bearing 110, and an input pulley 111a is peripherally formed integrally on the lower end portion of block 111. The upward projecting of pump shaft 6 from top cover 30 is fixedly inserted into an upper portion of block 111. Therefore, bearing 110 absorbs a belt tension transmitted to input pulley 111a so as to reduce the transmission of the belt tension to the upper portion of block 111 and pump shaft 6. Consequently, the diameter of pump shaft 6 required to be large enough to resist the belt tension can be small.

Further, in the embodiment of FIG. 23, an upward columnar projection 111b is formed on a top portion of block 111. Projection 111b is fitted into a center hole 112a of a cooling fan 112, and cooling fan 112 is fastened to block 111 by bolts 113, so as to relatively unrotatably engage cooling fan 112 together with input pulley 111a onto pump shaft 6. In this way, while input pulley 111a and cooling fan 112 are vertically aligned, input pulley 111a is disposed on the outer periphery of bearing portion 30b of top cover 30, i.e., input pulley 111a is vertically overlapped with bearing portion 30b so as to reduce the height occupied by cooling fan 112 and input pulley 111a above transaxle T. Therefore, the configuration shown in FIG. 23 is convenient for arranging transaxle T in a space below (horizontal plate portion 79b of) vehicle frame 79 with a limited clearance.

As shown in FIG. 13 and others, a space between a wall of upper housing member 1U just above fixed swash plate 3c and top cover 30 covering the top of upper housing member 1U serves as a brake chamber. Motor shaft 21 is freely rotatably passed through fixed swash plate 3c, and the top of motor shaft 21 is extended into the brake chamber through a bearing 21a disposed in the top wall of upper housing member 1U. A horizontal brake disk 33 is fixed on the top of motor shaft 21 in the brake chamber. As shown in FIGS. 9, 13 and others, upper cover 30 is formed with a motor shaft casing portion 30c which projects upward so as to incorporate the projecting top portion of motor shaft 21. Top cover 30 is formed with a brake holding portion 30d extended horizontally forward from a part of motor shaft casing portion 30c (toward bearing portion 30b). As shown in FIG. 13, a brake pad 35 is engaged slightly vertically slidably between brake holding portion 30d and an upper surface of brake disk 33 under brake holding portion 30d.

As shown in FIGS. 9, 12, 14 and others, a brake operation shaft 32 is extended laterally horizontally (in parallel to axle 4), and is journalled by upper housing member 1U so as to be rotatably centered on its center axis. Brake operation shaft 32 has a laterally proximal end (opposite to the outer-projecting side of axle 4) slidably rotatably fitted into a recess 1h formed in a part of upper housing member 1U, as show in FIG. 8. Brake operation shaft 32 has a laterally distal end (on the outer-projecting side of axle 4) projecting outward from housing 1 (upper housing member 1U) so as to be fixedly provided thereon with brake lever 31, as shown in FIGS. 8, 9, 12, 14 and others. Brake lever 31 is operatively connected to a brake pedal 77 as mentioned above.

Brake operation shaft 32 is passed through a space in housing 1 just under brake pad 35 and bake disk 33, and is cut off at an upper half portion thereof just under brake disk 33 so as to have a cum surface. As shown in FIGS. 9, 13 and 14, a brake shoe 34 is slightly vertically slidably disposed in a space surrounded by a lower surface of brake disk 33, the top wall of upper housing member 1U, and swash plate guide portion 30a of top cover 30.

When brake lever 31 is disposed at an unbraking position, the cam surface of brake operation shaft 32 is horizontal, so that brake shoe 34 is disposed at the lowest position in its vertical slide range, thereby separating brake shoe 34, brake disk 33 and brake pad 35 from one another. When brake lever 31 is disposed at a braking position, the cam surface of brake operation shaft 32 is slanted so that one end of the cam surface rises to push brake shoe 34 upward, whereby brake disk 33 integral with motor shaft 21 is nipped between brake shoe 34 and brake pad 35, thereby stopping motor shaft 21 for stopping axle 4 and drive wheel 5.

As shown in FIG. 13, a rear portion of upper housing member 1U is L-shaped when viewed in side so as to have a vertical tank guide portion 1f. A tank-retaining plate spring 61, which is U-shaped when viewed in side, is fastened to the bottom surface of the L-shaped rear portion of upper housing member 1U by bolts, so as to retain reservoir tank 60 by the spring force of plate spring 61. A retaining pin 62 projects downward from a bottom surface of reservoir tank 60 so as to be fitted into a recess formed in a wall of upper housing member 1U therebelow, thereby fixing the position of reservoir tank 60.

Reservoir tank 60 mounted in this way has a left or right side surface along a side surface of bull gear casing portion 1d of upper housing member 1U, as shown in FIG. 5, and has a front surface along tank guide portion 1f, as shown in FIGS. 5 and 13. Reservoir tank 60 has a port 60a, which is extended forward through a hole formed in tank guide portion if and is fitted into a rearward opened port 1g formed in a wall of upper housing member 1U just in front of tank guide portion 1f. As shown in FIG. 13, port 1g is opened to the fluid sump in housing 1, in which the HST and others are submerged. Port 1g is also opened to the brake chamber formed between top cover 30 and the upper surface of upper housing member 1U just in front of port 1g. In other words, the wet brake configured in the brake chamber has high abrasive resistance, and reservoir tank 60 for absorbing and delivering fluid from and to the fluid sump in correspondence to the volumetric variation in housing 1 according to the HST action or the like also functions to supply lube to the wet brake. Therefore, fluid from reservoir tank 60 is efficiently supplied to the brake chamber through the very short port 1g.

Further, a siphon tube 63 is disposed in reservoir tank 60 for increasing the efficiency of reservoir tank 60 in absorbing and delivering fluid, as shown in FIG. 13. Siphon tube 63 is passed through port 60a and is inserted at an end thereof into port 1g of upper housing member 1U. A seal rubber 64 is blocked in an opening in the junction between ports 60a and 1g. Siphon tube 63 is inserted into port 1g through seal rubber 64.

A control mechanism for movable swash plate 2c of hydraulic pump 2, serving as a speed control device of transaxle T, will be described. As shown in FIG. 12 and others, a pump control shaft 72 is extended laterally horizontally (in parallel to axle 4), and projects outward from the laterally distal side surface of upper housing member 1U (the left side surface of left transaxle TL or the right side surface of right transaxle TR) so as to be fixedly provided thereon with speed control lever 71 connected to either control lever 82L or 82R. In housing 1, an inner arm 73 is fixed on pump control shaft 72, and is engaged to a side portion of movable swash plate 2c through an engaging pin 73b. Therefore, by operating control lever 82L or 82R, corresponding speed control lever 71 is fore-and-aft rotated so as to rotate pump control shaft 72 centered on its center axis, thereby tilting movable swash plate 2c along swash plate guide portion 30a formed on top cover 30 and centered on the axis of pump control shaft 72.

Incidentally, pump control shaft 72 is rotatably supported by the wall of upper housing member 1U through a bush 72a, as shown in FIG. 12. An inner peripheral surface of bush 72a slidably abuts against the outer peripheral surface of pump control shaft 72. Preferably, the inner peripheral surface of bush 72a is plated and heated so as to improve abrasive resistance thereof similar to the liner of swash plate guide portion 30a of top cover 30 for sliding movable swash plate 2c (and the slidable contacting portion of movable swash plate 2c) plated and heated after the plating. The outer peripheral surface of pump control shaft 72 contacting bush 72a can also be subjected to the same treatment. Further, inner arm 73 may be formed integrally with pump control shaft 72, and the surface of inner arm 73 may be plated and heated similarly.

In addition to the above-mentioned treatment of swash plate guide portion 30a, this treatment of pump control shaft 72 prolongs the proper and smooth rotation of pump control shaft 72 corresponding to the speed control operation. Consequently, the proper action of movable swash plate 2c corresponding to the speed control operation with control lever 82L or 82R (for example, matching of the neutral position of movable swash plate 2c with the actual neutral state of hydraulic pump 2) is ensured for a long term so as to provide greatly reliable transaxle T.

As shown in FIG. 12, a neutral returning spring 75 is wound around pump control shaft 72, and has both end portions, which cross each other at their intermediate portions and are extended in parallel to each other. Inner arm 73 is extended downward from pump control shaft 72 and has a pushing pin 73a projecting on a tip portion thereof. Further, as shown in FIGS. 10, 12 and others, a neutral positioning pin 74 is inserted into a laterally distal (on the outer-projecting side of axle 4) outer wall of upper housing member 1a below pump control shaft 72, and has a nut 74a screwed on its outer end so as to be fastened to upper housing member 1U.

As shown in FIG. 12, neutral positioning pin 74 and pushing pin 73a are nipped between the extended both end portions of neutral returning spring 75. By rotating pump control shaft 72 from the neutral position, movable swash plate 2c is tilted from the neutral position, and simultaneously, inner arm 73 and pushing pin 73a on inner arm 73 rotate together with pump control shaft 72 so as to push one end portion of neutral returning spring 75. For this while, the other end portion of neutral returning spring 75 is retained by neutral positioning pin 74 so that the gap between the both end portions of neutral returning spring 75 is widened so as to cause a biasing force for returning pump control shaft 72 and movable swash plate 2c to the neutral position. When the external force applied onto speed control lever 71 is loosened, due to the biasing force, pump control shaft 72, inner arm 73 and movable swash plate 2c are returned to the neutral position, and pushing pin 73a is nipped together with neutral positioning pin 74 between the both end portions of spring 75 again.

Incidentally, neutral positioning pin 74 is an eccentric pin. Nut 74a is loosened and neutral positioning pin 74 is rotated so as to adjust the position of spring 75 nipping neutral positioning pin 74 and pushing pin 73a between the both end portions thereof, i.e., the neutral position of inner arm 73, pump control shaft 72 and speed control lever 71, thereby eliminating deviation of the neutral position from an actual neutral position of movable swash plate 2c.

The configuration of transaxle T having the first fluid supply system shown in FIGS. 8 to 17 is concluded. Next, transaxle T with the second fluid supply system shown in FIG. 18 will be described. Transaxle T having the second fluid supply system is equal to transaxle T having the first fluid supply system modified to have charge pump 9 disposed in housing 1.

A charge pump housing 19 is disposed in vertical cylindrical fluid filter 10 and slightly vertically slidably engaged to center section 18 thereabove through an engaging pin 19b. Trochoidal charge pump 9 including an inner rotor 9a and an outer rotor 9b is disposed in charge pump housing 19. The above-mentioned downward extended portion of pump shaft 6 from center section 18 is rotatably supported in charge pump housing 19 so as to serve as a drive shaft of inner rotor 9a.

A spring 19a is interposed between fluid filter retainer 43 and the bottom surface of charge pump housing 19 so as to bias charge pump housing 19 upward. This upward biasing force defines the pressure of charge pump 9 (inner rotor 9a and outer rotor 9a) against the bottom surface of center section 18. As the pressure is increased, the fluid leak from the gap between center section 18 and charge pump 9 is reduced so as to increase the efficiency of charge pump 9 for charging fluid to the HST closed fluid circuit. Accordingly, the efficiency of charging fluid to the HST can be adjusted by adjusting the biasing force of spring 19a.

The suction port of charge pump 9 is opened to the fluid sump in fluid filter 10. The delivery port of charge pump 9 is connected to charge port 18h opened at the bottom surface of center section 18. In this way, the fluid in the fluid sump in housing 1, having been filtrated by fluid filter 10, is supplied to the HST closed fluid circuit through charge check valve 11 by charge pump 9. Due to the arrangement of charge pump 9, the hydraulic circuit of transaxles T (TL and TR) with respective charge pumps 9 is completed.

Description will now be given of transaxle T having the third fluid supply system shown in FIGS. 19 to 22. Transaxle T having the third fluid supply system is equal to transaxle T having the first fluid supply system modified so that charge pump 9 and ports P1 and P2 for supplying and exhausting fluid to and from an external hydraulic implement are disposed in housing 1, and that an alternative charge pump housing 53 and an alternative fluid filter 50, designed correspondingly to the third fluid supply system, are disposed in housing 1.

The walls of the left and right juxtaposed bosses formed at outer port portion 1$i$ on the front surface of housing 1 (upper housing member 1U) are bored so as to form respective openings. As shown in FIGS. 19, 21 and 22, port members 54 and 55 are fitted into the respective openings so as to serve as ports P1 and P2 for supplying and exhausting fluid to and from the external hydraulic implement. Pipes extended from the external hydraulic implement are connected to respective port members 54 and 55.

As shown in FIGS. 19, 20 and 22, charge pump 9 (inner rotor 9$a$ and outer rotor 9$b$) is disposed in charge pump housing 53 fixed to the bottom surface of center section 18, and has an upper surface slidably contacting the bottom surface of center section 18 (under hydraulic pump 2). As shown in FIGS. 10 and 12, the circular wall of fluid filter insertion portion 1$k$ formed in housing 1 is bored so as to form an opening. Laterally horizontal cylindrical fluid filter 50 shown in FIGS. 19 and 21 is inserted into housing 1, so that fluid filter 50 has one end fitted onto either a left side or a right side (laterally proximal side) of charge pump housing 53, and has the other end engaged into the opening bored in fluid filter insertion portion 1$k$. The opening is plugged with a seal cap 51. A spring 52 is interposed between seal cap 51 and fluid filter 50 in the opening. The force of spring 52 prevents fluid from leaking from the portions of fluid filter 50 and charge pump housing 53 engaging with each other.

As shown in FIGS. 19, 21 and 22, charge pump housing 53 is formed in a portion thereof behind pump shaft 6 with a suction port 53$a$ opened at one of the left and right ends of charge pump housing 53. As shown in FIGS. 20 to 22, charge pump housing 53 is further formed with a substantially arcuate (when viewed in plan) pump suction port 53$b$ extended from suction port 53$a$. Pump suction port 53$b$ is opened at its top opening to a suction port of charge pump 9. Charge pump 9 sucks fluid, having been filtrated by fluid filter 10, from the fluid sump in housing 1 through suction port 53$a$ and pump suction port 53$b$.

As shown in FIGS. 19, 21 and 22, a substantially arcuate (when viewed in plan) pump delivery port 53$c$ is formed in a portion of charge pump housing 53 in front of pump shaft 6, and is opened at the top surface of charge pump housing 53 so as to be connected to the delivery port of charge pump 9. A delivery port 53$d$ is extended forward from pump delivery port 53$c$ so as to be connected to a fluid passage in port member 54 serving as hydraulic pressure extraction port P1.

The fluid supplied from port member 54 serving as hydraulic pressure extraction port P1 to the external hydraulic implement is returned from the external hydraulic implement to port member 55 serving as hydraulic pressure returning port P2. In charge pump housing 53, as shown in FIGS. 21 and 22, a substantially arcuate (when viewed in plan) fluid gallery 53$e$ is opened upward and connected to port member 55 through a returning fluid port 53$j$. An upwardly opened charge port 53$f$ is extended from fluid gallery 53$e$, and is connected to the opening of charge fluid suction port 18$h$ at the bottom surface of center section 18 (or a charge fluid suction port 118$h$ of a center section 118 in a later-discussed transaxle Ta). In this way, the fluid delivered from charge pump 9 is supplied to the external hydraulic implement disposed on the outside of housing 1, and is returned into housing 1 so as to be supplied to the HST closed fluid circuit.

A pair of fluid holes 53$i$ and 53$h$ are bored in charge pump housing 53 so as to be extended from fluid gallery 53$e$. Charge pump housing 53 is provided therein with implement relief valve 15 connected to pump delivery port 53$c$ through fluid hole 53$i$, and is provided therein with charge relief valve 16 connected to fluid gallery 53$e$ through fluid hole 53$h$. Implement relief valve 15 regulates the hydraulic pressure of fluid supplied to the external hydraulic implement. Charge relief valve 16 regulates the hydraulic pressure of fluid supplied to the HST. A fluid hole 53$g$, serving as the freewheel-prevention fluid passage, is bored in charge pump housing 53, and is connected to pump suction port 53$b$.

Transaxles T having these configurations as shown in FIGS. 19 to 22 constitute the vehicle hydraulic circuit shown in FIG. 7.

With respect to bypass valve 14 provided with a relief valve for bypassing between the higher and lower pressurized fluid passages in the HST so as to prevent excessive fluid pressure, an embodiment shown in FIG. 24 and another embodiment shown in FIGS. 25 and 26 will be described.

Figure 24:
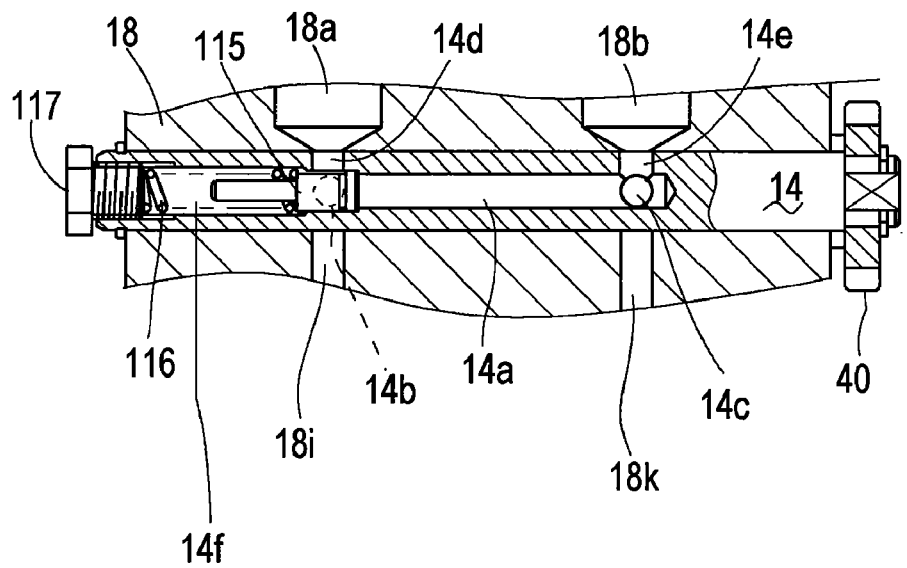
FIG. 24 is a sectional plan view of bypass valve 14 provided with a relief valve for preventing excessive hydraulic pressure, when the relief valve is closed.

In the embodiment of FIG. 24, relief valve holes 14$d$ and 14$e$ are extended in radial directions from axial hole 14$a$ in bypass valve 14, and perpendicular to respective port holes 14$b$ and 14$c$ in the peripheral direction of axial hole 14$a$. Each of port holes 14$b$ and 14$c$ diametrically penetrates a cylindrical member serving as bypass valve 14 through axial hole 14$a$ (in other words, each of port holes 14$b$ and 14$c$ is extended in opposite directions from axial hole 14$a$). Each of relief fluid holes 14$d$ and 14$e$ is extended in one radial direction from axial hole 14$a$. Therefore, when bypass valve 14 is disposed at the closed valve position, port hole 14$d$ is connected to fluid hole 18$a$, and port hole 14$e$ is connected to fluid hole 18$b$. Simultaneously, the outer peripheral surface of bypass valve 14 shuts drain holes 18$j$ and 18$k$ from respective fluid holes 18$a$ and 18$b$.

Axial hole 14$a$ has a diametrically large portion extended its intermediate portion. The diametrically large portion is extended opposite to gear 40 so as to serve as a valve chamber 14$f$ incorporating a slidable relief valve 115. Valve chamber 14$f$ is opened outward at an end portion of bypass valve 14 projecting outward from center section 18 opposite to gear 40. A relief pressure regulation screw 117 closes the opened end of valve chamber 14$f$. A compressed spring 116 is interposed between relief valve 115 and relief pressure regulation screw 117 in valve chamber 14$f$. Relief valve regulation screw 117 is rotated so as to adjust the biasing force of spring 116, thereby regulating the relief pressure of relief valve 115.

Relief fluid hole 14$d$ adapted to be connected to fluid hole 18$a$ is opened to valve chamber 14$f$. Normally, as shown in FIG. 24, the outer peripheral surface of relief valve 115 closes the opening of relief fluid hole 14$d$ to valve chamber 14$f$. On the other hand, relief fluid hole 14$e$ adapted to be connected to fluid hole 18$b$ is opened to a portion of axial hole 14$a$, which is nearer to gear 40 than valve chamber 14$f$ and is diametrically smaller than valve chamber 14$f$. When hydraulic motor 3 is excessively loaded by bad-road traveling of the vehicle, or for another reason, so as to excessively hydraulically pressurize fluid hole 18$b$, the high-pressurized fluid flows from relief fluid hole 14$e$ into axial hole 14$a$ so as to push relief valve 115 toward relief pressure regulation screw 117 against spring 116, thereby opening the opening of relief fluid hole 14$d$ to valve chamber 14f so as to the high-pressurized fluid to lower-pressurized fluid hole 18a through relief fluid hole 14e, axial hole 14a and relief fluid hole 14d.

The outer peripheral surface of bypass valve 14 closes the openings of drain holes 18j and 18k to valve hole 18i so as to prevent the bypassed fluid from being drained to the fluid sump outside center section 18. Therefore, fluid is prevented from being drained outward from center section 18, thereby silencing the relief action of bypass valve 14.

When transaxle T employs the bypass valve configuration with the relief valve function as shown in FIG. 24, fluid hole 18b is defined as one of the pair of fluid passages of the HST between hydraulic pump 2 and motor 3, which has a problem if it is excessively hydraulically pressurized. Further, in consideration that the forward traveling is more frequent than the backward traveling, the HST is preferably configured so that, during forward traveling of the vehicle, fluid hole 18b is higher-pressurized and fluid hole 18a is lower-pressurized.

Figure 25:
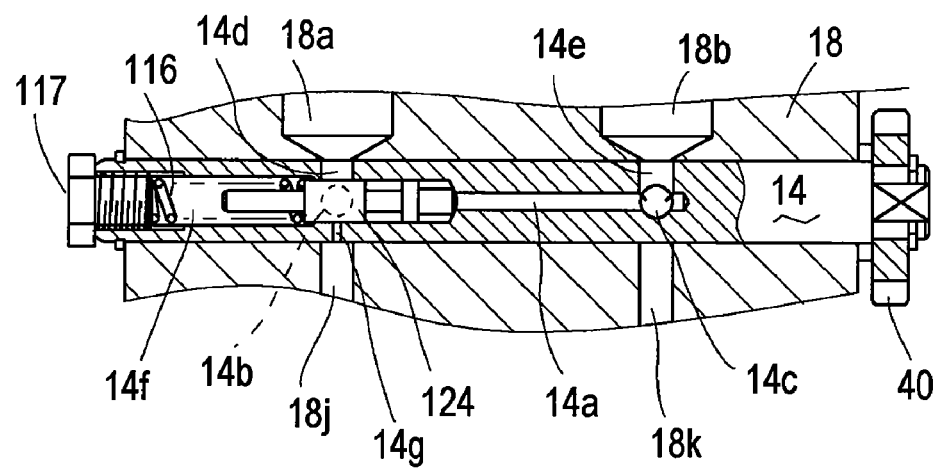
FIG. 25 is a sectional plan view of bypass valve 14 provided with a flashing valve, when the flashing valve is closed.
Figure 26:
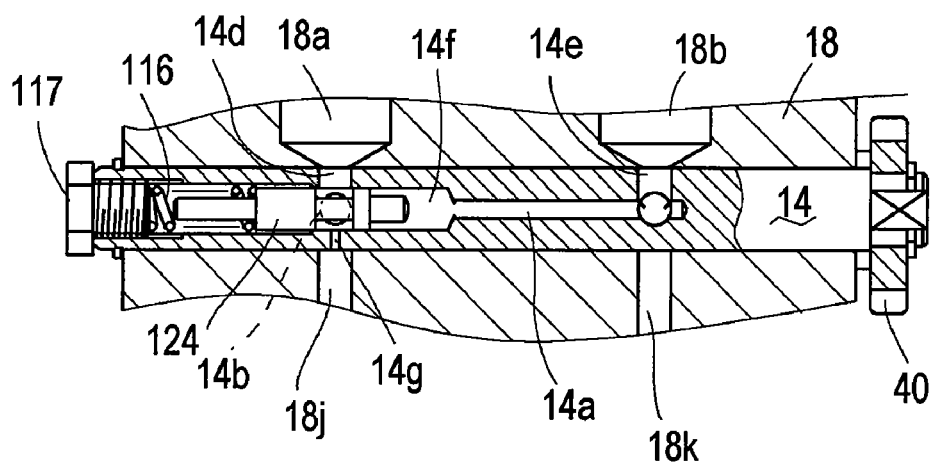
FIG. 26 is a sectional plan view of bypass valve 14 of FIG. 25 when the flashing valve is opened.

The embodiment of FIGS. 25 and 26 is equal to the embodiment of FIG. 24 provided with a flashing valve 124 replacing relief valve 115. Further, bypass valve 14 is bored therein with a radial orifice 14g opposite to fluid hole 14d.

FIG. 25 illustrates closed flashing valve 124, and FIG. 26 illustrates opened flashing valve 124. Normally, as shown in FIG. 25, flashing valve 124 is closed, i.e., the outer peripheral surface of flashing valve 124 shuts off orifice 14g from fluid hole 18a.

When a predetermined pressure generates in fluid hole 18b, high-pressurized fluid flows into axial hole 14a through fluid hole 14e, so as to push flashing valve 124 toward relief pressure regulation screw 117, thereby draining fluid from fluid hole 18a to the fluid sump outside of center section 18 through orifice 14g and drain hole 18j. Charge pump 9 supplies the HST closed fluid circuit with fluid compensating for the drained fluid from drain hole 18j.

Unless fluid leaks from the HST closed circuit, the fluid normally circulates between the hydraulic pump and motor in the HST closed circuit. Consequently, if the HST acts for a long time, the fluid in the HST closed circuit becomes hot and reduces its viscosity so that the fluid is liable to leak out from the gap between the cylinder block and the center section or another gap, thereby reducing the power transmission efficiency of the HST. Flashing valve 124 drains a part of fluid flowing in the lower-pressurized portion of the closed circuit, and supplies fluid, having been filtrated by fluid filter 10 (or 50), from the fluid sump, whose temperature is lower than that in the closed circuit, in cooperation with charge pump 9. This is the reason why this bypass valve structure with the flashing function is adapted to not transaxle T having no charge pump 9 as shown in FIG. 12 but transaxle T having charge pump 9 as shown in FIGS. 18 and 19 to 22.

Description will be given of transaxles Ta (a generic name of a pair of left and right transaxles TaL and TaR) shown in FIGS. 27 to 35 adaptable to working vehicle 100 shown in FIGS. 1 to 3. Description of components and portions designated by the same reference numerals as those of transaxle T is omitted except for a special mention because they have the same functions as those of transaxle T.

Figure 27:
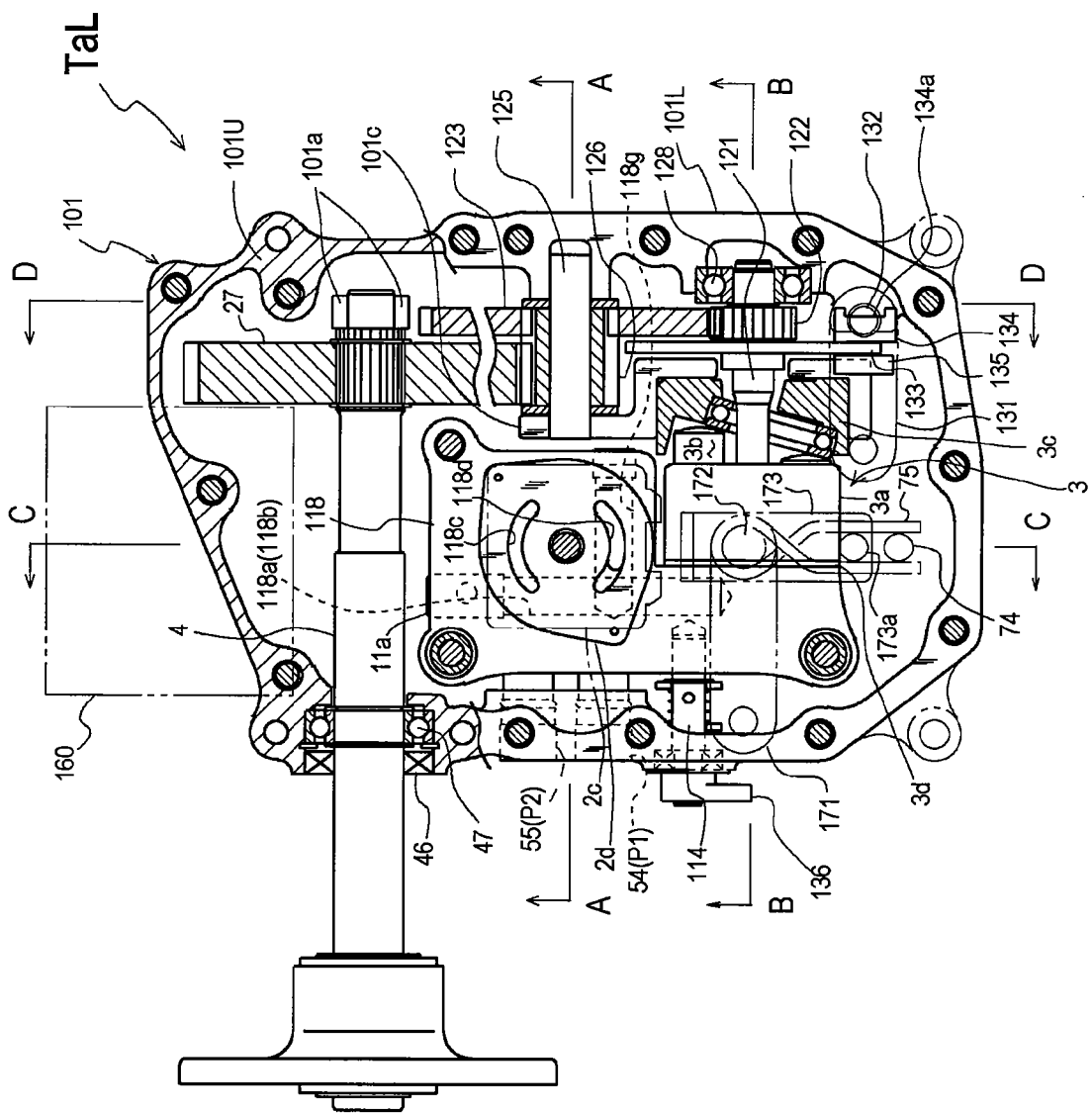
FIG. 27 is a plan view of a left transaxle TaL serving as a representative of a transaxle Ta including a vertical axial pump and a horizontal axial motor, provided with the third fluid supply system, when an upper housing part is removed (illustrating a part of the upper housing part).
Figure 35:
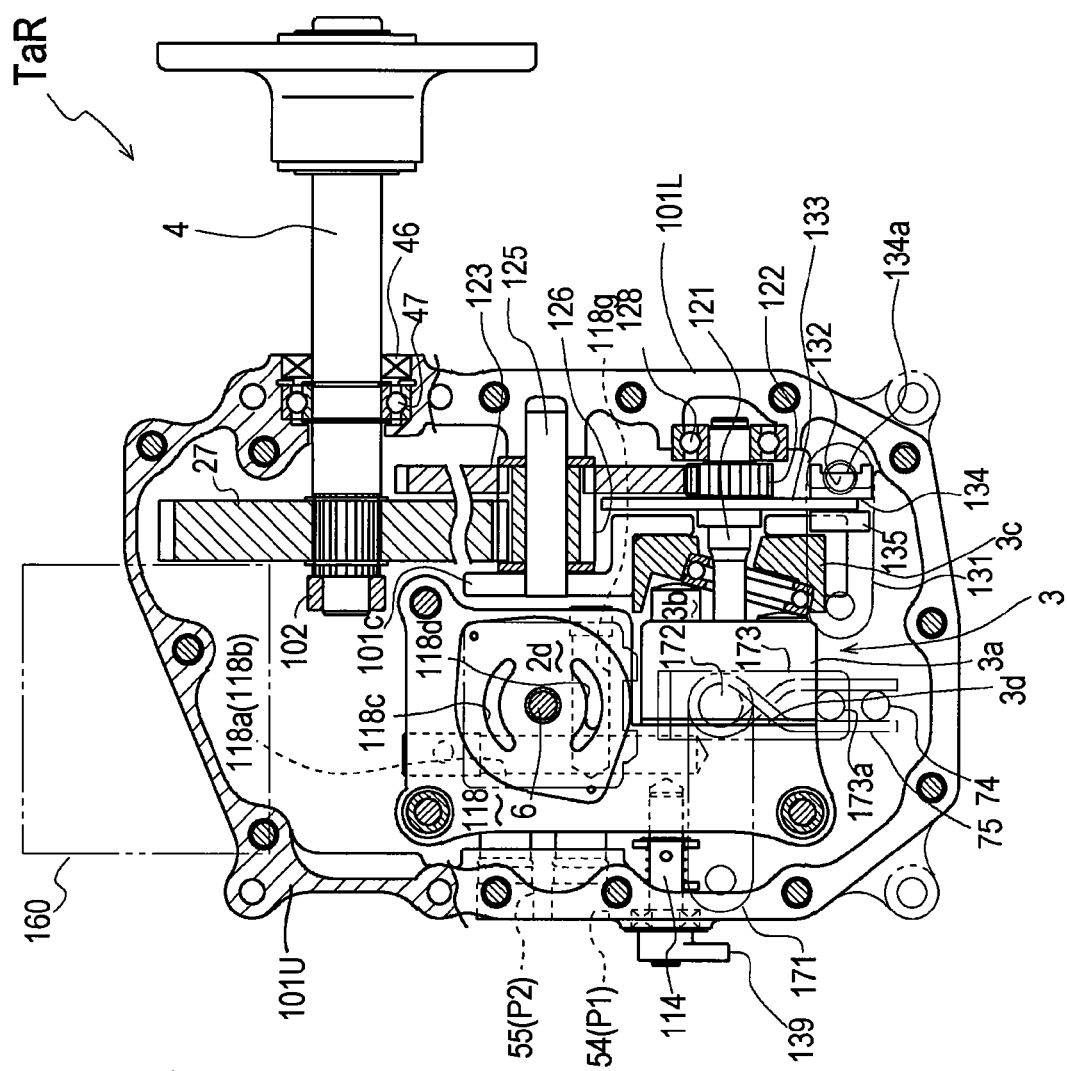
FIG. 35 is a plan view of a right transaxle TaR including the vertical pump and the horizontal motor, provided with the third fluid supply system, when the upper housing part is removed (illustrating a part of the upper housing part).

As shown in FIGS. 27 and 35, left and right transaxles TaL and TaR share a common housing 101 constituted by joining an upper housing member 101U and a lower housing member 101L through a horizontal joint surface so as to reduce costs. The different point between left and right transaxles TaL and TaR is that an axle bearing portion (including bearing 47 and fluid seal 46) of left transaxle TaL for its axle 4 is formed on a left side portion of housing 101 (upper housing member 101U) so as to have axle 4 projecting leftward therefrom, and an axle bearing portion (including bearing 47 and fluid seal 46) of right transaxle TaR for its axle 4 is formed on a right side portion of housing 101 (upper housing member 101U) so as to have axle 4 projecting rightward therefrom. Since a layout of an HST and a deceleration mechanism between the HST and axle 4 is standardized for both left and right transaxles TaL and TaR, the position of bull gear 27 fixed on axle 4 in transaxle TaL is equal to that in transaxle TaR. Therefore, axles 4 of respective left and right transaxles TaL and TaR have different lengths in housing 101.

Figure 31:
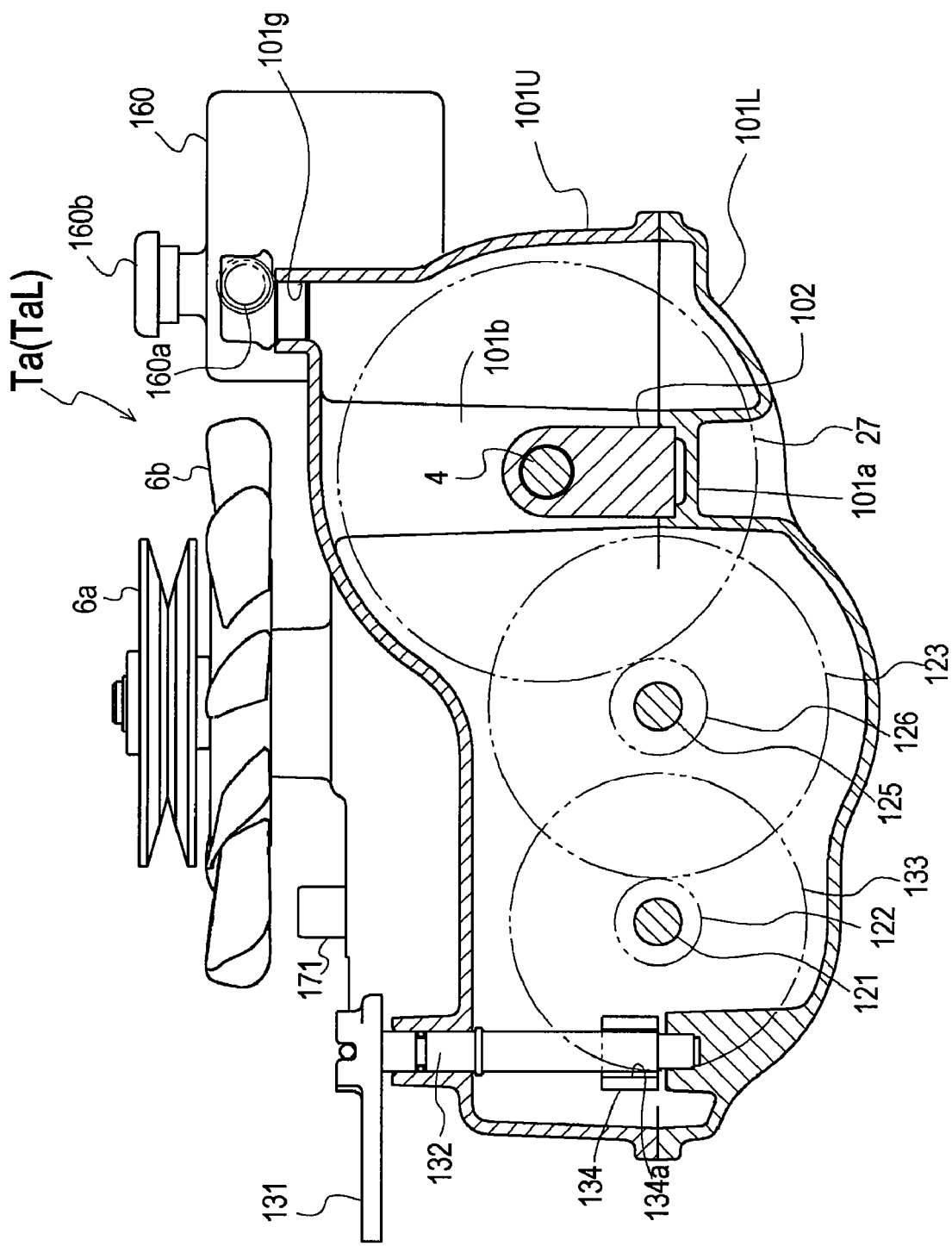
FIG. 31 is a cross sectional view taken along D-D line of FIG. 27.

As shown in FIG. 31, upper housing member 101U is formed with a wall 101a extended downward from a ceiling portion thereof, lower housing member 101L is formed with a wall 101b extended upward from a bottom portion thereof, and each axle 4 is journalled at an appropriate portion thereof by a bearing member 102 nipped between walls 101a and 101b. As understood from comparison between FIGS. 27 and 35, the lateral (axial) position of axle 4 journalled by bearing member 102 in left transaxle TaL is optimally different from that in right transaxle TaR.

The other components and portions are standardized in structure and layout for transaxles TaL and TaR. Thus, left transaxle TaL shown in FIGS. 27 to 32 described as follows is referred to as transaxle Ta representing left and right transaxles TaL and TaR.

Figure 28:
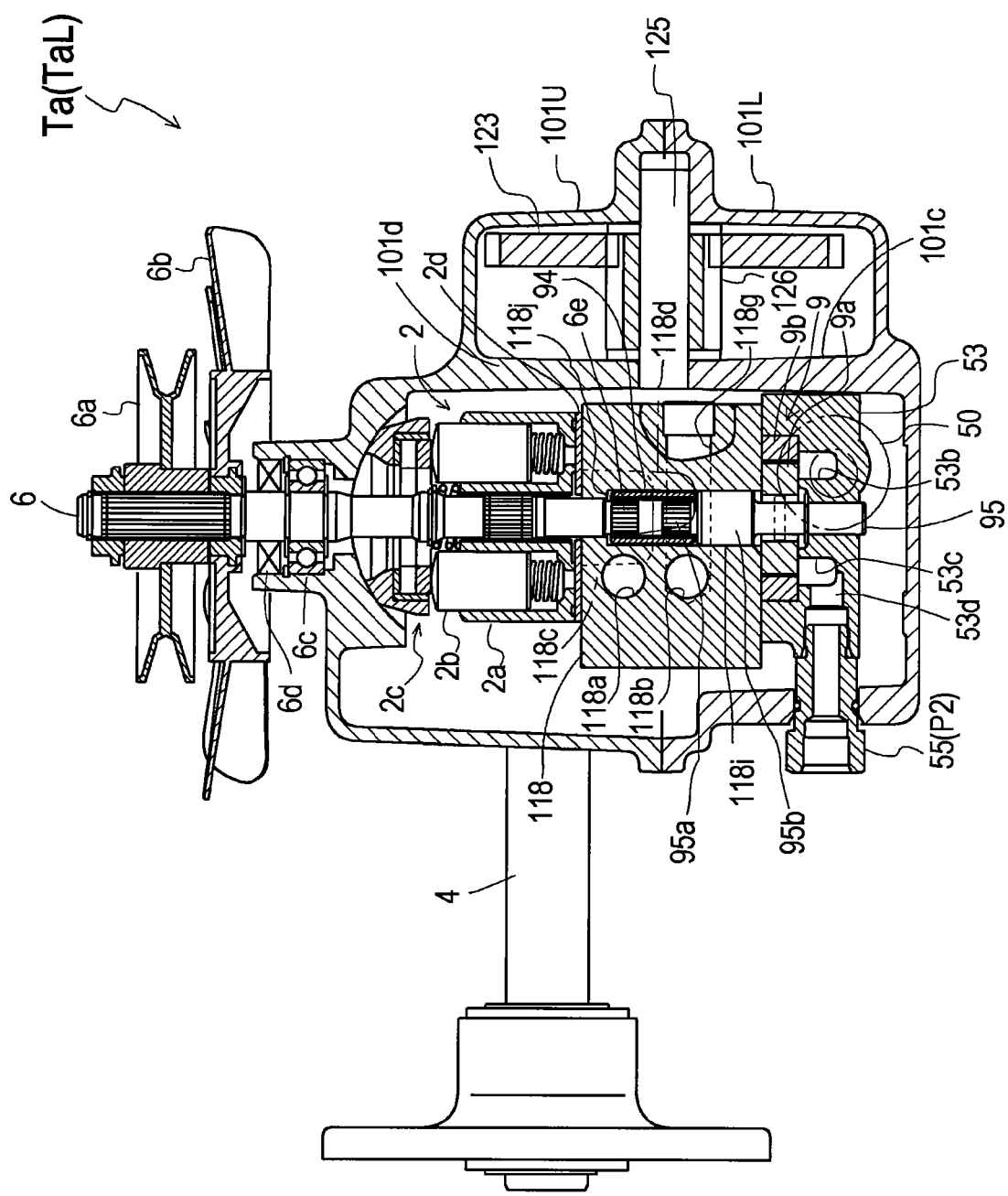
FIG. 28 is a cross sectional view taken along A-A line of FIG. 27.
Figure 29:
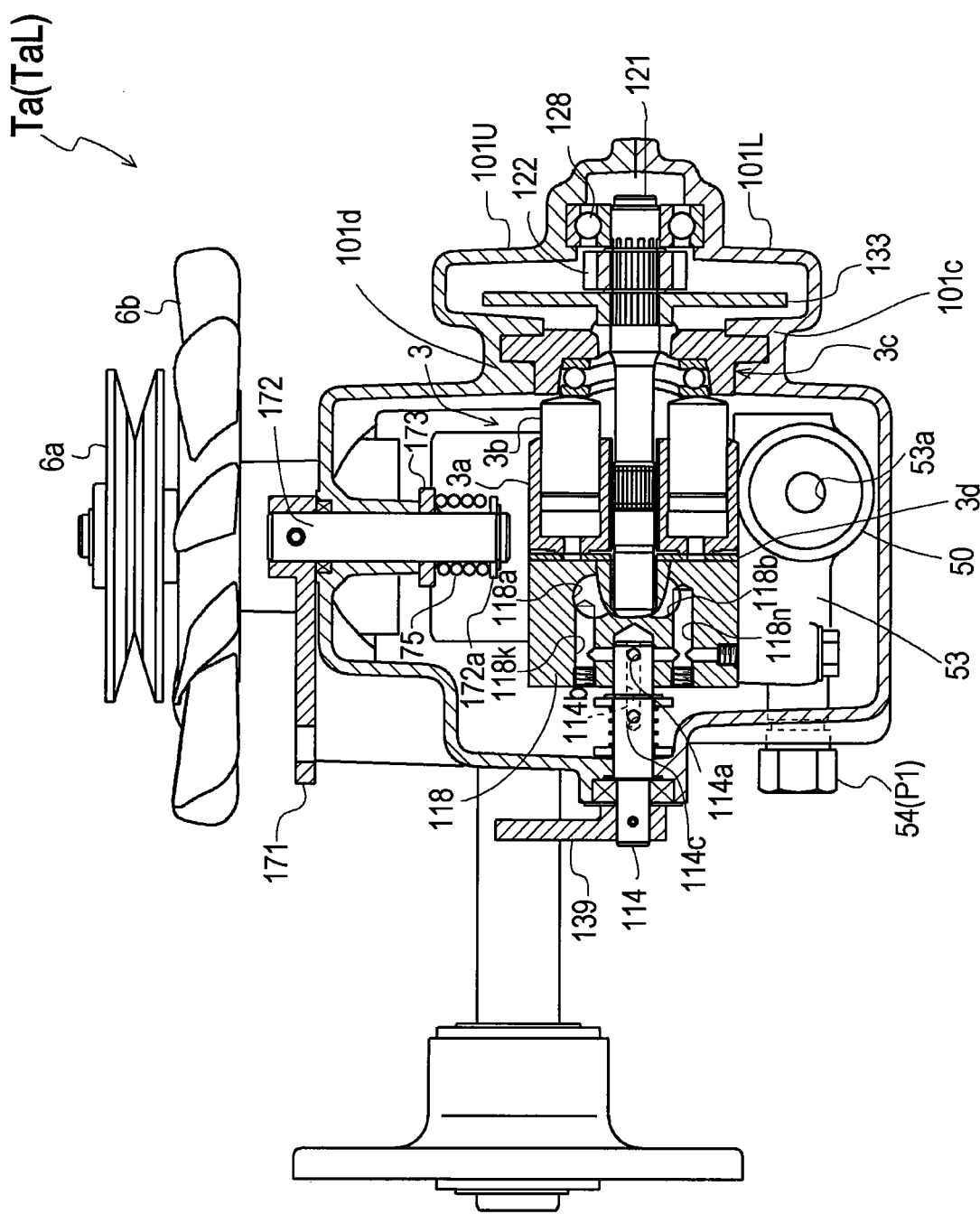
FIG. 29 is a cross sectional view taken along B-B line of FIG. 27.

In comparison with transaxle T incorporating the HST in which both of hydraulic pump 2 and hydraulic motor 3 have vertical rotary axes, transaxle Ta incorporates an HST in which hydraulic pump 2 has a vertical rotary axis and hydraulic motor 3 has a horizontal rotary axis. Housing 101 supports axle 4 at its front portion. The HST and the deceleration gear train interposed between the HST and axle 4 are laterally juxtaposed in a portion of housing 101 behind axle 4. In housing 101, a partition wall portion 101d extended downward from upper housing member 101U and a partition wall portion 101c extended upward from lower housing member 1L abut against each other, as shown in FIGS. 27 to 29 and others, so as to serve as a crank-shaped partition wall (when viewed in plan as shown in FIG. 27) between an HST chamber and a deceleration gear train chamber. The partition wall is also used for supporting later-discussed fixed swash plate 3c, a brake pad 135 and a counter shaft 125.

As shown in FIG. 31 and others, a reservoir tank 160 is attached onto an outer front portion of housing 101. Reservoir tank 160 is provided on the top thereof with a cap 160b having a breather, and is formed with a horizontal connection hole 160a, which is connected to an upward opening 101g formed in upper housing member 101U so as to open reservoir tank 160 to the fluid sump in housing 101. Reservoir tank 160 has the same function as that of the above-mentioned reservoir tank 60.

In the HST of transaxle Ta, a center section 118 is L-shaped when viewed in plan so as to have a front portion whose horizontal top surface serves as a pump mounting surface, and have a rear portion whose vertical side surface serves as a motor mounting surface. A valve plate 2d of hydraulic pump 2 is fixed onto the pump mounting surface, and a valve plate 3d of hydraulic motor 3 is fixed onto the motor mounting surface. Cylinder block 2a of hydraulic pump 2 is slidably rotatably fitted onto valve plate 2d, and cylinder block 3a of hydraulic motor 3 is slidably rotatably fitted onto valve plate 3d. Movable swash plate 2c is slidably rotatably supported onto a ceiling portion of upper housing member 101U, so as to abut against pistons 2b fitted into cylinder block 2a. Fixed swash plate 3c is fixedly nipped between partition wall portion 101d formed on upper housing member 101U and partition wall portion 101c formed on lower housing member 101L, so as to abut against pistons 3b fitted into cylinder block 3a.

A pair of kidney ports 118c and 118d are opened at the horizontal pump mounting surface of center section 118, onto which valve plate 2d is fixed, and are fluidly connected to the cylinder holes in cylinder block 2a through valve plate 2d. A pair of kidney ports 118e and 118f are opened at the vertical motor mounting surface of center section 118, onto which valve plate 3d is fixed, and are fluidly connected to the cylinder holes in cylinder block 3a through valve plate 3d.

Figure 33:
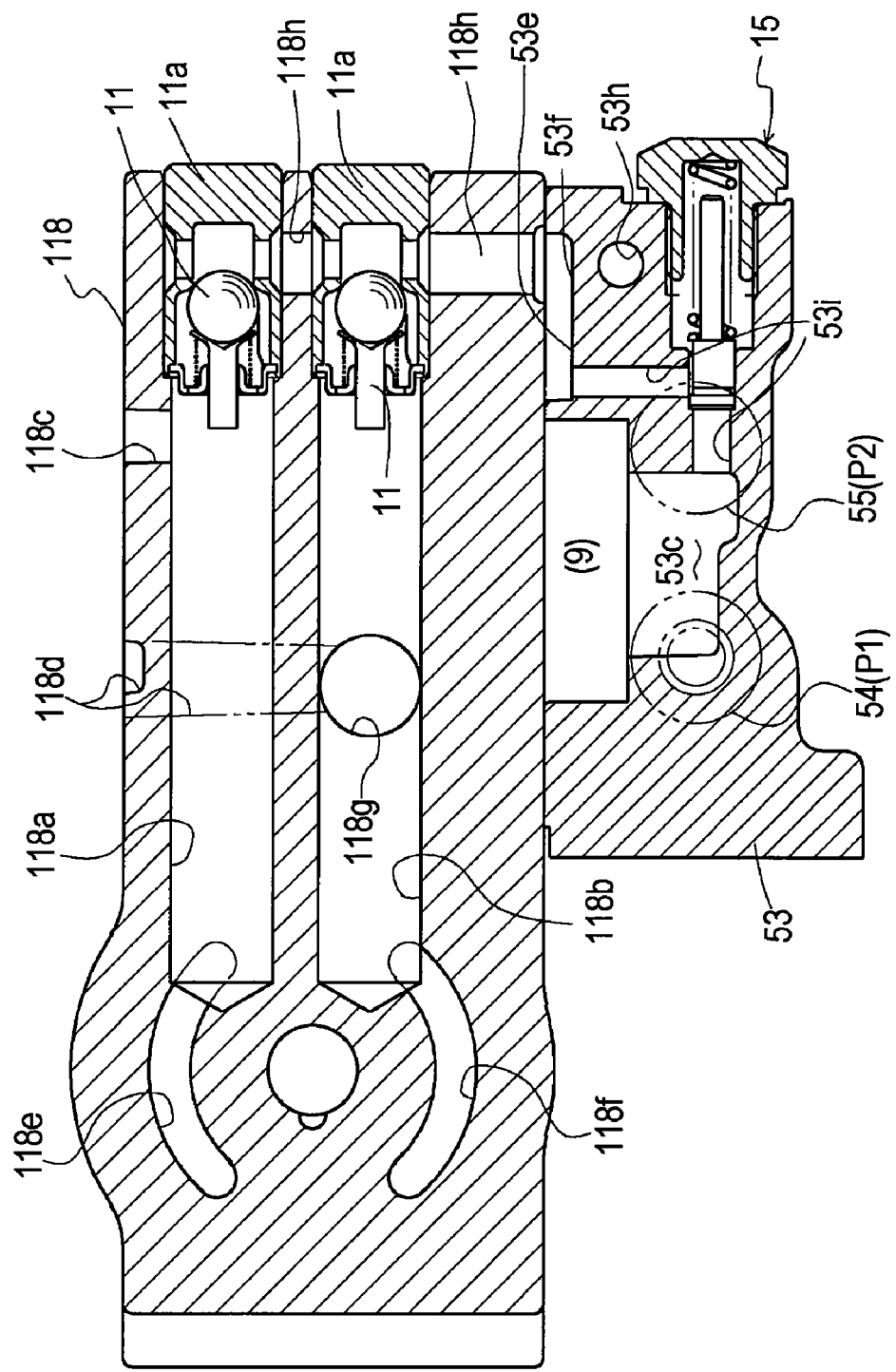
FIG. 33 is a sectional side view of a center section, showing a fluid passage structure of a hydrostatic transmission in transaxle Ta.

As shown in FIGS. 27, 28, 33 and others, center section 118 is bored therein with vertically aligned parallel fore-and-aft horizontal fluid holes 118a and 118b. Upper fluid hole 118a connects kidney ports 118c and 118e to each other so as to constitute fluid passage C1 shown in FIGS. 6 and 7. Lower fluid hole 118b is connected to kidney port 118d, and connected to kidney port 118f through a lateral horizontal fluid hole 118g, so as to constitute fluid passage C2 shown in FIGS. 6 and 7. Therefore, the HST closed circuit is configured so as to fluidly connect hydraulic pump 2 and hydraulic motor 3 to each other.

As shown in FIG. 33 and others, opened ends of fluid holes 118a and 118b are plugged by respective charge check valve casings 11a incorporating respective charge check valves 11 for charging hydraulic pressure fluid. A downwardly opened vertical charge fluid suction port 118h is bored in center section 118, and is connected to an inlet side of each charge check valve 11.

Transaxle Ta shown in FIGS. 27 to 35 has the above-mentioned third fluid supply system. In this regard, charge pump housing 53 incorporating charge pump 9 is attached onto the bottom surface of center section 118, similar to that of transaxle T shown in FIGS. 21 and 22. A fluid gallery 53e formed in charge pump housing 53 is connected to charge fluid suction port 118h through charge port 53f.

In transaxle T, vertical pump shaft 6 of hydraulic pump 2 has the lower portion extended downward from center section 18 so as to serve as the drive shaft of charge pump 9 (i.e., the rotary shaft of inner rotor 9a). On the other hand, in transaxle Ta, pump shaft 6 has a bottom end within a vertical penetrating shaft hole 118i in center section 118, and a charge pump shaft 95 shown in FIGS. 28 and 30 or a charge pump shaft 96 shown in FIG. 34, serving as a drive shaft of charge pump 9, projects upward from inner rotor 9a so as to be connected at a top end thereof to the bottom end of pump shaft 6 in shaft hole 118i.

Figure 30:
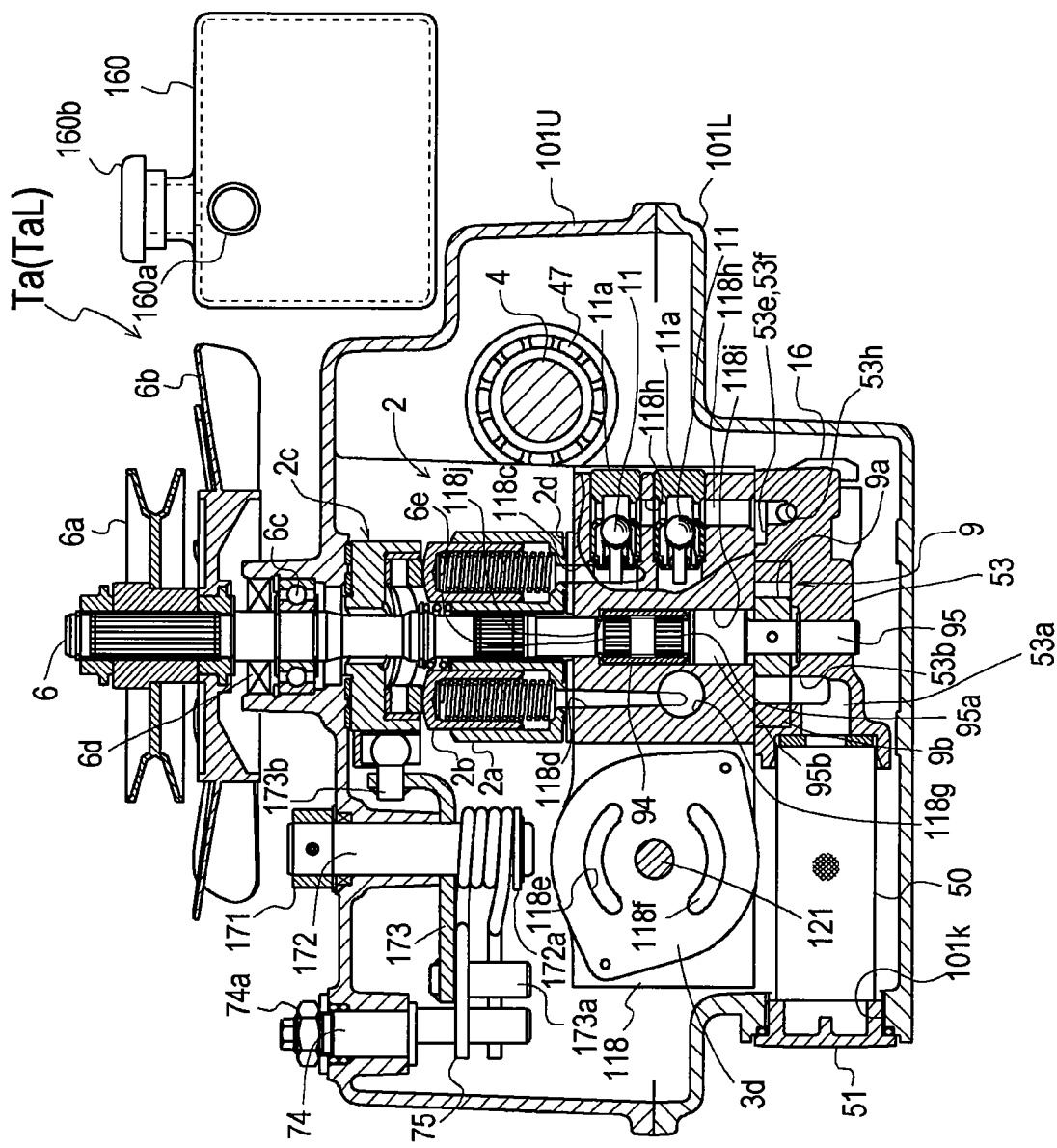
FIG. 30 is a cross sectional view taken along C-C line of FIG. 27.

As shown in FIGS. 28 and 30, the bottom end of pump shaft 6 in shaft hole 118i is splined on an outer peripheral surface thereof so as to serve as a spline end 6e. On the other hand, the top end of charge pump shaft 95 shown in FIGS. 28 and 30 is splined on an outer peripheral surface thereof so as to serve as a spline end 95a. A cylindrical coupling 94 having a splined inner peripheral surface is disposed in shaft hole 118i. Spline end 6e is spline-fitted downward into coupling 94, and spline end 95a is spline-fitted upward into coupling 94, so that pump shaft 6 and charge pump shaft 95 are coaxially and relatively unrotatably connected to each other. Incidentally, shaft hole 118i has a step 118j just above spline end 6e, so that the lower portion of shaft hole 118i extended downward from step 118j is diametrically larger than the upper portion of shaft hole 118i extended upward from step 118j. Coupling 94 is disposed in the diametrically larger lower portion of shaft hole 118i so that step 118j fixes the position of the top end of coupling 94 having spline end 6e fitted therein. On the other hand, charge pump shaft 95 has a diametrically larger portion just below spline end 95a, and has a shoulder 95b formed by the diametric difference between the diametrically larger portion of charge pump shaft 95 and spline end 95a, so that shoulder 95b fixes the position of the bottom end of coupling 94 having spline end 95a fitted therein.

Figure 34:
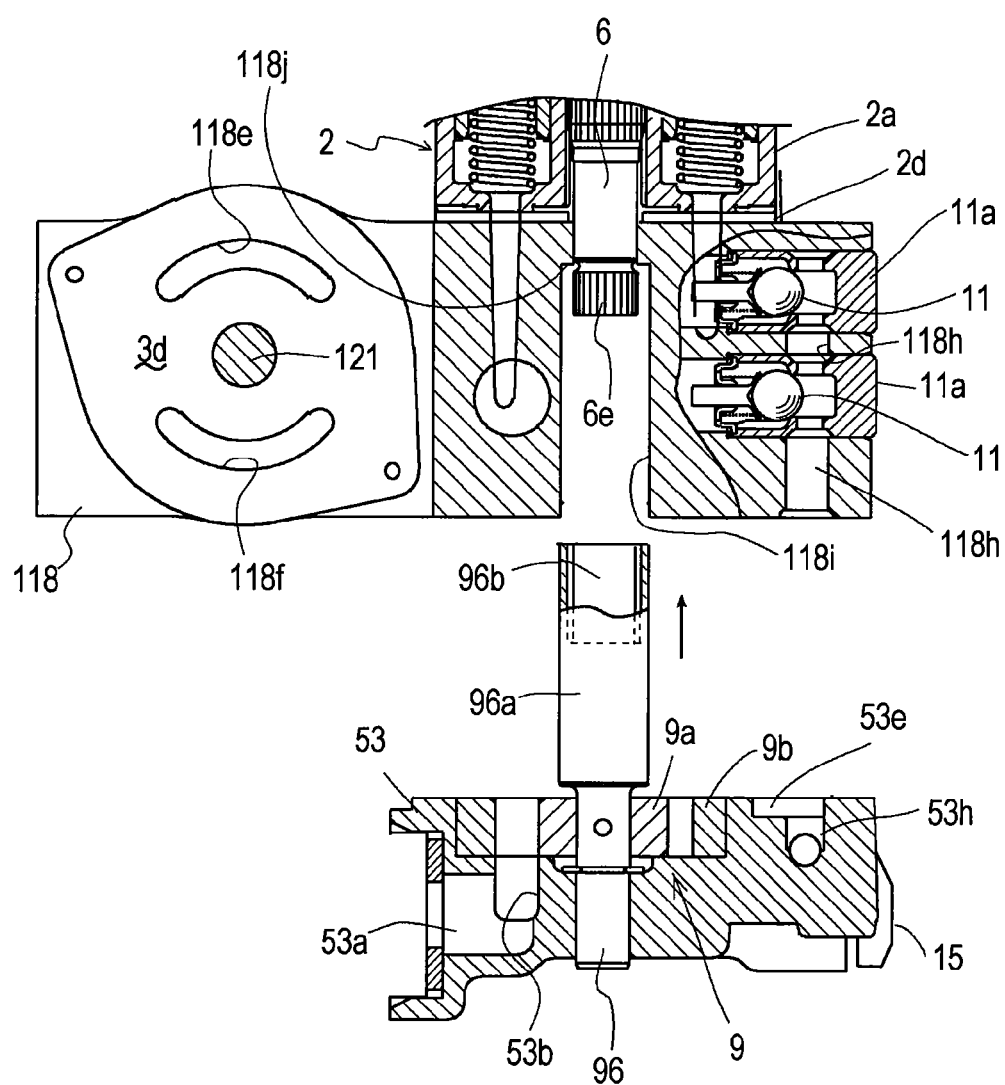
FIG. 34 is a sectional side view of the charge pump housing of the third fluid system for transaxle Ta, the charge pump housing being attached to the center section in another way.

Alternatively, as shown in FIG. 34, charge pump shaft 96 requiring no additional coupling 94 may be connected to pump shaft 6. Charge pump shaft 96 is formed with a diametrically large portion 96a, which is substantially as diametrically large as the diametrically larger portion of shaft hole 118j. Diametrically large portion 96a is formed with an upwardly opened spline recess 96b having a splined inner peripheral surface. Spline end 6a of pump shaft 6 is spline-fitted into spline recess 96b in shaft hole 118i.

Charge pump housing 53 has the same inner fluid passage structure, the same valves 13, 15, 16 and others, the same fluid filter 50, and the same port members 54 and 55 serving as ports P1 and P2, as that of transaxle T mentioned as the above referring to FIGS. 21, 22 and others.

As shown in FIGS. 27 and 30, the tilt angle control mechanism of movable swash plate 2c of hydraulic pump 2 in transaxle Ta is disposed in a space above center section 118 and hydraulic motor 3 behind hydraulic pump 2. Transaxle Ta has a vertical pump control shaft 172 rotatably supported by upper housing member 101U. A pump control lever 171 is fixed on a top of pump control shaft 172 projecting upward from housing 101 so as to be horizontally rotatably integral with pump control shaft 172. A horizontal plate-shaped connection arm 173 is fixed on pump control shaft 172 in housing 101. A pushing pin 173a projects downward from an end of connection arm 173. Connection arm 173 is bent upward at a portion thereof opposite to pushing pin 173a with respect to pump control shaft 172, and is provided with a connection member 173b on the other end of the bent portion thereof so as to fit a side surface of movable swash plate 2c.

In the pump swash plate control mechanism of transaxle Ta, neutral returning spring 75 is wound around pump control shaft 172 between connection arm 173 and a flange 172a fixed (or formed) on pump control shaft 172. In this embodiment, neutral positioning pin 74 is disposed vertically, and is fastened to upper housing member 101U by nut 74a. Pushing pin 173a and neutral positioning pin 74 are disposed between both end portions of neutral returning spring 75 so as to constitute a neutral returning mechanism similar to that of the pump control mechanism of transaxle T.

As shown in FIG. 29, center section 118 is formed therein with a bypass circuit for releasing hydraulic pressure from the HST closed circuit by operation outside of housing 101. Lateral horizontal bypass fluid passages 118k and 118n are formed in center section 118 so as to be connected to respective fluid holes 118a and 118b. A lateral horizontal bypass valve shaft 114 is rotatably passed through center section 118 between bypass fluid passages 118k and 118n. Bypass valve shaft 118 is rotatably nipped at an intermediate portion thereof between upper and lower housing members 101U and 101L, and is fixedly provided on an outer end thereof with a bypass operation arm 139.

Bypass valve shaft 114 is diametrically bored therein with a fluid passage 114a interposed between bypass fluid passages 118k and 118n. A fluid passage 114b is axially bored in bypass valve shaft 114 so as to be opened to the fluid sump in housing 101 through a radial hole 114c.

Due to this structure, when the working vehicle is towed, bypass operation arm 139 disposed outside of housing 101 is operated so as to rotate bypass valve shaft 114, thereby opening fluid passage 114a between bypass fluid passages 114k and 114n to the fluid sump in housing 101. Therefore, the hydraulic pressure is released from the HST closed circuit so as to allow a motor shaft 121 of hydraulic motor 3 to idle.

Hydraulic motor 3 of transaxle Ta includes horizontal motor shaft 121. Motor shaft 121 is disposed on the center axis of cylinder block 3a so as to be relatively unrotatably engaged to cylinder block 3a, and is journalled by center section 118. Motor shaft 121 is relatively rotatably passed from cylinder block 3a through fixed swash plate 3c, and is journalled at an end thereof by a bearing 128 nipped between upper and lower housing members 101U and 101L. A motor gear 122 is fixed on motor shaft 121 adjacent to bearing 128. Counter shaft 125 is disposed between axle 4 and motor shaft 121 in parallel, and is nipped between partition wall portion 101d formed on upper housing member 101U and partition wall portion 101c formed on lower housing member 101L. An axially long final pinion 126 is fixed on counter shaft 125. A counter gear 123 is relatively unrotatably fitted on final pinion 126, and meshes with motor gear 122, and final pinion 126 outside of counter gear 123 meshes with bull gear 27, thereby constituting the deceleration gear train of transaxle Ta. Since motor shaft 121 is disposed in parallel to counter shaft 25 and axle 4, the deceleration gear train of transaxle Ta requires no bevel gear such as the bevel gears of transaxle T, and can be composed of only inexpensive spur gears.

Figure 32:
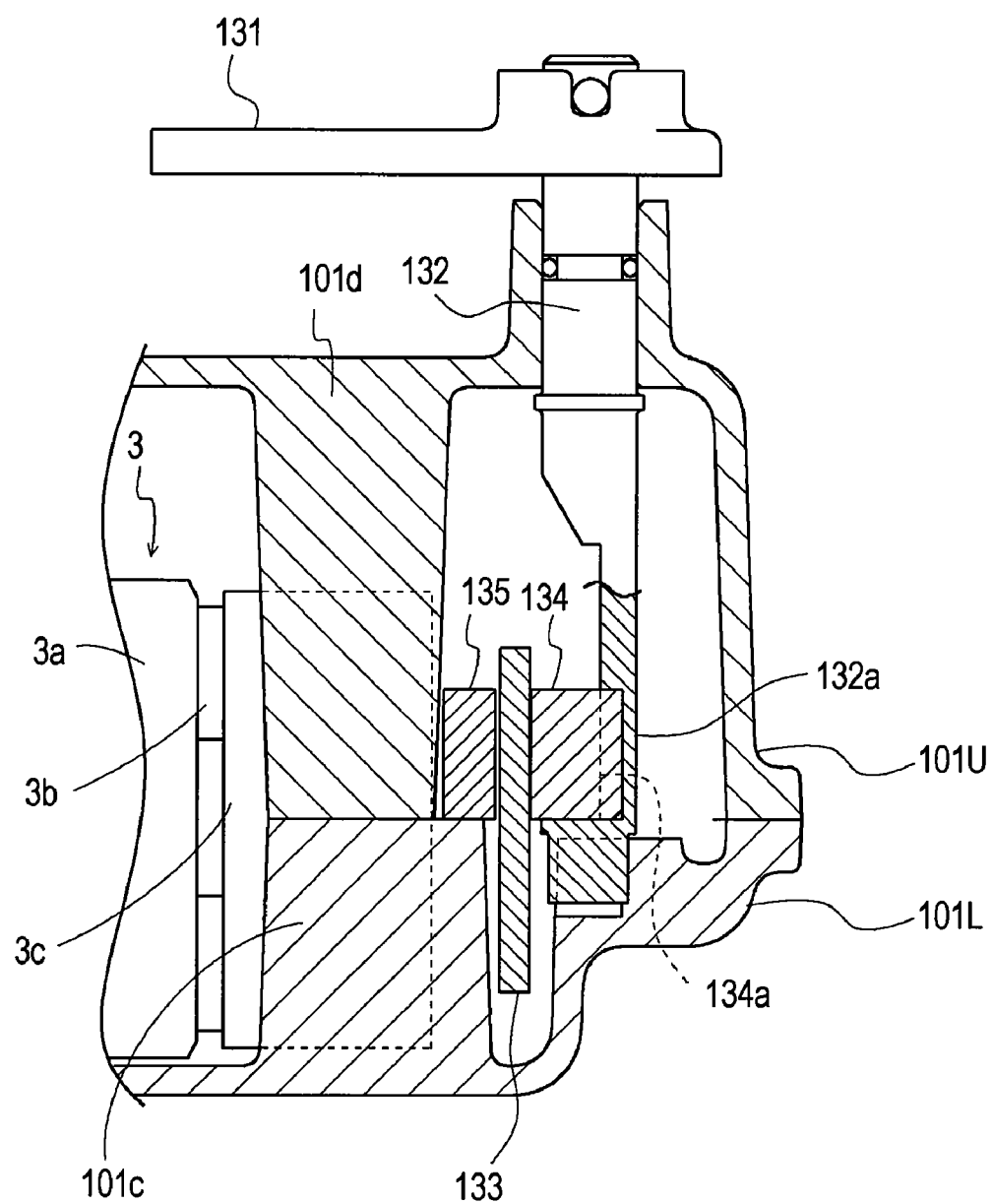
FIG. 32 is a rear view partly in section of transaxle Ta showing a brake mechanism.

Transaxle Ta includes a brake mechanism in which a vertical brake disk 133 fixed on motor shaft 121 adjacent to motor gear 122 is disposed between a brake shoe 132 and a brake pad 135 as shown in FIG. 32 and others. A vertical brake operation shaft 132 is supported at an upper portion thereof by upper housing member 101U, and at a lower portion thereof by lower housing member 101L. A brake lever 131 is fixed on a top end of brake operation shaft 132 projecting upward from upper housing member 101U, and is horizontally rotatably switched between a braking position and an unbraking position. In housing 101, brake operation shaft 132 is formed at a lower portion thereof with a sectionally semi-circular cam portion 132a having a flat surface entering and facing a U-shaped (when viewed in plan) recess 134a of brake shoe 134. When brake lever 131 and brake control shaft 132 are rotated to the braking position, the flat surface of cam portion 132a is slanted relative to brake shoe 134 so as to push brake shoe 134 at an end edge thereof, thereby pressing and braking brake disk 133 between brake shoe 134 and brake pad 135.

Figure 36:
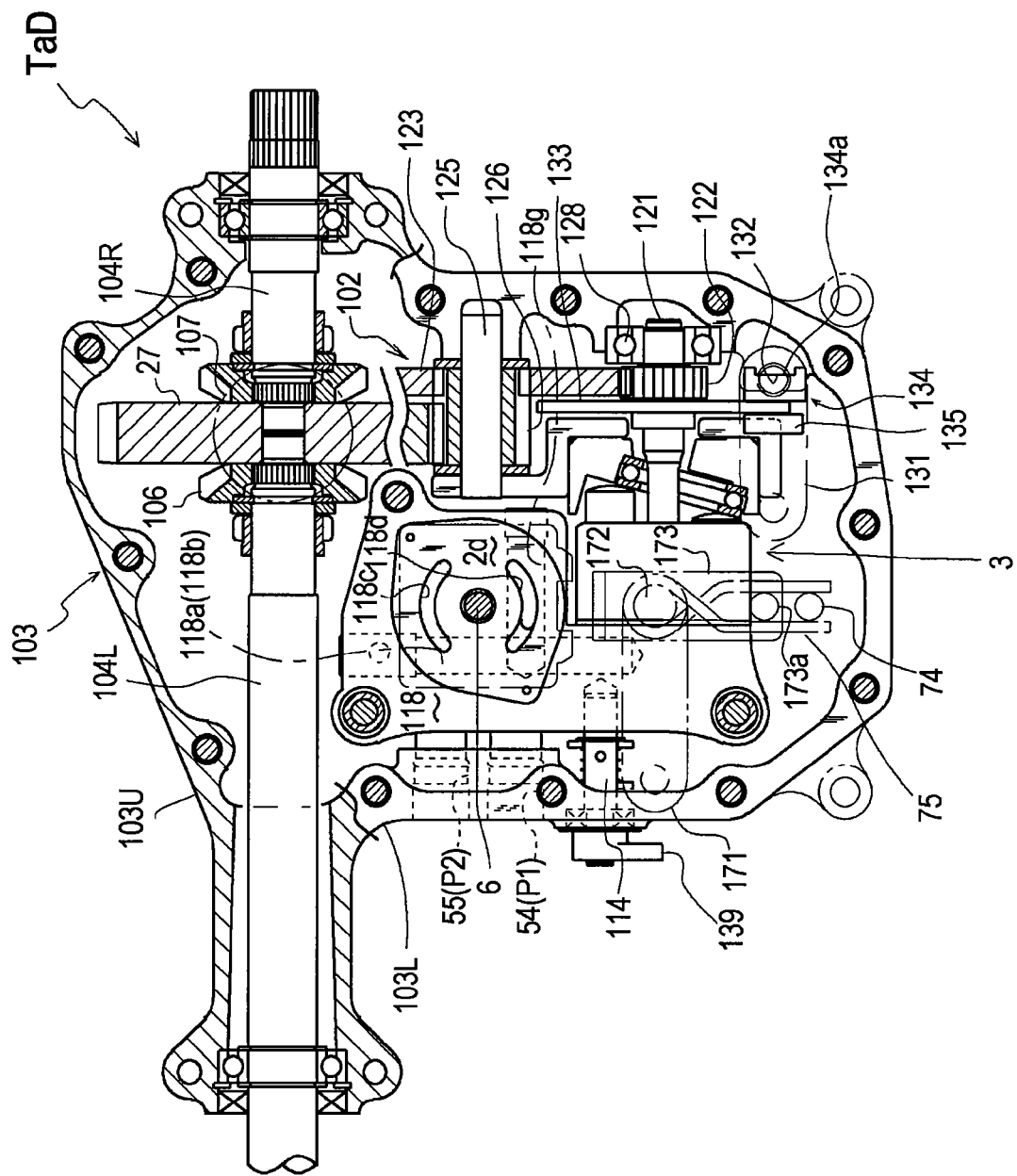
FIG. 36 is a plan view of a differential transaxle TaD including the vertical pump, the horizontal motor and left and right axles differentially connected to each other, provided with the third fluid supply system, when the upper housing part is removed (illustrating a part of the upper housing part).

Alternatively, left and right transaxles TaL and TaR may be integrated so as to serve as a differential transaxle TaD shown in FIG. 36. A housing 103 of transaxle TaD is formed by vertically joining an upper housing member 103U and a lower housing member 103L, similar to housing 101. Housing 103 supports a pair of left and right axles 104L and 104R. Axles 104L and 104R are relatively rotatably fitted at their proximal ends into bull gear 27. A differential pinion 107 is pivoted in bull gear 27 so as to mesh with differential side gears 106 fixed on respective axles 104L and 104R, thereby constituting a differential gear unit. The other structure, including the deceleration gear train between motor shaft 121 and bull gear 27, is similar to that of transaxle Ta shown in FIGS. 27 to 35.

Figure 37:
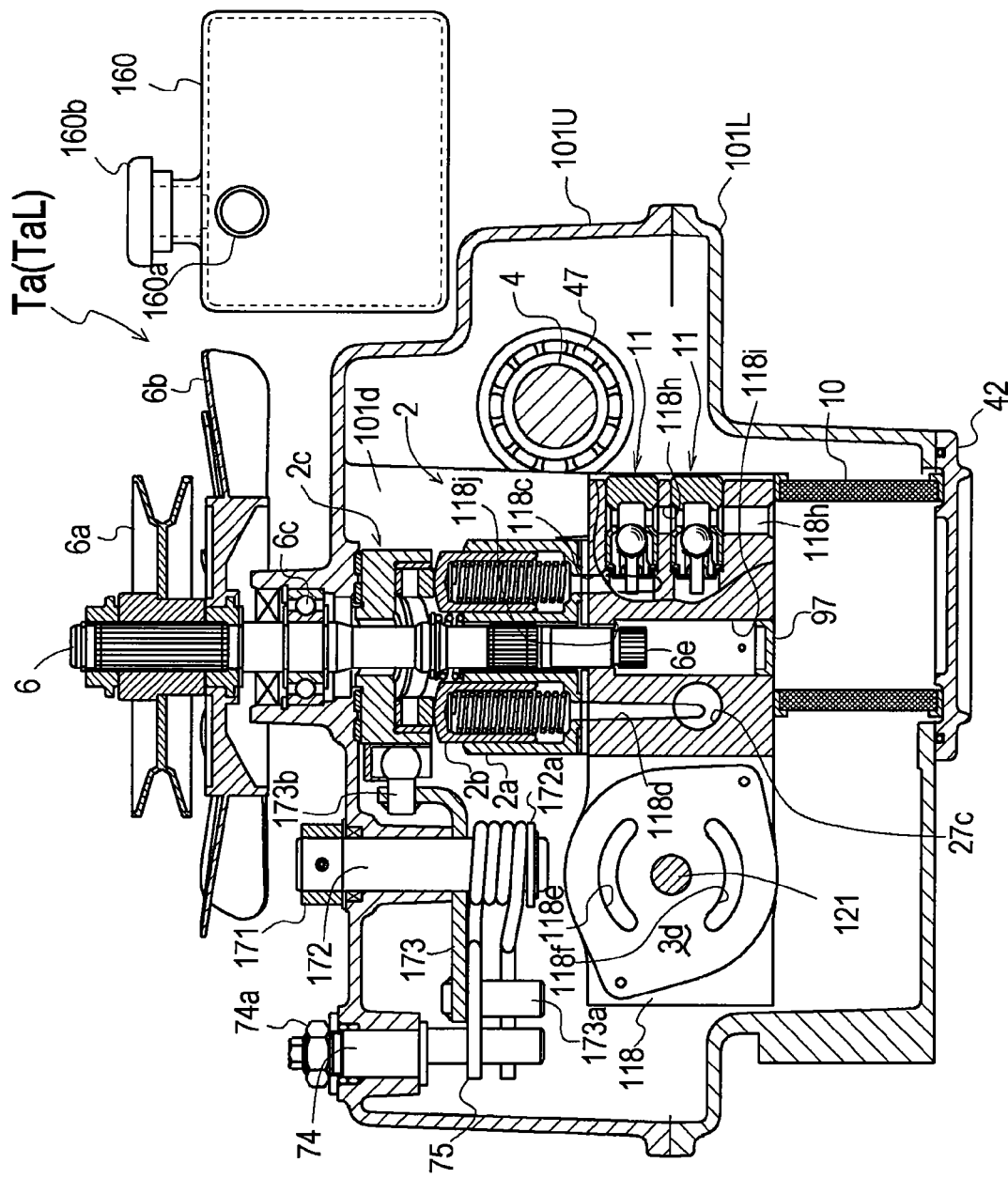
FIG. 37 is a sectional side view of transaxle Ta (left transaxle TaL), provided with the first fluid supply system.

Each of transaxles TaL, TaR and TaD, shown in FIGS. 27 to 36, has the third fluid supply system. Alternatively, as shown in FIG. 37, it may employ the first fluid supply system (FIG. 37 illustrates representative transaxle TaL). In this regard, vertical cylindrical fluid filter 10 is nipped between center section 118 and cap 42 provided in the bottom portion of housing 101, and charge fluid suction port 118h in center section 118 is opened to the fluid sump in fluid filter 10 so as to naturally suck fluid from the fluid sump by hydraulic depression in either fluid passage C1 or C2.

In this structure, pump shaft 6 of transaxle Ta is disposed at the bottom end thereof (i.e., spline end 6a) in shaft hole 118i so as not to project downward from center section 118. Therefore, no charge pump housing 93 is attached to the bottom surface of center section 118, and shaft hole 118i is opened at the bottom end thereof to the fluid sump in fluid filter 10. Thus, the opened bottom end of shaft hole 118i is plugged by a cap 97.

The foregoing description is given to preferred embodiments of the disclosed apparatus and various changes and modifications about combination and arrangement of components, for example, may be made in the invention without departing from the scope thereof defined by the following claims.

What is claimed is:

1. A working vehicle comprising:
    a vehicle frame including a first portion and a second portion;
    a prime mover mounted at a bottom end thereof on an upper surface of the first portion of the vehicle frame, the prime mover including a vertical output shaft extended downward from the bottom end of the prime mover and extended downward from the first portion of the vehicle frame;
    a pair of left and right drive wheels;
    a pair of left and right transaxles juxtaposed below the vehicle frame, the left and right transaxles having a single axle for individually and reversibly rotatably driving each of the left and right drive wheels;
    a working device disposed below the vehicle frame;
    a working belt transmission disposed below the vehicle frame and extended from the output shaft to the working device;
    a vertical counter shaft extended downward from the second portion of the vehicle frame; and
    a traveling belt transmission disposed below the vehicle frame so as to transmit power of the output shaft to the left and right transaxles, the belt transmission including:
        a pair of upper and lower pulleys provided on the counter shaft,
        a first horizontal belt looped over the lower pulley and extended from the output shaft of the prime mover, and
        a second horizontal belt looped over the upper pulley and extended to the left and right transaxles.

2. The working vehicle according to claim 1, wherein the first portion of the vehicle frame having the prime mover mounted thereon is lower than the second portion of the vehicle frame having the counter shaft extended downward therefrom.

3. The working vehicle according to claim 2, wherein the pair of left and right transaxles are disposed just below the second portion of the vehicle frame having the counter shaft extended downward therefrom, and wherein the vehicle frame is formed with a sloped portion between the first portion having the prime mover mounted thereon and the second portion having the counter shaft extended downward therefrom so as to correspond to shapes of the transaxles therebelow.

4. The working vehicle according to claim 1, further comprising:
    a clutch mechanism for transmitting or isolating power to and from the working device, wherein the clutch mechanism is provided on the output shaft of the prime mover.

5. The working vehicle according to claim 4, further comprising:

a pulley provided on the output shaft of the prime mover below the first portion of the vehicle frame having the prime mover mounted thereon and above the clutch mechanism, so as to be drivingly connected to the lower pulley on the counter shaft through the belt;

a transmission shaft on the downstream side of the clutch mechanism extended downward to a lower position than the clutch mechanism; and a pulley provided on the transmission shaft so as to constitute the working belt transmission.

6. A power transmission system for a working vehicle, the working vehicle including:

a vehicle frame, a prime mover mounted on an upper surface of the vehicle frame, a pair of left and right transaxles juxtaposed below the vehicle frame, wherein each of the left and right transaxles has a single axle for individually and reversibly rotatably driving each of left and right drive wheels, wherein a housing of each of the transaxles is filled therein with fluid so as to serve as a fluid sump, wherein the single axle and a hydrostatic transmission for driving the corresponding single axle are disposed in each of the housings, wherein each of the hydrostatic transmission includes a hydraulic pump and a hydraulic motor fluidly connected to each other, and wherein each of the hydraulic motors has a vertical motor shaft drivingly connected to the corresponding axle and projecting upward from an upper surface of the housing, and a working device disposed below the vehicle frame, the power transmission system comprising:

an output shaft of the prime mover extended downward from the vehicle frame;

a traveling transmission mechanism disposed below the vehicle frame and interposed between the output shaft and the pair of left and right transaxles;

a working transmission mechanism disposed below the vehicle frame and interposed between the output shaft and the working device;

a cover attached on the upper surface of each of the housings so as to cover a top of the corresponding motor shaft;

a brake chamber formed in the cover and each of the housings;

a wet brake mechanism disposed in each of the brake chambers, wherein the brake mechanism includes a brake disk provided on the top of the motor shaft; and a fluid passage formed in a wall of each of the housings and opened to the corresponding fluid sump and the corresponding brake chamber.

7. The power transmission system for a working vehicle, according to claim 6, further comprising:

a pair of reservoir tanks connected to the respective housings of the transaxles so as to regulate volumes of the respective fluid sumps in the housings, wherein the reservoir tanks are fluidly connected to the respective brake chambers.

8. The power transmission system for a working vehicle, according to claim 6, wherein the hydraulic pumps in the respective transaxles are variable displacement hydraulic pumps with respective movable swash plates, and wherein the cover serves as a guide member for the movable swash plates.

9. The power transmission system for a working vehicle, according to claim 6, wherein the hydraulic pumps in the respective transaxles are variable displacement hydraulic pumps with respective movable swash plates, further comprising:

a pair of speed control levers for changing displacements of the respective hydraulic pumps, wherein each of the speed control levers is pivoted on one side of the corresponding housing; and a pair of brake levers for operating the respective brake mechanisms, wherein each of the brake levers is pivoted on the other side of the corresponding housing opposite to the corresponding speed control lever, and wherein rotary axes of the speed control levers are disposed in parallel to rotary axles of the brake levers, and the rotary axes of the speed control levers and the brake levers are disposed in parallel to the axles.

* * * * *